United States Patent [19]
Grossheim et al.

[11] Patent Number: 4,794,368
[45] Date of Patent: Dec. 27, 1988

[54] PROGRAMMABLE AUTOMOBILE ALARM SYSTEM HAVING VOCAL ALARM AND REPORTING FEATURES

[75] Inventors: Edward Grossheim, Los Angeles; Michael Nykerk, Encino, both of Calif.

[73] Assignee: Electronic Security Products of California, Los Angeles, Calif.

[21] Appl. No.: 5,873

[22] Filed: Jan. 21, 1987

[51] Int. Cl.[4] .............................................. B60R 25/00
[52] U.S. Cl. .......................................... 340/63; 340/527; 340/528; 340/539; 340/692
[58] Field of Search ..................... 340/63, 64, 65, 527, 340/528, 506, 541, 539, 691, 692; 379/67; 381/110; 307/10 R

[56] References Cited

U.S. PATENT DOCUMENTS

| | | | |
|---|---|---|---|
| 3,471,652 | 10/1969 | Moore et al. | 340/692 |
| 4,383,242 | 5/1983 | Sassover et al. | 340/64 |
| 4,465,904 | 8/1984 | Gottsegen et al. | 340/518 |
| 4,560,978 | 12/1985 | Lemelson | 340/692 |
| 4,581,605 | 4/1986 | Vogt | 340/506 |

*Primary Examiner*—Donnie L. Crosland
*Attorney, Agent, or Firm*—Bryant R. Gold

[57] ABSTRACT

An alarm system for signaling and reporting the occurrence of an unauthorized entry into a defined area, such as into a closed automobile. The alarm system includes means for generating vocal speech signals that are used to: (1) draw attention to the fact that an unauthorized entry event has been sensed, and (2) provide reports to indicate the status of the system and to alert the owner of the system that a prior unauthorized event was detected. At installation of the system, several alarm options and features are displayed as easy-to-understand menus on a programming unit used by an installer. The installer can thus readily select which of several available alarm options and features are desired, thereby allowing the system to be easily suited for a particular application. Further, during use of the system, the user of the system can also select various operating modes and report options, thereby providing flexibility in how the system is used. Arming and disarming of the alarm system can occur manually or remotely through the use of a small portable interrogation/set unit. Verification that arming and disarming has occurred is provided through the use of audible and/or visual signals.

22 Claims, 6 Drawing Sheets

FIG. 1
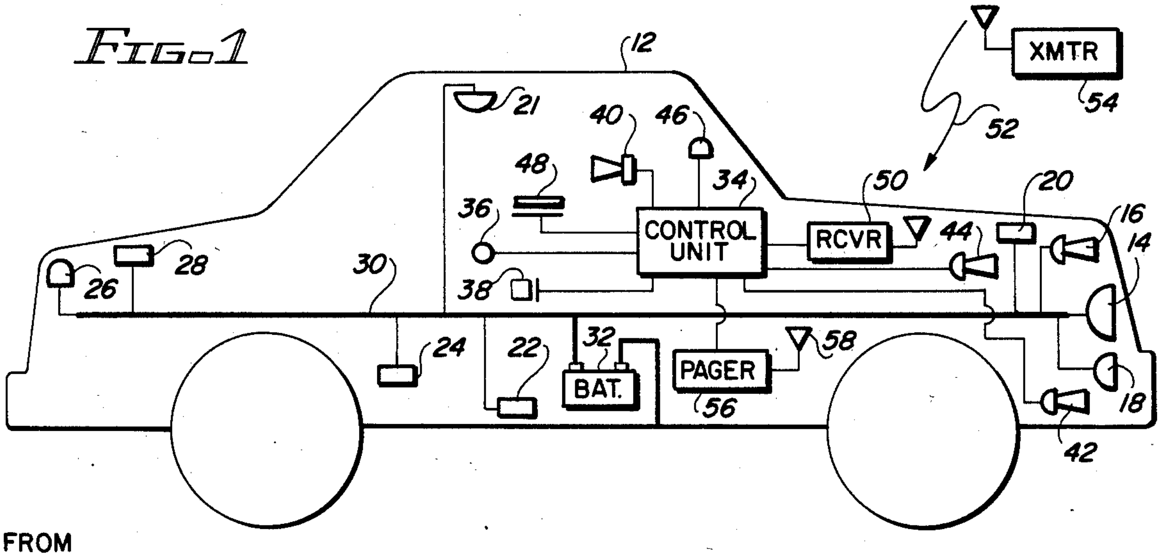
FIG. 2
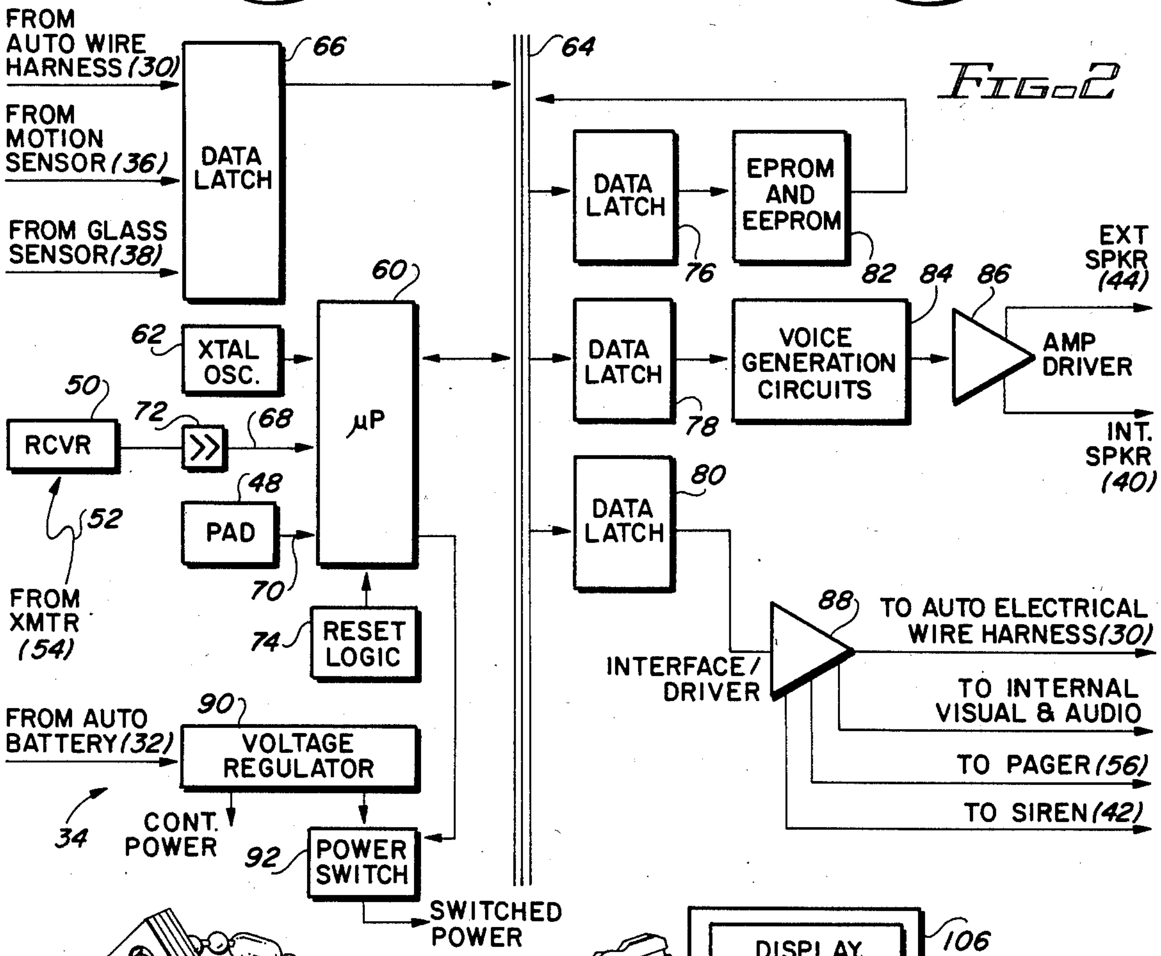
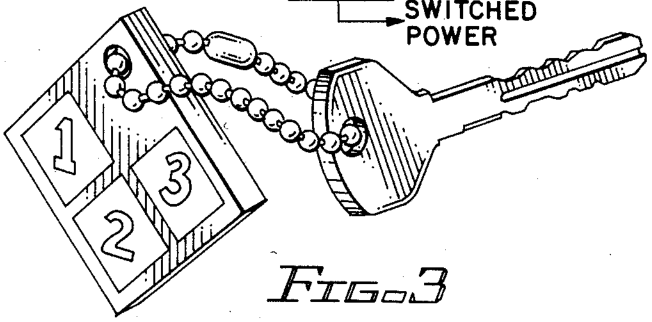
FIG. 3
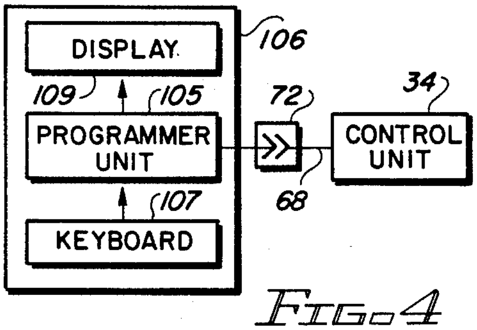
FIG. 4

PROGRAMMABLE AUTOMOBILE ALARM SYSTEM HAVING VOCAL ALARM AND REPORTING FEATURES

BACKGROUND OF THE INVENTION

The present invention relates to alarm systems, and more particularly to programmable automobile alarm systems that include vocal reports and alarms generated by voice synthesis techniques.

Alarm systems are known in the art. A typical alarm system is installed for the purpose of securing a defined area from unauthorized intrusion or trespass. The defined area that is secured by the alarm system will usually comprise a closed area, such as a specified room(s) within a building, or an entire building or house. In the case of automobile alarm systems, the secured area protected typically comprises the interior of the automobile, and may also extend to unauthorized tampering with the exterior of the automobile.

All alarm systems have certain basic elements in common. All include one or more sensors that are used to sense an entry event or other activity that could be viewed as an unauthorized tampering or presence (hereafter a "violation"). The sensor(s) are coupled, usually with electrical wires (although RF or other communication links may also be used), to a central control unit or equivalent circuit. When an entry or other activity is sensed by the sensor, an appropriate signal is sent to the control unit, which, if armed, generates an alarm signal. The alarm signal, in turn, may be used locally to sound an audible alarm, such as a loud siren or loud bell (intended to scare off the would-be intruder and to draw attention to the fact that an intrusion or other violation has been detected). The alarm signal may also be used to signal a remote location, such as a police station or a neighboring facility, of the violation that has been detected.

In the case of a simple autmobile alarm system, the vehicle's existing electrical system (used, for example, to turn on a light when a door is opened) is used as a basic sensor that is connected to a control module. An alarm circuit within the control module is triggered whenever the monitored event occurs, such as when the door is opened. A siren or horn is sounded if too much time passes (typically 10 to 15 seconds) before the alarm system is turned off (disarmed).

More sophisticated automobile alarm systems supplement this basic alarm system with additional sensors (e.g., that sense the opening of the hood or trunk, the removal of an automobile cover, or the presence of "motion") and a correspondingly more complex control module. Such systems may also include backup battery protection and remote paging capabilities. Further, it is not uncommon for such systems to take more preventative steps than merely sounding an alarm. For example, automobile alarm systems are known in the art that, upon sensing a violation (such as the opening of the door, trunk or hood while the system is armed), will disable the ignition and/or fuel delivery system of the automobile's engine, thereby rendering it impossible to drive the vehicle under its own power.

A feature common to all automobile alarm systems is the ability to selectively arm or disarm the system. A simple alarm system is armed after a prescribed time delay, such as 15 seconds, following the manual setting of an arming switch inside of the vehicle. (Typically, such switch is "hidden" or otherwise made non-conspicuous so that only the vehicle's owner knows of its location and function.) Once armed, all of the systems's sensors are enabled and any entry or tampering event is interpreted as an unauthorized event or violation. The prescribed time delay after manually setting the arming switch allows the vehicle owner sufficient time to exit the vehicle prior to the system becoming "armed". Similarly, upon reentering the vehicle, as mentioned above, another time delay allows the owner sufficient time to manually disarm the system before the alarm is sounded.

Unfortunately, situations can and do arise where the prescribed time delay, either for exiting or reentering the vehicle, is too short. The result is that it is not uncommon for an automobile alarm system to be "falsely" triggered (meaning that an authorized exit or entry usually the owner's exit or entry—has been interpreted as an unauthorized entry). Needless to say, false triggering can not only be a nuisance and an annoyance, it can also be an embarrassment. Further, in some situations, false triggering can also create a safety hazard either to the owner or to those who might respond to the falsely triggered situation without knowledge that it is a false alarm.

Potentially more serious than false triggering, however, is the possibility of false arming (meaning that the system has not been armed when the owner thinks it has been armed). False arming arises because the owner has no positive means by which he or she can verify that the system is properly armed or disarmed. Typically, a simple indicator light may be used to indicate the armed/disarmed status of the alarm system. However, such a status light is usually only visible from inside of the vehicle. Thus, once the owner has exited the vehicle, he or she has no way of verifying that arming has actually occurred (other than by reentering the vehicle, which reentry will either sound the alarm or cause the false triggering concerns mentioned above).

In view of these false triggering and false arming concerns, what is needed is an automobile alarm system that provides positive verification to the owner of the armed/disarmed status of the system, even when the owner is outside of the vehicle. Such a system would greatly reduce the risk and consequences of both false triggering and false arming.

Another shortcoming of prior art automobile alarm systems is that the alarm, once triggered, will continue to sound until the system is manually turned off (disarmed). In the case of false triggering, as above described, this shortcoming is not too serious because the owner is right there and can turn off the system quickly. However, if the owner is not present—such as would occur if an unauthorized entry attempt has been made and the would-be intruder has fled from the scene; or, if the owner "loaned" the vehicle to a friend but forgot to tell the friend how to disarm the system; or, if there is some sort of malfunction with the sensor or the control module—such continuous sounding of the loud, attention-getting alarm can create a major nuisance and safety hazard. Accordingly, more sophisticated alarm systems known in the art sound the alarm for only a prescribed time period, e.g. one minute, and then turn the alarm off. However, when the owner returns, such systems typically have no way of notifying the owner that an unauthorized entry event or violation has occurred. While some of the more sophisticated systems will provide some visual (e.g., an indicator light) or audible (e.g., a beeping sound) indication to the owner upon his or her return that a violation has occurred, such indication does not tell the owner when the security violation occurred or, in the case of a system that employs multiple sensors, what type of security violation occurred. Such information, if available, could prove invaluable to the owner as an aid in assessing appropriate action to take and, in situations where actual damage or theft of articles occurred, in completing police and insurance reports. Unfortunately, to communicate such information to an owner using conventional output communication devices, such as printers, CRT or LCD screens, or one-line character displays, would significantly add to the cost and complexity of the alarm system.

It is apparent, therefore, that an alarm system is needed that not only notifies the owner of the occurrence of an unauthorized entry event, but that also informs the owner, without using expensive, cumbersome communication devices (such as printers and visual character displays), of the type and time of occurrence of the unauthorized entry event.

A further major concern with existing automobile alarm systems relates to their cost of manufacture and purchase, complexity of installation, and ease of maintenance verses their performance. To illustrate, a simple automobile alarm system (e.g., one that uses only the existing wiring of the automobile to sense the opening of a door and that sounds an alarm when unauthorized entry is detected) can be quite inexpensive to manufacture and simple to install (and therefore quite affordable to the owner). Unfortunately, such a simple alarm system does not suit the needs, nor provide adequate protection, for many automobile owners. Therefore, most owners who want an alarm system will choose an alarm system that provides more protection and better suits their particular needs and vehicle.

Because every make and model of automobile is somewhat different, and further because every owner is also different, and further because the needs of every owner change as a function of time and situation, there is no known universal automobile alarm system that will suit the diverse needs of all owners at all times. Therefore, an owner must carefully shop around and try to select the alarm system that provides the best compromise given the owner's particular desires needs and budget. See, e.g., "Auto Alarm Systems", *Consumer Reports*, October 1966, pp. 658-62. If the owner's needs or wants subsequently change, the only option available to the owner is to replace or upgrade the existing system with a new one that satisfies these new needs or wants. Such replacement and/or upgrading can be very bothersome and expensive, and in many situations is not practical.

Hence, what is needed, is a universal automobile alarm system that can be efficiently and inexpensively manufactured, readily customized at installation to suit the particular automobile and owner involved, and easily modified by the owner thereafter to alter its performance to suit the needs and wants of the owner at any given time.

SUMMARY OF THE INVENTION

The present invention addresses the needs identified above, as well as other needs, by providing an automobile alarm system that can be economically manufactured, easily customized at installation to suit the particular car and owner involved, and readily reprogrammed thereafter should such reprogramming be necessary. Further, once installed, the alarm system can be easily controlled by the owner to operate in a desired mode of operation that best suits the needs of the owner for a particular situation.

Advantageously, the alarm system herein disclosed uses voice synthesis technology to generate vocal reports and alarms in order to communicate to the owner the status of the system, whether the system is armed or disarmed, and whether and when a particular type of violation occurred. Such voice synthesis technology allows the alarm system's control module to efficiently and effectively communicate to the owner without the need for using additional and expensive communication devices, such as printers and displays, as are conventionally used in the art. Rather, use of vocal communication permits the alarm system to utilize the existing components (e.g. speakers) of the vehicle's radio or tape player, thereby reducing the cost of the system.

As with all automobile alarm systems, the alarm system of the present invention comprises one or more sensors, a control module, and means for sounding an alarm should an unauthorized event be detected by the sensor(s). However, unlike known alarm systems, the alarm system of the present invention provides, in addition to the synthesized vocal speech reports indicated above, a degree of flexibility, programmability, and testability in its installation, use, and operation that has heretofore been unavailable.

The sensors used with the alarm system of the invention disclosed herein include, in addition to the automobiles existing wiring system (which can sense opening of doors, and can usually sense the opening of the trunk and/or hood), a motion sensor (that senses any motion within the vehicle), and a glass sensor (that senses the striking of any of the glass windows). Additional optional sensors can, of course, be added as desired.

The signaling or alarm-sounding components of the alarm system herein disclosed include, in dddition to the vehicle's radio/tape player speakers (hereafter "internal" or "inside" speakers), an external (outside) speaker, an external siren, and other components of the automobile that are wired to the auto's electrical system, such as the turn indicator lights (parklights) and horn. Further, optional equipment can be added that provides additional alarm sounding capabilities and remote paging of the owner or other designated location should an unauthorized event be detected.

The control module used with the alarm system herein disclosed comprises a microprocessor that is programmed to monitor the various sensors and react in a prescribed manner depending upon the particular mode of operation that has been selected. With the microprocessor, there is included an EPROM (Erasable Programmabee Read Only Memory) memory circuit for storing the various programs that define the response the microprocessor takes for a given situation; voice generation circuits for converting digital signals generated by the microprocessor to analog voice signals that can be amplified and played back through the internal and/or external speakers; and various interface or driver circuits for coupling the alarm signals generated by the microprocessor to appropriate alarm components, such as the vehicle's electrical system, a pager, a siren, or other desired display or warning devices. The alarm system also includes a menu control pad (manual switch), through which the owner can manually select a desired mode of operation, fromaa vocal list of possible modes of operation, for the system. One of the options includes an interrogating mode wherein the system provides an oral status report of the system. Another mode allows various tests to be performed. The alarm system, in one embodiment, further includes an RF receiver through which remotely transmitted control signals for the alarm system may be received.

The RF receiver that is included a part of the alarm system of the present invention provides the owner the option of interrogating and/or setting the alarm system to a desired mode of operation from a remote location, such as external to the car, through the use of a portable transmitter. This transmitter is advantageously a very small, light-weight, hand-held device that can be carried, for example, on a key ring. The signals generated by this portable transmitter have a range equivalent to that commonly found in garage-door opener transmitters i.e., approximately 25–150 feet. In one embodiment of the invention, this same transmitter may be used as a garage door opener transmitter as well as the interrogation/set taansmitter of the alarm system.

A significant feature of the present invention is the ability to easily program into the system at installation the particular options that are desired in order to best suit the needs and wants of the owner and his or her model vehicle. To this end, a programming device is provided to the installer that conveniently plugs into the control module at installation. This programming device advantageously lists all of the various installation options available to the system in an easy-to-understand series of menus. The installer, through the use of a keyboard that forms part of the programming device, can readily make the desired selections in just a matter of minutes. Once the desired options have been selected and verified, the necessary programs required to carry out the selected options are transferred to the EPROM of the control module. Should the owner subsequently decide to change the selected options, i.e., should the owner's needs or wants change beyond the mode control options available through the interrogation/set capabilities provided through the manual control pad or portable transmitter control device, reprogramming of the control module is as simple as the initial installation. All the owner need do is to return the vehicle to the installer so that the installer can reconnect the programming device to the control module and perform the desired programming operations. The EPROM circuits of the control module advantageously are designed to accommodate a large number of reprogramming operations, although it is contemplated that most owners will not need nor want this capability. However, this feature does provide a degree of universality to the alarm system in that the control module can be readily upgraded to new performance levels, including those of a different vehicle should the owner desire to remove the control module from one vehicle and install it in another.

BRIEF DESCRIPTION OF THE DRAWINGS

The above and other advantages and features of the present invention will be more apparent from the following more particular description thereof, presented in conjunction with the following drawings and appendices, wherein:

FIG. 1 is an outline of a typical passenger automobile, showing some of the key components therein that form part of the alarm system of the present invention;

FIG. 2 is a block diagram of the alarm system's control module;

FIG. 3 is a perspective view of a preferred embodiment of a transmitter device that can be used to remotely interrogate and set the control module of FIG. 2;

FIG. 4 is a block diagram showing the control module being programmed to a desired configuration using an installer's programming device;

Figure 5A:
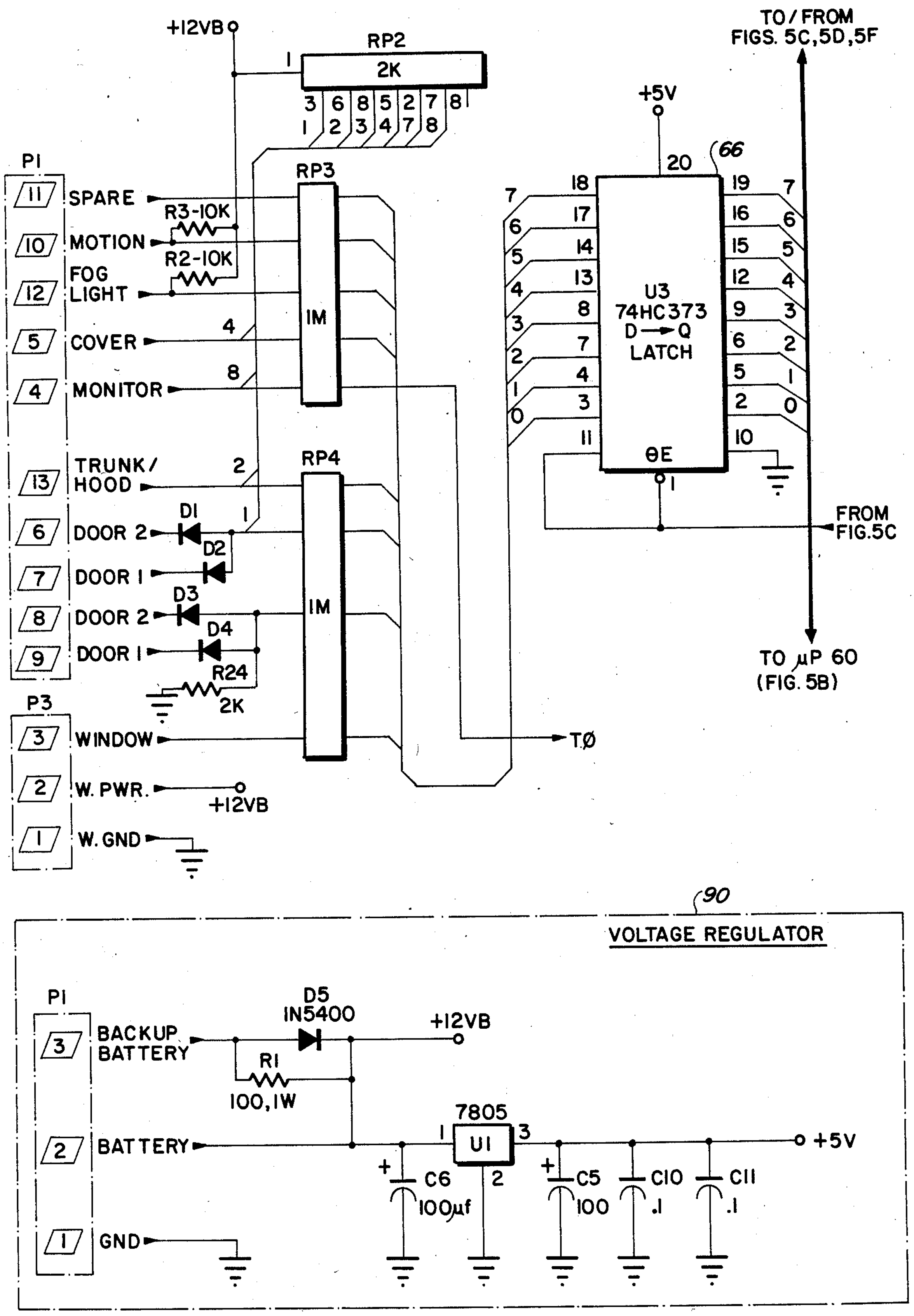
FIGS. 5A–5F are schematic/logic diagrams of the control module of FIG. 2.

Appendix A is a program listing of the program(s) loaded into the memory of the microprocessor used within the control module of FIG. 2; and Appendix B contains representative programs used within the installer's programming device shown in FIG. 4.

DETAILED DESCRIPTION OF THE INVENTION

The following description is of the best presently contemplated mode of practicing the invention. This description is not to be taken in a limiting sense but is made merely for the purpose of describing the general principles of the invention. The scope of the invention should be ascertained with reference to the appended claims.

In describing the alarm system of the present invention, it will first be helpful to provide an overview of the alarm system and the features included therein. Basically, the alarm system includes a programmed "voice" that allows the owner or vehicle operator to have instant access to pertinent information regarding both the alarm system and the vehicle at any time. This "voice" is communicated through either interior and/or exterior speakers installed in the vehicle. Advantageously, the interior speakers may be the same speakers used with the vehicle's radio.

The owner/operator communicates with the alarm system through either an electronic menu pad (switch) or a portable hand-held remote transmitter. With just one press of the transmitter or menu pad, the owner is notified as to the status of the system or the vehicle. Included in this status information is when the system needs repair, which alarm features are being turned on or off, and most importantly, which sensor caused an alarm to sound and how long ago the violation (unauthorized entry event) occurred.

With the alarm system of the present invention, any unauthorized entry event activates an alarm. While the alarm is sounding, an exterior siren and the vehicle's horn, along with one of the following voice messages are heard: "I'VE BEEN TAMPERED WITH!", "VEHICLE SECURITY VIOLATION!", or "BURGLAR-BURGLAR!". Because a voice is used to sound the alarm in this fashion, the alarm system is referred to as VOCALARM. (VOCALARM is a trademark of Electronic Security Products of California.) Each alarm system includes sensors for protecting all doors, windows, and motion of the vehicle. One minute after an alarm is triggered, the system is reset automatically, and is ready to sound again in the event of another break-in attempt. If the doors are left open on intrusion, the alarm continues to sound for five minutes in order to attract more attention to the vehicle.

At present, there are two embodiments of the alarm system herein described. In a first embodiment, the alarm system is operated through the ignition and doors. Upon exiting the vehicle, the owner will hear: "AUTOMATIC ARMING ENGAGED!". This voice report notifies the owner that the system will arm itself after all of the doors are secured for 15 seconds, there'by allowing unlimited time to remove packages, etc. If this automatic arming feature needs to be by-passed, the owner need simply turn the ignition on and off, and the system will announce: "AUTOMATIC ARMING DISENGAGED!" Upon re-entry into the vehicle, the owner/operator will hear a five or ten second countdown: e.g., "FIVE, FOUR, THREE, TWO, ONE". If the ignition switch is not turned on and a menu pad depressed before the end of this countdown, the system assumes that the entry is unauthorized and the alarm will sound. If a violation occurs as a result of sensing motion, broken glass, or any other sensor (other than the door sensors) the alarm is sounded without delay.

In a second embodiment of the alarm system, the owner carries a small hand-held portable transmitter to operate the alarm system. Advantageously, this transmitter includes three separate independent channels, each controlled with separate control button. If these buttons are individually depressed, or if combinations of the buttons are depressed, up to seven separate functions can be triggered. Hence, several vehicles, a garage door opener, a home security system, and other functions can all be operated with the use of a single transmitter.

Upon exiting the vehicle using this second embodiment of the invention, a voice report from inside the vehicle reminds the owner: "PLEASE ARM VOCALARM!" The owner then depresses the appropriate button(s) on the portable transmitter in order to perform the arming function. If, in response to arming the system, a voice report indicates: "WARNING", then the owner is notified that one of the protection sensors is not functioning properly. Disarming of the system must occur before re-entry into the vehicle or the alarm will sound. Such disarming is performed by merely depressing the appropriate button(s) on the portable transmitter. Upon opening the driver's door, a voice report is given from inside the vehicle indicating which sensor should be checked. For example, if the motion sensor is not uunctioning properly, the report will indicate: "CHECK MOTION!"

If, upon disarming the vehicle, a "WARNING" vocal report is heard, this notifies the owner that while he or she was away an unauthorized entry event or violation was detected. Upon opening the driver's door, a voice report is given from inside of the vehicle as to which sensor was violated. For example, if the motion sensor caused the alarm to sound, the owner will hear: "MOTION VIOLATION!" Further, with the second embodiment, the owner will also be notified in a voice report as to the time when the violation occurred. This feature advantageously enables the owner to give accurate details of the violation in the event a police or insurance report must be made. The built-in timer within the system keeps track of violations for up to sixty days. Upon arming the system, all previous reports of violations are canceled and the system is ready to receive and log new violation entries.

The second embodiment also allows the owner or operator, through use of the menu pad located inside of the vehicle, to not only select, but also hear, those features that have been turned on or off. A vocal menu list is recited by the system. Features included in this "menu" list may include: (1) reports, (2) manual arming, (3) test, (4) silent arming, (5) window sensor on-off, (6) system on-off, and (7) hood release. The owner makes a selection by pressing the menu pad immediately after hearing the desired feature "spoken" in the vocal menu list. To illustrate how this is accomplished, these faatures or modes will now be discusse in more detail.

The report mode keeps track of all status conditions within the system. After arming or disarming the system, a report is given as to which sensor(s), if any, needs to be checked or which sensor(s) caused the alarm to sound and the time such alarm was sounded. If portions or all of the report is missed, the owner can simply select the report mode from the menu pad and the report will be repeated.

The manual arming mode allows the owner/operator to arm the system without using the transmitter. Such arming is done through the vocal menu pad. That is, as the voice menu is presented, the owner presses the menu pad immediately after hearing "MANUAL ARM". Upon doing so, a ten second countdown is heard: "TEN, NINE, EIGHT, . . . . ONE." The owner must exit the vehicle before the time is up or the alarm will sound. Upon re-entry, the owner hears another countdown and the ignition must be turned on and the menu pad depressed prior to the end of this countdown or the alarm will sound.

The test mode enables the owner to check all of the sensors to make sure that they are working properly. When in this mode, all reports are heard through the inside speakers. For example, if the door sensor is being checked, all the owner need do is open the door after selecting the test mode from the vocal menu list. Upon opening the door while in the test mode, a report will be heard inside of the vehicle that says: "DOOR VIOLATION". Advantageously, unlike other systems, the owner will never have to set off the annoying sound of an alarm just to find out whether the system is properly working or not.

The silent arm mode allows the owner to arm and disarm the system using only the exterior indicator lights of the vehicle for verification. This mode is selected by pressing the menu pad after hearing "SILENT DISENGAGED" in the vocal menu list. This action causes the message "SILENT ENGAGED" to be heard, indicating that the silent arm mode is active. In this mode, the exterior lights flicker to signal that the alarm system is armed and that the doors are locked. When disarming the system, the exterior lights will stay on for one minute, thereby allowing for more visibility. If an unauthorized entry event is detected while in this mode, the exterior lights of the vehicle will flash on and off, in addition to the normal alarms that are sounded, in order to attract more attention to the alarm event. Upon disarming the system, if an unauthorized event was detected while the owner was away, the lights will flicker on and off in order to notify the owner that a violation occurred. Advantageously, this silent arm mode can be used to verify arming and disarming of the system in a quiet zone, or late at night, in order to avoid any possible disturbance.

The window sensor off mode provides the owner the option of turning off the window sensor, leaving all other sensors on. This mode is especially useful in a convertible, where ambient noise could easily be interpreted as a violation. The feautre is also useful, in combination with remote control of power windows (using the portable transmitter) for allowing the windows to be "cracked" (rolled down an inch or so) after the vehicle is secured.

The system on-off mode enables the owner to turn the alarm system on or off at any time. This feature is especially useful during valet parking, in a car wash, and when having repair or maintenance work done on the vehicle. Even when off, however, the system says "VOCALARM DISENGAGED" when switching off the ignition, or when operating the remote transmitter, in order to remind the owner that the system was turned off.

The hood release mode allows the owner ten seconds to open the front hood of the vehicle. For security purposes, the ignition must be turned on for this feature to operate. In contrast, most alarm systems require a separate toggle switch or similar device to be thrown in order for this feature to operate, which switch can be found and overridden by an intruder.

A further feature available with the second embodiment of the invention provides a panic alarm to sound with the pressing and holding of one or more of the portable transmitter control buttons. With this feature enabled, as long as the owner is within range of the vehicle, the panic alarm will sound within two to three seconds after any transmitter button(s) has been depressed and held in the depressed position for a couple of seconds. This feature is operable in both the armed and disarmed modes, and provides a vlluable warning device in case of an emergency.

In addition to the above features and operating modes, many options are also available depending upon the particular needs and wants of the owner and the particular make and model of automobile(s) being protected. For example, up to seven vehicles can be equipped with the alarm system herein disclosed, and each can be operated from one transmitter. Further, as indicated, this same transmitter can be configured to operate a garage door opener. An automatic arming option can also be selected that automaticall arms the system after all of the doors are secured for 15 seconds, just in case the owner/operator forgets to arm the system. Other available options that can be used with the alarm system include: automatic non-start (disables the vehicle's starter upon arming of the system); manual non-start (requires a hidden pressure pad within the vehicle to be depressed before the engine will start); automatic locking/unlocking (locks and/or unlocks all doors upon arming or disarming, respectively, of the system); automatic windows (closes all windows upon arming); window roll-down (cracks the windows when triggered by the transmitter); automatic sunroof (closes the sunroof upon arming or upon depressing transmitter control button); interior high intensity siren (provides an extremely loud piercing siren that deters thieves from remaining inside of the vehicle); cover alarm (senses the removal or attempted removal of a car cover and sounds an alarm the same as for any other violation); pager notification (triggers a pager, carried by the owner, whenever a violation is detected, thereby notifying the owner that a violation has occurred); trunk protection (sounds the alarm if the trunk is opened); fog light guard (sounds the alarm if the fog light wires are cut or removed); piezo sounder (provides a high frequency sounder within the vehicle that pulses on and off when the system is armed on, thereby warning unauthorized intruders that the vehicle contains an activated security system); interior flashing LED's (also warn an intruder that an activated security system is installed); key-left-inignition warning (provides a vocal warning that the keys are still in the ignition when a door is opened); and an exterior air horn (attracts additional attention to the vehicle when the alarm is sounding). In addition to these options, many other options can be included depending upon the particular needs and wants of the automobile owner.

Referring now to the figures, a description of the alarm system's hardware will be presented. FIG. 1 shows an outline of a typical passenger automobile 12 and some of the key components thereof that form part of the present invention. These components include headlights 14, a horn 16, park lights 18, a hood sensor 20 (that senses the opening of the hood), a dome or other interior light 21, front door sensors 22 (that sense the opening of the front doors), back door sensors 24 (that sense the opening of the back doors), taillights 26, and a trunk sensor 28 (that senses the opening of the trunk). All of these components are electrically connected in conventional manner to the automobile's electrical wiring harness 30, which harness interconnects these components to the automobile's electrical system, including a battery 32.

In addition to these conventional components, the alarm system of the present invention includes a control unit 34 (sometimes referred to herein as a control module) that is also connected to the wiring harness 30. Connected to this control unit 34 are additional sensors, such as a motion sensor 36 (to sense motion within the interior of the automobile), and a microphone or glass sensor 38 (to sense striking or hitting of the automobile's glass windows). Other sensors (not shown) could also be connected to the control unit 34 as desired. As shown in FIG. 1, the control unit 34 is also connected to the automobile's internal speaker(s) 40, an external siren 42, and an external speaker 44. These components, as has been discussed, provide additional flexibility in the type of alarms and status signals and reports provided by the alarm system.

The owner/operator controls and interrogates the control unit 34 through use of an interior menu control pad 40 that is directly connected to the control unit 34. For the second embodiment, an alternate control/interrogation path is provided through RF receiver 50 (which receives control or interrogate signals 52 from an external transmitter 54). A status light 46, connected to the control unit 34, provides a visual indication to the owner/operator that the alarm system is powered on. In some embodiments, a paging unit 56 may optionally be connected to the control unit 34 to provide remote paging capabilities should a violation be detected. Such paging unit 56 transmits a prescribed signal, through antenna 58, to a remote receiver (not shown) in order to signal the alarm condition. The remote receiver is typically carried by the owner and emitts a beeping sound when being paged, thereby notifying the owner that a violation has occurred. More sophisticated remote receivers may be connected to a telephone circuit and provide the capability of automatically dialing a prescribed sequence of telephone numbers in order to alert at least one remote location of the sensed alarm condition.

Referring next to FIG. 2, a simplified block diagram of the control unit 34 is shown. Although simplified, FIG. 2 contains sufficient detail to enable one to gain an overview and basic understanding of how a microprocessor circuit functions as the control unit of the disclosed automobile alarm system. Operatioaal details associated with the circuit design and operation of the control unit 34 can be found, for those more familiar with microprocessor art, in the more detailed logic/-schematic diagramsoof FIG. 5 and the program listings of Appendices A and B.

As indicated in FIG. 2, at the heart of the control unit 34 is a microprocessor circuit 60. A microprocessor circuit may be thought of as simply a digital processing circuit that receives and processes digital data according to a prescribed sequence. The processing sequence is defined by a "program", which program is stored in some appropriate memory device. The microprocessor circuit 60 of FIG. 2 is programmed to monitor the various sensors used within the alarm system and to provide a prescribed response, such as the sounding of an alarm, when an unauthorized entry event (violation) is detected. The microprocessor circuit 60 is further programmed to store the time and type of violation event that is detected so that such information may be subsequently provided to the owner/operator in a vocal report.

As shown in FIG. 2, the microprocessor circuit 60 is clocked by master clock signal derived from a crystal oscillator circuit 62. This clock signal is used to control all the intricate data processing operations that occur within the microprocessor circuit 60 and, indeed, throughout the control module 34. Digital data is sent to and received fro the microprocessor circuits over data bus 64. Sensor data received over the automobile's wire harness 30 (such as the opening of a hood, trunk, or door), or from the motion sensor 36 or the glass sensor 38, is latched in input data latch 66. (Latching of these sensed events is necessary because the signal from the sensor may be a signal that chances state for only a short period of time.) The latched output from input data latch 66 is coupled to the microprocessor circuit 60 via the data bus 64.

Control and interrogate signals from receiver 50 or control pad 48 are coupled directly to the microprocessor circuit 60 through signal lines 68 and 70 respectively. Signal line 68 has a connector block 72 attached thereto into which a mating connector from the output line of the receiver 50 is inserted. This same connector block 72 may advantageously be used as a connection point for a programming device, as explained below in connection with FIG. 4, during installation of the alarm system.

Further connected to the microprocessor 60 is reset logic circuitry 74. It is the purpose of this reset logic circuitry 74 to reset the microprocessor 60 to a desired operating mode in the event of a power interruption or other condition that might adversely affect the microprocessor's operation.

The data bus 64 is further connected to three output data latch circuits, 76, 78, and 80. It is the function of these latch circuits to receive the data that appears on the data bus 64 at a particular moment in time and hold this data for subsequent presentation to a desired output circuit. Output data latch 76, for example, presents its latched data to Erasable Programmable Read Only Memory (EPROM) circuit 82. EPROM 82, in turn, presents selected data stored therein back to the data bus 64 (from which point the data may directed, through operation of the microprocessor or latch circuits, to other selected destinations within the control unit 34). It is noted that the operating programs of the microprocessor 60 are stored in EPROM 82.

Similarly, output data latch 78 presents its latched data (obtained from data bus 64) to the voice generation circuits 84. These voice generation circuits convert the digital data to analog data representative of vocal speech. The resulting speech signals are then amplified in amplifier/driver circuits 86 and directed to the appropriate internal or external speakers.

Finally, output data latch 80 presents its latched data (obtained from data bus 64) to interface/driver circuit 88. This interface/driver circuit 88, in turn, amplifies and buffers the signal as required prior to presenting it to an appropriate alarm device, such as the automobile's wire harness 30 (which, in turn, is connected to the horn and lights), the internal and/or external speakers, the external siren 42, the pager 56, or other desired alarm devices.

Also included in the block diagram of FIG. 2 is a voltage regulator 90. Voltage regulator 90 receives input power from the automobile's battery 32 and converts this unregulated power to the appropriate voltage levels needed throughout the control unit 34 in order to properly operate the various circuits used therein. Power switch 92 advantageously provides a switched power output line that is directed to most of the alarm circuits (e.g., the voice generation circuits 84, the voice amplifier/driver circuits 86, and the interface/driver circuits 88). These alarm circuits do not need to be turned on until a violation event is detected. Hence, by operation of the power switch 92, no power is presented to such circuits until needed, thereby conserving power. In contrast, continuous power is provided to the microprocessor circuit 60 and the associated sensor circuits because such circuits need to be active at all times. However, it is noted that these active circuits consume very little power, largely because the microprocessor circuit 60 and associaeed logic circuits are realized with low-power-consumption CMOS (complementary metal oxide semiconductor) integrated circuits, and the sensor circuits are designed to only consume power when activated.

From the above description, the basic operation of the alarm system can now be better understood and appreciated. To summarize this operation, a controlling program for the microprocessor is initially stored in EPROM 82. When the alarm system is turned on, the microprocessor circuit 60 looks to the EPROM 82 for its operating program. When the alarm system is armed, either through the control pad 48 or the receiver 50, this operating program causes the microprocessor to continuously monitor the various sensors. An unauthorized entry event or "violation" causes the input data latch 66 to be set, which setting is sensed by the microprocessor 60. The microprocessor responds, as controlled by its operating program, by sounding an alarm and by storing a data signal indicating the type of unauthorized entry event that occurred and the time at which it occurred.

The type of alarm that is sounded an its duration is controlled by the program and any operating options that may have been selected by the owner/operator through either the control pad 48 or receiver 50. For example, in one mode of operation, the sensing of an unauthorized entry event causes a load vocal alarm to be sounded through the external speaker, as previously described. It is the intent of this load alarm to frighten the would-be intruder away from the automobile. This alarm is generated by presenting the appropriate data on the data bus 64 and latching this data into output data latch 78. Voice generation circuits 84 then act on this data by converting it to analog signals representative of the desired vocal speech. Such a vocal alarm may also be accompanied by the sounding of other alarms, such as the siren, horn, and/or the flashing of lights. These other alarm signals are generated by latching appropriate data into output data latch 80, from which point it is directed to the appropriate alarm device through interface/driver circuits 88.

In a typical operating mode, the microprocessor program continues the "alarm sounding" for only a prescribed period of time, such as 60 seconds. When the owner/operator returns and disarms the system, a vocal report is generated informing the owner/operator through the internal speakers of the type and time of unauthorized event that occurred. Such vocal report is generated in the same manner as was the vocal alarm, i.e., the microprocessor places the appropriate data signals on the data bus 64. This data is then latched into output data latch 78, and the voice generation circuits then act on this data in order to generate the desired speech signals therefrom.

Referring next to FIG. 3, a perspective view of a preferred embodiment of a portable transmitter 54 is shown. In accordance with this embodiment, the transmitter 54 is small enough to be carried on a key chain 96, and is not any larger than a typical automobile ignition key 98 (approximately two inches square and less than ½ inch thick). As mentioned previously in connection with FIGS. 1 and 2, it is the function of the transmitter 54 to allow the owner/operator a means of controlling or interrogating the alarm system from a location external to the automobile. Primarily, the portable transmitter 54 is used for arming and disarming the system from an external location. When the system is armed or disarmed in this manner, a vocal confirmation of such arming or disarming is provided through the external speaker 44 so that the owner/operator has positive verification that proper armin or disarming has occurred.

The portable transmitter 54 is constructed using the same technology as is commonly employed in portable garage-door-opener transmitters. As has been mentioned, means are provided within the tansmitter 54 for transmitting three separate control signals. A first signal, generated by depressing the "1" button 99 on the face of the transmitter 54, is sent to and received by a receiver 50 of an alarm system as described above in connection with FIGS. 1 and 2. A second signal, generated by depressing the "2" button 101, may be sent and received by a receiver 50 of a second alarm system installed in, for example, a second vehicle. A third signal, generated by depressing the "3" button 103, may be sent and received by a conventional garage-door-opener receiver for the purpose of controlling the opening and closing of a garage door. Combinations of these three signals can also be stimultaneously transmitted and received and decoded by the same or different receivers in order to provide control of up to seven separate functions from a single transmitter. Thus, the owner/operator has at his or her fingertips all of the transmitters needed to effectively set and interrogate the alarm systems of all of his or her vehicles, as well as to operate the garage door where the vehicles are stored, or to perform other functions. Advantageously, in order to simplify the design and manufacture of the system, the receiver 50 may be an RF receiver of the type commonly employed with garage door openers. Such receivers typically employ an RF carrier frequency of 308.75 MHz, although any suitable frequency could, of course, be employed.

In a preferred embodiment, the portable or remote transmitter 54 is molded with high impact ABS plastic for greater durability and longer wear. A specially designed electronic membrane pad is integrated into each transmitter which prohibits the buttons 99, 101, and 103 from being accidentally depressed. Further, an LED light 104 is incorporated into the transmitting unit and is activated (turned on) whenever one of the buttons is depressed. This LED provides the operator some visual assurance that the unit is operating properly. Also, the ABS plastic case is completely water-resistant, thereby protecting the transmitter circuits in the event the unit accidentally gets wet.

It is understood that the above description of the portable transmitter 54 is exemplary and not limiting. As those skilled in the art will recognize, the transmitter(s) contained within the transmitting unit 54 can be readily set and used to control and operate a large variety of remote appliances, and the like, in addition to setting and interrogating the alarm system of the present invention. It is further noted that the alarm system described herein, while being described for use with an automobile, could easily be adapted to protect a house or other building.

As mentioned above, an important feature of the alarm system herein described is the ability to configure the alarm system at installation to suit the needs and desires of a particular owner for his or her particular automobile. This is accomplished by loading into the EEPROM 82 (FIG. 2), during installation of the system, the particular option bits needed in order to provide the desired operating configuration. FIG. 4 is a block diagram that illustrates how this is done. During installation, i.e., after all of the alarm system components have been installed in the vehicle, a programming unit 105 is plugged into the connector 72. Advantageously, this connector 72 is realized using a six-conductor quick-disconnect plug of the type commonly employed in telephone jacks. Hence, it is a simple matter for the installer to disconnect the receiver 50 (FIG. 2) from the plug 72 and to connect the programmer unit 105 thereto.

The programmer unit 105 includes a keyboard 107 and a display 109. Upon turning the system on, a series of menus are displayed on the display 109 that provides to the installer a list of all of the available options and configurations that can be programmed into the system. The installer merely selects the desired item from the menu list by pushing a designated key on the keyboard 107. After all of the menus have been displayed and the desired selections have been made and verified, instructions are displayed on the screen that enable the installer to enter the desired options into the EEPROM 82 of the control unit 34. These instructions provide for simple key stroke entries that carry out the desired command.

The programmer unit 105, including the keyboard 107 and display 109, is realized using a microprocessor-based system (e.g., a portable personal computer 106) that is programmed with a program as detailed in Appendix B. In the preferred embodiment, the programmer 105 may be realized using any suitable personal computer, such as an NEC model 8210A computer, or an Olivetti model M10 computer. Other computers that could be used include a Radio Shack model 102 or any IBM PC (AT or XT) or IBM compatible personal computer. As those skilled in the art will recognize, most personal or other computer systems currently available in the market could be programmed and used as the programmer 105. The only unique hardware requirement is the inclusion of a serial interface cable having a compatible plug for insertion into the plug 72. Of course, the system must also have the ability to serially send the desired option bits through the interface cable to the control unit 34 at a desirable baud rate (such as 4800 Baud). However, most available computer systems can be readily programmed by those skilled in the art to perform this function.

Referring next to FIGS. 5A-5F, a logic/schematic diagram of the preferred embodiment of the control unit 34 is shown. This logic schematic diagram closely parallels the block diagram of FIG. 2, and like numerals are used to describe like parts throughout. To those skilled in the art, FIGS. 5A-5F are believed to be self-explanatory. Pin numbers of IC devices are shown and signal lines and device types and values are identified either in the figures or in the description that follows. Moreover, all components are commercially available, as are application and technical notes describing how such components are to be used. Accordingly, such information will not be repeated herein.

FIG. 5A depicts the input data latch 66 and its interface to the various sensors used within the alarm system. The sensors used, in addition to the vehicle's built-in sensors, are commercially available sensors of the type employed in conventional automobile alarm systems. In particular, the glass sensor is simply a microphone and amplifier, tuned to detect that range of frequencies associated with striking and shattering glass (10-500 Hz). The motion sensor may be any type of sensor designed to detect physical motion of the vehicle or the movement of a body of mass within the vehicle. The latch circuit is realized using a CMOS D-type latch device U3, commercially available from Texas Instruments (TI), Signetics, and other semiconductor vendors under the generic number 74HC373 Resistor packs RP2, RP3, and RP4 contain resistors of the value indicated. RP2 is a pull-up configuration having at least seven resistors therein that are connected to a common point (pin 1). RP3 and RP4 are feed-thru configuration resistor packs having at least five separate resistors therein that feed horizontally through the pack (as the pack is drawn in the figure).

Also included in FIG. 6A is the voltage regulator circuit 90. Five volt regulation is achieved using a 7805 regulator, commercially available from numerous vendors, such as Motorola and TI, in a conventional configuration as shown. The diodes D5 and D6 are 1N5400's. All other diodes shown in FIGS. 5A-5F are 1N114B's, unless indicated otherwise.

Figure 5B:
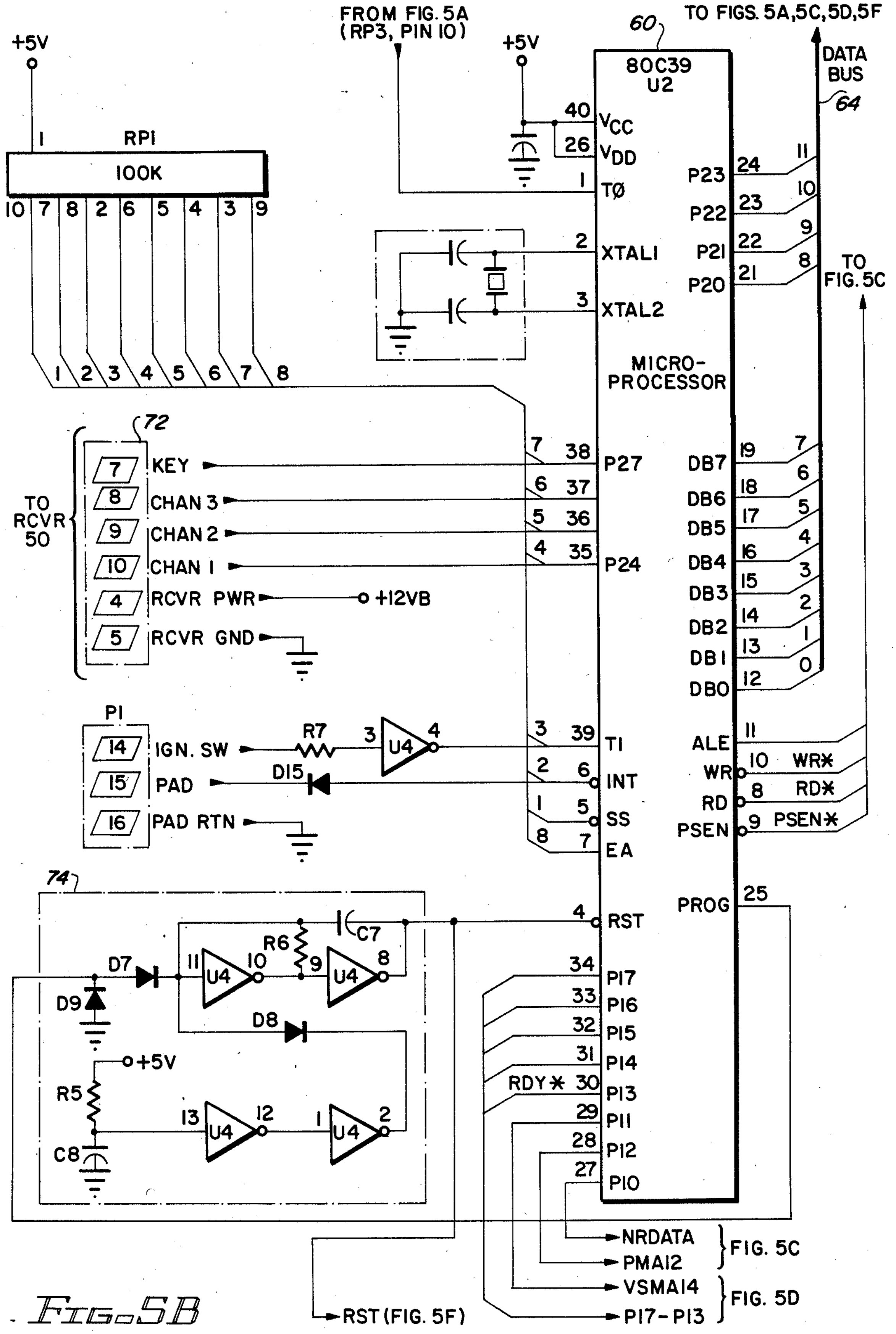

FIG. 5B depicts the logic diagram of the microprocessor 60 and associated circuitry (oscillator 62 and reset logic 74). The microprocessor chip U2 is realized using an 8-bit Intel 80C39 microprocessor. The inverter gates included within the reset logic are contained within a 74C04 hex inverter integrated circuit (IC) U4. The purpose of the reset logic is to reset the microprocessor 60, as well as the data latch 80, to a known state in the event of a momentary power failure. It is noted that resistor pack RP1 is a pull-up type configuration.

Figure 5C:
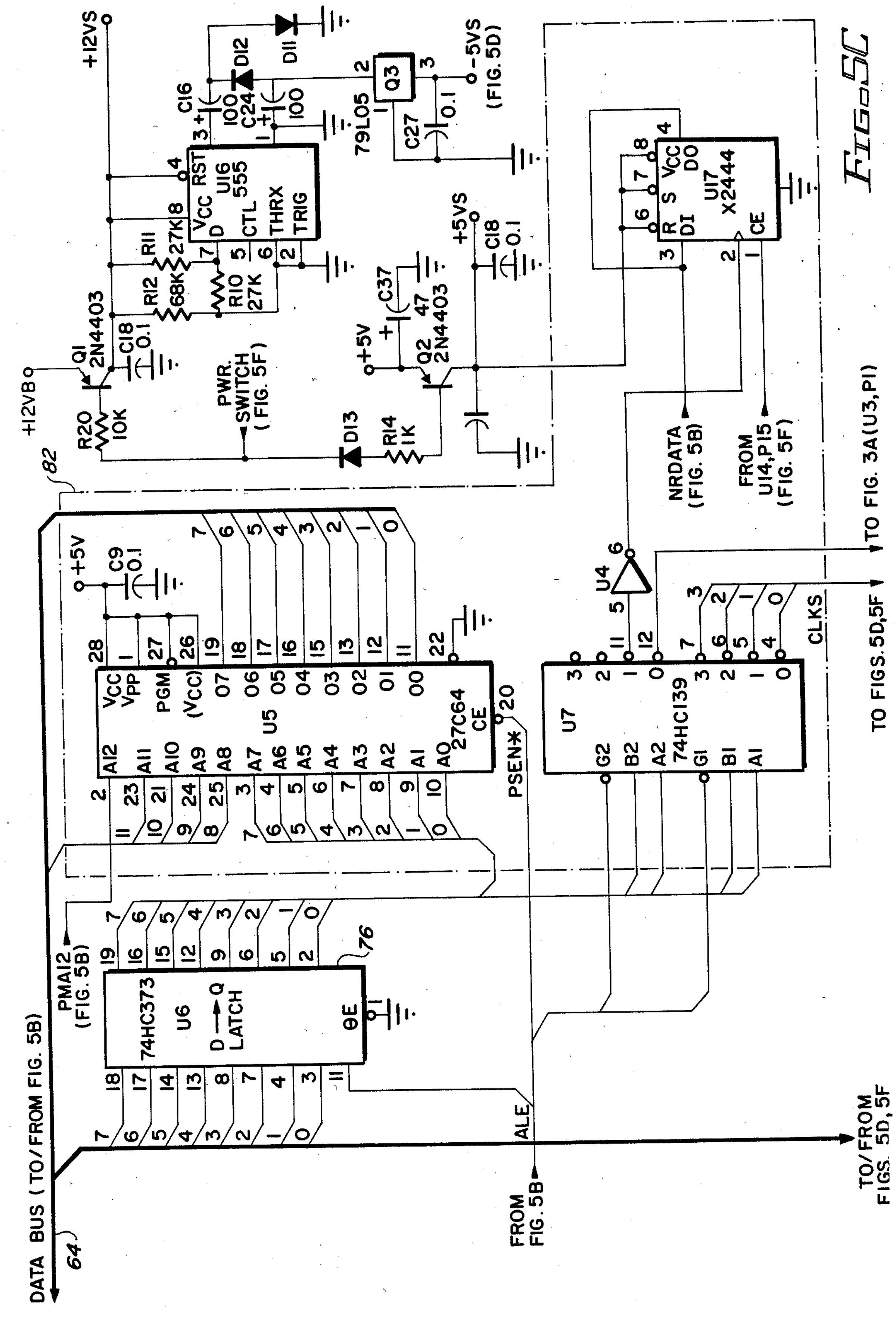

FIG. 5C depicts the data latch 76 and EPROM circuit 82. Also included in FIG. 5C is the power switch 92. Data latch 76 is realized with a 74HC373 D-type latch device U6. The EPROM circuitry 82 includes a 64K EPROM IC device U5, realized with a 27C64 device available from numerous IC vendors, such as TI, Toshiba, and Intel. An EEPROM chip U17 stores the option bits required to carry out the options selected from the installer menu. Device U17 is realized, in the preferred embodiment, with a X2444P/10 device, available from XICOR.

The power switching circuitry 92 (FIG. 2) is further included in FIG. 5C. Transistor Q1, when turned on, provides a +12 volt switched power, +12 VS, that is used by some of the circuits as previously described. Similarly, transistor Q2, when turned on, provides a +5 volt switched power, +5 VS. Voltage converter U16 converts the +12 VS power to a negative voltage, regulated through regulator Q3 to a negative five volt switched power, -5 VS. This negative voltage is used by the voice synthesis circuits shown in FIG. 5D, described next.

Figures 5D, 5E:
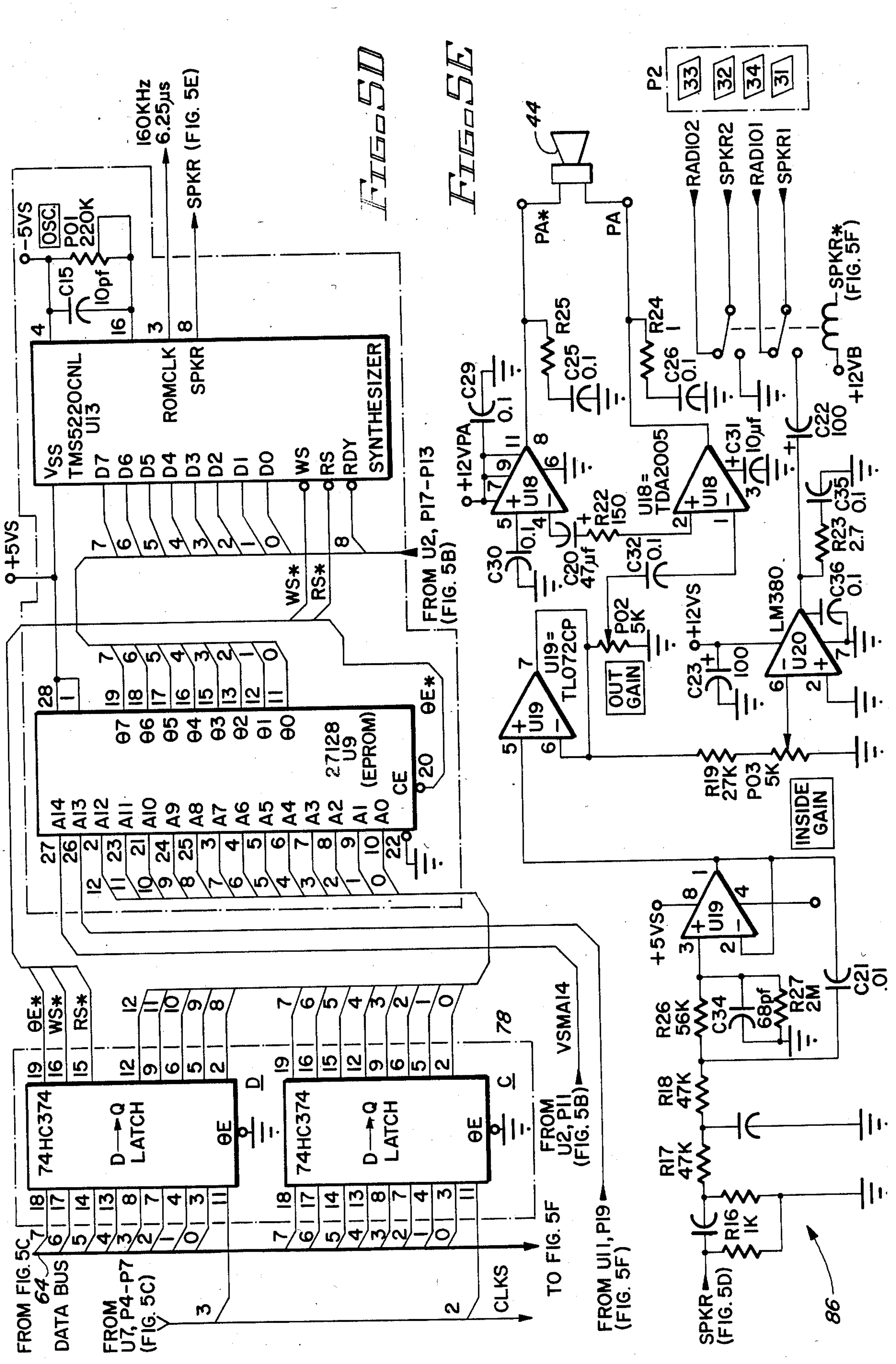

FIG. 5D depicts the logic diagram of the output data latch 78 and voice generation circuits 84. Data latch 8 is realized using two D-type latch devices, U8 and U10, in parallel, as shown. Both U8 and U10 may be commercially available 74HC373 devices. A voice storage circuit U9, realized with a 128K EPROM device 27128, available from Intel or other vendors, converts the data stored in latch 78 to approriate data that addresses voice synthesizer U13. Voice synthesizer U13 is realized using a TMS5220CNL, commercially available from Texas Instruments. Variable resistor P01 controls the rate or speed of the speech that is generated. The output of the voice synthesizer U13 is an analog signal that is fed into the analog amplifier and driver circuits 86, shown in FIG. 5E. The theory and manner of operating the voice synthesis circuits of FIG. 5D is known and described in the relevant art FIG. 5E shows the schematic diagram for the audio amplifier/driver circuit 86 (FIG. 2). The SPKR signal generated by the voice synsthesizer U13 is first filtered by passing it through the discrete filter made up of resistors R13, R16-R18, R26, R27, and capacitors C19, C28, and C34. Preamplification is provided by the amplifier residing in one-half of U19, a TL072CP device. This is followed by a buffer amplifier, residing in the other half of U19. The amplified and buffered signal is then split into separate channel for the internal speakers. Separate variable resistors, P02 and P03 respectively provide a gain adjustment for each channel. A final stage of amplification for each channel is realized using amplifier/driver U18, a TDA2005 device, for the external speaker, and amplifier U20, a LM380 device, for the internal speaker.

Figure 5F:
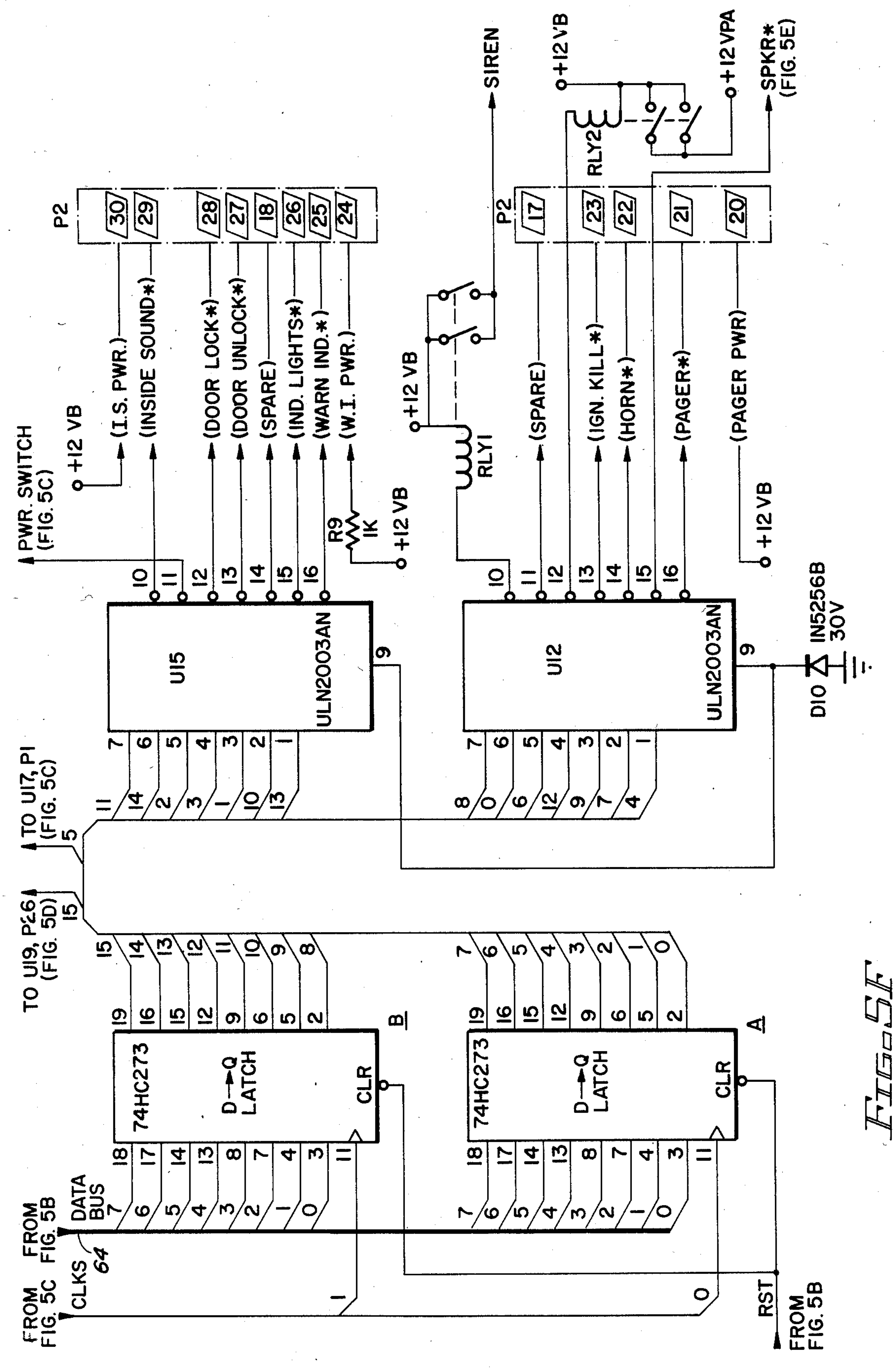

Finally, FIG. 5F depicts the logic and schematic diagrams of the output data latch 80 and the interface/driver circuits 88. The output data latch 80 is realized using two D-type latches U11 and U14, as shown. Both devices, U11 and U14 are realized with commercially available 74HC273 IC devices. The interface/driver circuit 88 is realized using two commercially available IC's U15 and U12, as shown. Both U15 and U12 are, in the preferred embodiment, a ULN2003AN device, available from TI, NEC, or Intel.

As has been indicated previously, Appendix A contains the source code of the programs that are stored in the memory circuits of the control module 34. Given the hardware and operation description presented above, and including the component and configuration detail provided in FIG. 5, and with the source code listing of Appendix A, it is submitted that one skilled in the art could, without undue experimentation, practice the invention as claimed herein. Further, Appendix B contains representative source code listings of the controlling programs (software) utilized within the programming device 105 for use with an NEC or Olivetti portable computer. Again, it is submitted that one skilled in the art, given the above description of the hardware and this source code, could practice the claimed invention using any suitable portable computer without too much difficulty.

While the invention described herein has been desciibed with reference to a particular embodiment and application thereof, numerous variations and modifications could be made thereto by those skilled in the art without departing from the spirit and scope of the invention as claimed. Accordingly, the true scope of the invention should be determined with reference to the claims set forth below.

APPENDIX A

Program Listing for Control Module

```
*************************************************************
****                                                    ****
****    VOCALARM CONTROLLER PROGRAM                     ****
****                                                    ****
****    Copyright (c) [redacted] E. Grossheim          ****
****                                                    ****
****    written by Ed Grossheim                         ****
****  [redacted]                                        ****
****                                                    ****
****    edited by W. Rocky Hildebrandt                  ****
****  [redacted]                                        ****
****  [redacted]                                        ****
****  [redacted]         Speech added                    ****
****  [redacted]                                        ****
****  [redacted]                                        ****
****  [redacted]                                        ****
****  [redacted]       Installer Menu                   ****
*************************************************************

        TITLE   VOCALARM CONTROLLER PROGRAM -- 20 Sep 86
        Copyright (c) 1986 E. Grossheim
VERSD   EQU     20H                 ; dd -- Prog Version
VERSM   EQU     09H                 ; mm
VERSY   EQU     86H                 ; yy

        PAGE

;       RAM assignments

DRAM    EQU     20H                 ; Data RAM base
SSMPL   EQU     DRAM+0              ; Sensor sample (5 Bytes Ordered)
CSMPL   EQU     DRAM+1              ; Compare sample
BSN     EQU     DRAM+2              ; Bad sensor number
ASN     EQU     DRAM+3              ; Activated sensor #
ALCNT   EQU     DRAM+4              ; Alarm counter
PADTMR  EQU     DRAM+5              ; PAD timer
GLMSK   EQU     DRAM+6              ; Gnd Loop Mask
TASN    EQU     DRAM+7              ; Temporary ASN
WITMR   EQU     DRAM+8              ; Warning Indicator Tmr (2 Bytes)
DATPA   EQU     DRAM+10             ; Port A data (RAM copy)
DATPB   EQU     DRAM+11             ; Port B data (RAM copy)
DATPC   EQU     DRAM+12             ; Port C data (RAM copy)(2 Bytes Ordere
DATPD   EQU     DRAM+13             ; Port D data (RAM copy)
ASPH    EQU     DRAM+14             ; Alarm Speech Index
KEYTMR  EQU     DRAM+15             ; KEY timer
FLSH    EQU     DRAM+16             ; Flash tbl (5bytes)
AAF     EQU     DRAM+21             ; Auto Arm flags
ISBIT   EQU     DRAM+22             ; IS Data
TALKF   EQU     DRAM+23             ; Talk flags
SEPTV   EQU     DRAM+24             ; Speech entry point table vector
ETC     EQU     DRAM+25             ; Elapsed Time Cntr (5 bytes)
```

```
ETF      EQU  DRAM+30       ; ETC flags
SPHRAM   EQU  DRAM+31       ; Speech RAM Tbl (12 bytes)
LASN     EQU  DRAM+43       ; Last ASN
SMSK     EQU  DRAM+44       ; Sensor Msk for Alarm Cnt
SMSKM    EQU  DRAM+45       ; Sensor Msk for Motion
GP2      EQU  DRAM+45       ; General Purpose
GP1      EQU  DRAM+46       ; General Purpose
MSMPL    EQU  DRAM+47       ; Motion Sample (2 Bytes)
STACK    EQU  DRAM+49       ; Stack (9 Bytes)
TXTMR    EQU  DRAM+58       ; TX Timer
SENTMR   EQU  DRAM+59       ; Sensor Timer
SADRL    EQU  DRAM+60       ; Speech Data LB (4 Bytes Ordered)
SADRH    EQU  DRAM+61       ; Speech Data HB
SCNTL    EQU  DRAM+62       ; Speech data count LB
SCNTH    EQU  DRAM+63       ; Speech data count HB
NOVRAM   EQU  DRAM+64       ; NOVRAM Copy (32 Bytes -- END OF RAM)

         PAGE

;        Masks and ports

SENSOR   EQU  00            ; Sensor adr
SNORM    EQU  9FH           ; Sensor Normalize
NOVRM    EQU  01            ; Novram adr
SETIL    EQU  04            ; Set IL
RSTIL    EQU  FFH-SETIL     ; Rst IL
SETWI    EQU  20H           ; Set WI
RSTWI    EQU  FFH-SETWI     ; Rst WI
SETSH    EQU  03            ; Set Siren,Horn
RISH     EQU  F5H           ; Rst IS,Horn
RSTIS    EQU  F7H           ; Rst IS
SETLK    EQU  04H           ; Set lock
RSTLK    EQU  FFH-SETLK     ; Rst lock
SETULK   EQU  08H           ; Set unlock
RSTULK   EQU  FFH-SETULK    ; Rst unlock
SETPGR   EQU  10H           ; Set pager
RSTPGR   EQU  FFH-SETPGR    ; Rst pager
SETIK    EQU  10H           ; Set IK
ENIS     EQU  08            ; Enable IS
PORTA    EQU  00            ; Port A address
PORTB    EQU  01            ; Port B address
PORTC    EQU  02            ; Port C address
PORTD    EQU  03            ; Port D address
VSPRSH   EQU  20H           ; VSP Read Strobe Hi
VSPRSL   EQU  FFH-VSPRSH    ; VSP Read Strobe Lo
VSPWSH   EQU  C0H           ; VSP Wrt Strobe & SOE Hi
VSPWSL   EQU  FFH-VSPWSH    ; VSP Wrt Strobe & SOE Lo
VSPEN    EQU  40H           ; VSP on
VSPOFF   EQU  3FH           ; VSP off & VSP Adr MSB=0
SETAMP   EQU  40H           ; Power Amp on
SETSPKR  EQU  80H           ; SPKR on (Inside)
RSTSPKR  EQU  3FH           ; PA & spkr off
RSTSOE   EQU  7FH           ; Speech prom on
STBSON   EQU  1FH           ; VSP strobes on
STBSOFF  EQU  FFH-STBSON    ; VSP strobes off
SPHM1    EQU  E1H           ; Speech mode 1--PA en,1 wd,SPROM
SPHM2    EQU  D9H           ; Speech mode 2--PA en,PPROM Tbl
SPHM3    EQU  DBH           ; Speech mode 3--Spkr en,PPROM Tbl
SPHM4    EQU  BBH           ; Speech mode 4--Spkr en,RAM Tbl
SPHM5    EQU  EBH           ; Speech mode 5--Spkr en,SPROM,No Pwr I
SPHM6    EQU  F3H           ; Speech mode 6--Spkr en,1 wd,SPROM
SPHM7    EQU  5BH           ; Speech mode 7--Spkr en,PPROM Tbl,NO F
READ     EQU  87H           ; Read Cmd (Adr=0)
WRITE    EQU  83H           ; Wrt Cmd (Adr=0)
```

```
RCL     EQU     85H             ; Recall Cmd
STO     EQU     81H             ; Store Cmd
WREN    EQU     84H             ; Wrt Enable Cmd

        PAGE
;*****************************************************************
;*                                                               *
;*      Sensor Assignments                                       *
;*                                                               *
;*      no.             location                                 *
;*       0      Door                                             *
;*       1      Door*                                            *
;*       2      Trunk/hood*                                      *
;*       3      Window*                                          *
;*       4      Cover*                                           *
;*       5      Fog lights (G/L)                                 *
;*       6      Spape (ground loop)                              *
;*       7      Spare*  (Ultrasonic Motion)                      *
;*       8 -    Motion* = TO                                     *
;*                                                               *
;*****************************************************************

;*****************************************************************
;*                                                               *
;*      I/O Assignments                                          *
;*                                                               *
;*     Port A    Port B    Port C    Port D    Port 1            *
;*  0  Window1   Siren     VSMA00    VSMA08    NRDAT             *
;*  1  Window2   Horn        |         |       PMA12             *
;*  2  Lock      I.L.        |         |       VSMA14            *
;*  3  Unlock    I.S.        |         |       RDY*              *
;*  4  Pager     I.K.        |       VSMA12    (LSB)             *
;*  5  NRCE      W.I.        |       VSPRS*    BE                *
;*  6  PA        VSPEN       |       VSPWS*    BL                *
;*  7  Spkr      VSMA13    VSMA07    SPOE*     TS                *
;*                                                               *
;*           T1=IGN*          INT*=PAD*                          *
;*****************************************************************

;*****************************************************************
;*                                                               *
;*      Register Utilization                                     *
;*                                                               *
;*      R0      Pointer                 R0'     Pointer          *
;*      R1      Pointer                 R1'     Pointer          *
;*      R2      General                 R2'     General          *
;*      R3      General                 R3'       "              *
;*      R4      General                 R4'       "              *
;*      R5      Mode                    R5'       "              *
;*      R6      Timer (low, 20ms)       R6'     General          *
;*      R7      Timer (high, 5.12s)     R7'     Save A           *
;*                                                               *
;*****************************************************************

        PAGE
FILLTO  .MACRO  ARG1                    ; Define memory fill
        MACLIST OFF
        IFFALSE $<ARG1
        IFCLEAR
        MACLIST ON
        .MACEXIT
```

```
        ELSE
        DB      OFFH
        ENDIF
        FILLTO  ARG1
        .MACEND

IDL     .MACRO                          ; Define IDL
        JF1     $                       ; Wait for Intr
        CPL     F1
        MOVD    P7,A                    ; WDT Pulse
        .MACEND

        ORG     0
        JMP     INIT

;************************************************************
;*      TMINT  ---  Timer Interrupt Routine                 *
;*                                                          *
;*      Timer interrupts occur at 20 ms intervals           *
;*                                           (Stacks 2)     *
;************************************************************

        FILLTO  7
TMINT
        SEL     RB1                     ; Preserve all registers
        XCH     A,R7
        MOV     A,#6                    ; Re-init 20ms TMR (0-250)
        MOV     T,A
        CLR     F1                      ; Clr IDL
        CALL    INCET                   ; Inc Elapsed Time Cntr
        MOV     R0,#06                  ; Increment timer R6, R7
        INC     @R0
        MOV     A,@R0
        JNZ     TMINT1
        INC     R0
        INC     @R0
TMINT1                          ; Save IGN SW in R5
        MOV     R0,#05
        JT1     TMINT2                  ; Jump if IGN OFF
        MOV     A,#02H                  ; Set
        ORL     A,@R0
        JMP     TMINT3
TMINT2
        MOV     A,#0FDH                 ; Reset
        ANL     A,@R0
TMINT3
        MOV     @R0,A                   ; Save in R5
                                ; Warning indicator

        MOV     A,@R0                   ; Get mode (R5)
        CPL     A
        JB0     TMINT6                  ; Jump if NOT ARM
        MOV     R0,#WITMR               ; Ck ON time
        MOV     A,@R0
        JZ      TMINT5                  ; Jmp if 0
        MOV     A,#SETWI                ; WI ON
        CALL    SETPB
        INC     @R0                     ; (Dec)
        JMP     TMINT7
TMINT5
        INC     R0
        MOV     A,@R0                   ; Ck OFF time
        JZ      TMINT6                  ; Jmp if 0
        MOV     A,#RSTWI                ; WI OFF
        CALL    RSTPB
        INC     @R0                     ; (Dec)
```

```
        JMP     TMINT7
TMINT6
        MOV     R0,#NOVRAM+2            ; Ck for FAST LED
        MOV     A,@R0
        MOV     R0,#WITMR
        JB6     TMINT6A                 ; Jmp if SO
        MOV     @R0,#253                ; On 60ms
        INC     R0
        MOV     @R0,#230                ; Off 520ms
        JMP     TMINT7
TMINT6A
        MOV     @R0,#253                ; On 60ms
        INC     R0
        MOV     @R0,#250                ; Off 120ms
TMINT7                          ; Ind. lights flash
        CALL    FLSHIL
                                ; Check RCVR status
        MOV     R1,#TXTMR
        MOV     R0,#NOVRAM              ; Get chan #
        MOV     A,@R0
        MOV     R0,#05                  ; Mode (R5)
        ANL     A,#07
        JZ      TMINT7A                 ; Ignore chan=0
        ORL     A,#08                   ; KEY=1
        MOV     R4,A                    ; Temp save
        IN      A,P2                    ; Get Rcvr input
        SWAP    A
        ANL     A,#0FH
        XRL     A,R4
        JZ      TMINT8                  ; Jmp if Rcvr chan active & NO K
TMINT7A
        MOV     @R1,#00                 ; Clr TX active cntr
        JMP     TMINTB                  ; & Jmp if not active
TMINT8
        MOV     A,#25                   ; Check for Active = .5s
        XRL     A,@R1
        JNZ     TMINT9                  ; Jump if not
        MOV     A,@R0                   ; Get R5 mode
        ORL     A,#28H                  ; TX,TX/PAD=1
        MOV     @R0,A                   ; Save in R5 mode
TMINT9
        MOV     A,#150                  ; Ck for TX on for 3s (panic)
        XRL     A,@R1
        JNZ     TMINTA                  ; Jmp if NOT
        MOV     A,@R0                   ; Set panic bit in R5
        ORL     A,#04
        MOV     @R0,A
TMINTA
        MOV     A,#151
        XRL     A,@R1
        JZ      TMINTB                  ; Inc TX active cntr if <= 3s
        INC     @R1                     ; i.e. inhibit counting after 3s
TMINTB                          ; Check PAD status
        MOV     R1,#PADTMR              ; Ignore PAD while ARMED
        MOV     A,@R0                   ; --- UNLESS IGN ON ---
        CPL     A
        JB0     TMINTBC                 ; Jmp if NOT ARM
        JB1     TMINTBD                 ; Jmp if IGN NOT ON
        MOV     R0,#NOVRAM+3            ; Ck for PAD Enabled
        MOV     A,@R0
        CPL     A
        MOV     R0,#5
        JB6     TMINTC                  ; Jmp if NOT
TMINTBC
        JNI     TMINTC                  ; Jmp if PAD active
```

```
TMINTBD
        MOV     @R1,#00
        JMP     TMINTD
TMINTC
        MOV     A,#05                   ; Ck for Active=.1Sec
        XRL     A,@R1
        JNZ     TMINTCA                 ; Jmp if NOT
        MOV     A,@R0                   ; Get Mode
        ORL     A,#48H                  ; PAD,TX/PAD=1
        MOV     @R0,A                   ; Save in Mode
TMINTCA
        MOV     A,#06                   ; Inh INC if >.1Se
        XRL     A,@R1
        JZ      TMINTD
        INC     @R1
TMINTD                  ; IGN sw & PANIC determines I.S.
        MOV     A,@R0                   ; Get mode
        MOV     R1,#ISBIT
        JB1     TMINTE                  ; Jmp if IGN on
        JB2     TMINTE                  ; Jmp if PANIC
        MOV     @R1,#ENIS               ; En IS for ALARM
        JMP     TMINTF
TMINTE
        MOV     @R1,#00                 ; Disable IS for ALARM
TMINTF                  ; Get SENSOR data
        CALL    CKSEN
TMINTG                  ; Output speech data
        MOV     R0,#TALKF               ; Check for TALK EN flag
        MOV     A,@R0
        JB0     TMINTH                  ; Jump if off (1)
        CALL    RDVSP                   ; Get VSP status
        CPL     A
        JB6     TMINTH                  ; Jump if BL = 0
        CALL    WRVSP                   ; Output speech data byte
        CALL    INCADR
        JMP     TMINTG
TMINTH
        XCH     A,R7
        RETR

        PAGE
;**************************************************************
;*                                                            *
;*      INIT  ---  System Initialization                      *
;*                                                            *
;*                                         (Stacks 2)         *
;**************************************************************

INIT
        CALL    RSTOPT                  ; Reset outputs & Clr Flash Cnt:
        MOV     R0,#BSN                 ; Clear BSN
        MOV     @R0,A
        INC     R0                      ; Clear ASN
        MOV     @R0,A
        MOV     R0,#ASPH                ; Clr Alarm Speech Index
        MOV     @R0,A
        MOV     R0,#TALKF               ; TALK flags OFF (1)
        MOV     @R0,#FFH
        CALL    RSTTMR                  ; Zero timer
        MOV     T,A
        STRT    T                       ; Start timer & enable interr
        EN      TCNTI
INIT1
```

```
            MOVD    P7,A                    ; WDT Pulse
            MOV     A,#150                  ; Wait 3 sec
            XRL     A,R6
            JNZ     INIT1
            CALL    CLRET                   ; Clr E.T. Cntr (& DISABLE)
            SEL     MB1
            CALL    RECALL                  ; Move NOVRAM to ram
            JMP     DISARM

            PAGE

;********************************************************************
;*                                                                  *
;*      ARM  ---  Arm Routine                                       *
;*                                                      (Stacks 5)  *
;********************************************************************
            FILLTO  F0H
ARM
            SEL     MB1
            JMP     ARM00
ARM03
            MOV     A,#10                   ; Wait .2 Sec
            CALL    NIWAIT
            MOV     R2,#10                  ; Flash cnt
            MOV     R3,#2                   ; 40MS ON
            MOV     R4,#2                   ; 40MS OFF
            CALL    FLASH

            MOV     R0,#NOVRAM+7            ; Ck for Silent
            MOV     A,@R0
            JB0     ARM04                   ; Jmp if so
            MOV     R0,#TALKF
            MOV     @R0,#SPHM1              ;PA ON En,1 wd,Dir. Adr
            MOV     A,#56H                  ; Get Speech vector
            CALL    SPKEXT                  ; "...ARMED..."
            MOV     A,#50                   ; Wait 1 Sec
            CALL    WAIT
ARM04
            MOV     A,R5
            JB5     ARM7                    ; TX
            JB2     ARM9                    ; PANIC
            CPL     A
            JB4     ARM04A                  ; Jmp if NOT Man Arm
            MOV     R0,#NOVRAM
            MOV     A,@R0
            JB7     ARM05                   ; Jmp if Man Arm LOCK
            JMP     ARM06
ARM04A
            JB7     ARM05                   ; Jmp if NOT Auto Arm
            MOV     R0,#NOVRAM              ; Ck Auto Arm Lock
            MOV     A,@R0
            CPL     A
            JB6     ARM06                   ; Jmp if NOT
ARM05
            MOV     A,#SETLK                ; Set LOCK
            CALL    SETPA
            MOV     R0,#NOVRAM+1            ; Slow LOCK ?
            MOV     A,@R0
            JB4     ARM05A                  ; Jmp if SO
            MOV     A,#50                   ; 1 Sec
            JMP     ARM05B
ARM05A
            CLR.    A                       ; 5 Sec
ARM05B
```

```
         CALL    WAIT
         MOV     A,#RSTLK                    ; Rst LOCK
         CALL    RSTPA
ARM06
         SEL     MB1                         ; Windows UP
         JMP     ARM06A
ARM07
         MOV     R3,#150                     ; Loop counter = 3 Sec
         CLR     F1                          ; Set IDL
         CPL     F1
ARM1                                 ; Wait until LOCK + 3 Sec and D.L. OFF
                                     ; or 25 Sec max. to make active sensor
                                     ; report.  Watch for disarm, panic
         IDL
         MOV     A,R5                        ; Get mode
         JB5     ARM7                        ; TX
         JB2     ARM9                        ; PANIC
         DJNZ    R3,ARM1                     ; Jmp if < 3 Sec
         INC     R3                          ; R3 = 1
         MOV     A,#05
         XRL     A,R7
         JZ      ARM2                        ; Jump if > 25 Sec
         MOV     R0,#SSMPL                   ; D.L. off ?
         MOV     A,@R0
         ANL     A,#03
         JNZ     ARM1                        ; Jump if NOT
ARM2                         ;Ck for BAD Sensor
         MOV     R0,#MSMPL                   ; Get Motion Sample
         MOV     A,@R0
         INC     R0                          ; Save as Compare Sample
         MOV     @R0,A
         JZ      ARM2A                       ; Jmp if Motion = 0
         MOV     R0,#BSN                     ; Save BSN
         MOV     @R0,#11
ARM2A
         MOV     R0,#SSMPL                   ; Get sensor sample
         MOV     A,@R0
         INC     R0
         MOV     @R0,A                       ; Save as compare sample
         INC     R0
         JZ      ARM2B                       ; Jump if SSMPL = 0
         CALL    IDNUM                       ; Convert to #
         MOV     @R0,A                       ; Save BSN
ARM2B
         MOV     R0,#BSN                     ; Ck for BSN
         MOV     A,@R0
         JZ      ARM3                        ; Jmp if NONE
         CALL    EXTWNG                      ; "...WARNING..."
ARM|                         ;Ck for Activated Sensor
         CLR     F0                          ; Clr Pager Ck Inh Flag
         CLR     F1                          ; Set IDL
         CPL     F1
ARM5
         IDL
         JMP     KEY                         ; Ck for KEY
ARM5A
         JF0     ARM6                        ; Jmp if Ck already Made
         MOV     R0,#NOVRAM+2                ; Pager 10 Min Ck ?
         MOV     A,@R0
         CPL     A
         JB5     ARM6                        ; Jmp if NOT
         MOV     A,#115                      ; TO + 10 min?
         XRL     A,R7
         JNZ     ARM6                        ; Jmp if NOT
```

```
        MOV     A,#SETPGR               ; Pager on
        CALL    SETPA
        MOV     A,#00                   ; Wait 5 Sec
        CALL    WAIT
        MOV     A,#RSTPGR               ; Pager off
        CALL    RSTPA
        CPL     F0                      ; Set INH. Flag
ARM6
        MOV     A,R5
        JB5     ARM7                    ; TX
        CPL     A
        JB1     ARM6A                   ; Jmp if IGN OFF
        CPL     A
        JB6     ARM10                   ; PAD(if req'd) & IGN ON
ARM6A
        MOV     R0,#SSMPL               ; Check for sensor change
        MOV     A,@R0
        INC     R0
        XRL     A,@R0
        JZ      ARM6B                   ; Jump if none
        CALL    IDNUM                   ; Save Temp ASN
        MOV     R0,#TASN
        MOV     @R0,A
        JMP     ARM6C
ARM6B
        MOV     R0,#MSMPL               ; Ck for Motion Change
        MOV     A,@R0
        INC     R0
        XRL     A,@R0
        JZ      ARM5                    ; Jmp if NO Change
        MOV     R0,#TASN                ; Save Temp ASN
        MOV     @R0,#11                 ; ASN#
ARM6C
        SEL     MB1
        JMP     ARM6C1
ARM6D                   ; Alarm Return
        MOV     R0,#SSMPL               ; Replace compare sample with
        MOV     A,@R0                   ; current sensor sample
        INC     R0
        MOV     @R0,A
        JMP     ARM5
ARM7
        JMP     DISARM
ARM8                    ;Off to ALARM
        MOV     A,R5
        JB4     ARM8C                   ; Jump if manual arm
        CPL     A
        JB7     ARM8B                   ; Jmp if NOT A/A
        MOV     R0,#NOVRAM+1            ; Delay Entry ?
        MOV     A,@R0
        CPL     A
        JB2     ARM8B                   ; Jmp if NOT
ARM8C
        MOV     R0,#SSMPL               ; Check for door open
        MOV     A,@R0
        ANL     A,#03
        JNZ     ARM8H                   ; Jump if SO
        SEL     MB1
        JMP     ARM8D
ARM8H
        MOV     R0,#ASN                 ; Check for ALARM
        MOV     A,@R0
        JZ      ARM8A                   ; Jump if NONE
        CALL    EXTWNG                  ; "...WARNING..."
ARM8A
```

```
        CALL    CNTDN                   ; Count down
        JB3     ARM10                   ; TX/PAD
ARM8B
        MOV     R0,#ASN                 ; Ck for first ASN
        MOV     A,@R0
        JNZ     ARM9                    ; Jmp if NOT
        MOV     R1,#TASN                ; Save FIRST ASN for Disarm
        MOV     A,@R1
        MOV     R0,#ASN
        MOV     @R0,A
ARM9
        JMP     ALARM
ARM10
        SEL     MB1
        JMP     DSARMIN

        PAGE
;***************************************************************
;*                                                             *
;*      DISARM  ---  Disarm Routine                            *
;*                                          (Stacks 5)         *
;***************************************************************

        FILLTO  200H
DISARM
        SEL     MB1
        JMP     DSARM00
DSARM6                          ; IGN OFF (MENU RET)
        MOV     R3,#50                  ; Loop Counter = 1 Sec
        CLR     F1                      ; Set IDL
        CPL     F1
DSARM6A
        IDL
        JMP     KEY                     ; Ck KEY Active (0)
DSARM7
        MOV     A,R5
        JB1     DSARM14                 ; IGN ON
        JB5     DSARM17                 ; TX
        JB6     DSARM19                 ; PAD
        MOV     R0,#NOVRAM+8            ; Ck for VOCALARM OFF
        MOV     A,@R0
        CPL     A
        JB4     DSARM6                  ; Jmp if So
        MOV     A,R5
        JB2     DSARM18                 ; PANIC
        DJNZ    R3,DSARM6A
        MOV     R0,#AAF                 ; Ck for Make Report
        MOV     A,@R0
        JB3     DSARM10                 ; Jmp if so
DSARM9
        MOV     R0,#AAF
        MOV     A,#12                   ; TO + 1 MIN ?
        XRL     A,R7
        JNZ     DSARM9A                 ; Jump if NOT
        MOV     A,@R0                   ; Set IL off flag
        ORL     A,#01
        MOV     @R0,A
        CALL    RSTOPT                  ; I.L.&Flash OFF
DSARM9A
        MOV     A,@R0                   ; Ck I.L. off flag
        JB0     DSARM9B                 ; Jump if OFF
        MOV     A,#SETIL                ; I.L. ON
        CALL    SETPB
DSARM9B
```

```
        MOV     RO,#NOVRAM              ; Ck for Auto Arm Enabled
        MOV     A,@RO
        CPL     A
        JB5     DSARM6                  ; Jmp if not
        JFO     DSARM6                  ; Jmp if Auto Arm Inh.
        MOV     RO,#SSMPL               ; Door/Trunk Open ?
        MOV     A,@RO
        ANL     A,#07
        JZ      DSARM9D                 ; Jmp if NOT
        CALL    RSTTMR
DSARM9D
        MOV     A,#02                   ; Time=10s ?
        XRL     A,R7
        JNZ     DSARM6                  ; Jump if NOT
        MOV     A,R5                    ; Set Auto Arm Bit
        ORL     A,#80H
        MOV     R5,A
        JMP     ARM                     ; Jump to Auto Arm
DSARM14                 ; IGN ON
        CALL    RSTTMR                  ; Reset Timer
        MOV     RO,#AAF                 ; Set IL Off flag
        MOV     A,@RO
        ORL     A,#01
        ANL     A,#EFH                  ; 5 Sec flag OFF
        MOV     @RO,A
        CALL    RSTOPT                  ; IL & Flash OFF
        CLR     F1                      ; Set IDL
        CPL     F1
DSARM14A
        IDL
        MOV     A,R7                    ; Ck for 5 Sec
        XRL     A,#01
        JNZ     DSARM14C                ; Jmp if NOT
        MOV     A,@RO                   ; Set 5s Flag
        ORL     A,#10H
        MOV     @RO,A
DSARM14C
        MOV     A,R5
        JB5     DSARM17                 ; TX
        JB2     DSARMM                  ; PANIC
        JB6     DSARM19                 ; PAD
        JB1     DSARM14A                ; IGN ON
        MOV     A,#10                   ; Debounce
        CALL    WAIT
        JB1     DSARM14A                ; IGN ON
        MOV     RO,#NOVRAM+8            ; Ck for VOCALARM ON
        MOV     A,@RO
        JB4     DSARM14B                ; Jmp if SO
DSARMM  ;Menu Return FOR Man Arm if Vocalarm OFF
        MOV     R5,#00                  ; Clr TX,PANIC
        MOV     RO,#TALKF
        MOV     @RO,#SPHM3              ; Spkr en,PPROM
        MOV     A,#SPH13&FFH
        CALL    SPKEXT                  ; "... VOCALARM DISABLED ..."
        JMP     DSARM6
DSARM14B
        MOV     RO,#AAF                 ; Jmp if >=5sec
        MOV     A,@RO
        JB4     DSARM15
                        ;IGN ON < 5SEC
        JFO     DSARM6                  ; Jmp if NOT Auto Arm Enable
        CPL     FO                      ; Disable Auto Arm
        MOV     RO,#TALKF
        MOV     @RO,#SPHM3              ; Spkr en,PPROM
```

```
        MOV     A,#SPH02&0FFH
        CALL    SPKEXT                  ; "...AUTOMATIC ARMING DISABLED
        JMP     DSARM6
DSARM15                 ; IGN ON >= 5 Sec
        IDL
        MOV     A,R5
        JB5     DSARM17                 ; TX
        JB6     DSARM15A                ; PAD
        JB1     DSARM14                 ; IGN ON
        MOV     R0,#SSMPL               ; Ck Doors
        MOV     A,@R0
        ANL     A,#3
        JZ      DSARM15                 ; Jmp if NOT
        SEL     MB1                     ; Ck for IGN KEY
        JMP     DSARMK
DSARMK3
        MOV     R0,#NOVRAM              ; Ck for Auto Arm Enabled
        MOV     A,@R0
        CPL     A
        JB5     DSARM16                 ; Jmp if not
        CLR     [illegible]             ; Auto Arm Enable
        CALL    STTMR                   ; [illegible] Timer
        MOV     R0,#NOVRAM+1            ; Ck for REMINDER
        MOV     A,@R0
        CPL     A
        JB0     DSARM6                  ; Jmp if NONE
        MOV     R0,#TALKF
        MOV     @R0,#SPHM3              ; Spkr en,PPROM
        MOV     A,#SPH01&0FFH           ; "...AUTOMATIC ARMING ENABLED.
        CALL    SPKEXT
        JMP     DSARM6
DSARM15A
        JMP     DSARM19A
DSARM16
        MOV     R0,#NOVRAM+1            ; Ck for REMINDER
        MOV     A,@R0
        CPL     A
        JB0     DSARM6                  ; Jmp if NONE
        MOV     R0,#TALKF
        MOV     @R0,#SPHM3              ; Spkr on en,ROM
        MOV     A,#SPH04&0FFH           ; Get Speech Vector
        CALL    SPKEXT                  ; "...ARM VOCALARM..."
        JMP     DSARM6
DSARM10
        JMP     MKRPT                   ; Make REPORT
DSARM18
        JMP     ALARM
DSARM17
        MOV     R0,#NOVRAM+8            ; Ck for VOCALARM ON
        MOV     A,@R0
        JB4     DSARM17A                ; Jmp if SO
        MOV     A,R5
        JB1     DSARMM                  ; Jmp if IGN ON
        MOV     R5,#00
        MOV     R0,#TALKF               ; PA,PPROM
        MOV     @R0,#SPHM2
        MOV     A,#SPH16&FFH            ; ...VOCALARM DISABLED...(low[illegible]
        CALL    SPKEXT
        JMP     DSARM6
DSARM19
        JMP     DSARM19X
DSARM17A
        MOV     A,R5                    ; Clr Auto Arm bit
        JB1     DSARMM                  ; NO ARM if IGN ON
        ANL     A,#7FH
```

```
                MOV     R5,A
                JMP     ARM
DSARM19X
                MOV     R0,#AAF             ; Set IL OFF Flag
                MOV     @R0,#01             ; Ret to DSARM6
                JMP     DSARM19B
DSARM19A
                MOV     R0,#AAF
                MOV     @R0,#03             ; Ret to DSARM15
DSARM19B
                CALL    RSTOPT              ; IL & Flash OFF
                SEL     MB1
                JMP     MENU                ; Go do MENU

                PAGE
;****************************************************************
;*                                                              *
;*      ALARM    ---    Alarm Routine                           *
;*                                              (Stacks 4)      *
;****************************************************************
ALARM
                CALL    RSTOUT              ; Rst TX,PAD,TX/PAD & outputs
                CALL    IGNKILL             ; Set IGN KILL if IGN OFF
                MOV     R0,#ETF             ; Set E.T. Cntr enable bit
                MOV     @R0,#01
                MOV     R0,#NOVRAM+1        ; Rotate ?
                MOV     A,@R0
                CPL     A
                JB3     ALARM1              ; Jmp if NOT
                MOV     R0,#ASPH            ; Inc Alarm Speech Index
                MOV     A,@R0
                ADD     A,#5
                MOV     @R0,A
                ADD     A,#0-11
                JNC     ALARM1              ; Jmp if <=10
                MOV     @R0,#0
ALARM1
                MOV     R2,#100             ; Flash Cnt(>1MIN)
                MOV     R3,#12              ; ON .25S
                MOV     R4,#25              ; OFF .5S
                CALL    FLASH
                MOV     R2,#20              ; Set loop count (1min)
ALARM2
                MOV     A,#RSTIS            ; Rst IS
                CALL    RSTPB
                MOV     R0,#ISBIT           ; Update IS
                MOV     A,@R0
                ORL     A,#SETSH            ; Set Siren,Horn
                CALL    SETPB
                SEL     MB1
                JMP     ALARM2A
ALARM2B
                MOV     A,#10               ; Wait .2 Sec
                CALL    NIWAIT
                JB5     ALARM9              ; TX
                CPL     A
                JB1     ALARM3              ; Jmp if IGN OFF
                CPL     A
                JB6     ALARM10             ; PAD(if req'd) & IGN ON
ALARM3
                MOV     A,#RISH             ; Rst IS,HORN
                CALL    RSTPB
                MOV     R0,#ISBIT
                MOV     A,@R0               ; Update IS
                CALL    SETPB
```

```
        MOV     R0,#TALKF
        MOV     @R0,#SPHM2              ; PA En,PPROM
        MOV.    A,#SPH20&FFH            ; Get speech vector
        MOV     R0,#ASPH                ; Add Index
        ADD     A,@R0
        CALL    SPKEXT                  ; "...      ..."
                        ; Pager timer
        MOV     A,R5
        JB2     ALARM7                  ; Jmp if PANIC
        MOV     A,R2
        ADD     A,#0-17
        JC      ALARM6                  ; Jump for pager ON (+)
        MOV     A,R2
        ADD     A,#0-13
        JC      ALARM5                  ; Jump for pager OFF

        MOV     A,R2
        ADD     A,#0-09
        JC      ALARM6                  ; Jump for pager ON
ALARM5
        MOV     A,#RSTPGR               ; Pager OFF
        CALL    RSTPA
        JMP     ALARM7
ALARM6
        MOV     A,#SETPGR               ; Pager ON
        CALL    SETPA

ALARM7
        DJNZ    R2,ALARM2               ; Repeat for 1 min.
        MOV     A,R5
        JB2     ALARM8                  ; Jmp to DISARM if PANIC
        CALL    RSTOPT                  ; Rst Outputs
        CALL    IGNKILL
        JMP     ARM6D
ALARM8
        MOV     R0,#AAF                 ; Set NO UNLOCK flag
        MOV     @R0,80H
ALARM9
        JMP     DISARM
ALARM10
        JMP     ARM10

        PAGE
;*****************************************************************
;*                                                               *
;*      SETPA  ----  Set PORT A data                             *
;*                                                               *
;*      A contains mask                                          *
;*                                                               *
;*      destroys R1                                              *
;*                                                               *
;*****************************************************************

SETPA
        MOV     R1,#GP1                 ; Temp Save A
        MOV     @R1,A
        MOV     R1,#NOVRAM+2            ; Get EN Msk
        MOV     A,@R1
        ORL     A,#E0H                  ; Msk Unused Bits
        MOV     R1,#GP1                 ; Combine with A
        ANL     A,@R1

        MOV     R1,#DATPA
        ORL     A,@R1
```

```
            MOV     @R1,A
            MOV     R1,#PORTA
            MOVX    @R1,A
            RET
```

;*****************************************************************
;*                                                               *
;*      RSTPA   ---   Reset PORT A data                          *
;*                                                               *
;*      A contains mask                                          *
;*                                                               *
;*      destroys R1                                              *
;*                                                               *
;*****************************************************************

```
RSTPA
            MOV     R1,#DATPA
            ANL     A,@R1
            MOV     @R1,A
            MOV     R1,#PORTA
            MOVX    @R1,A
            RET
```

;*****************************************************************
;*                                                               *
;*      SETPB   ---   Set PORT B data                            *
;*                                                               *
;*      A contains mask                                          *
;*                                                               *
;*      destroys R1                                              *
;*                                                               *
;*      (NO IDL)                                                 *
;*                                                               *
;*****************************************************************

```
SETPB
            MOV     R1,#GP1         ; Temp Save A
            MOV     @R1,A
            MOV     R1,#NOVRAM+3    ; Get EN Msk
            MOV     A,@R1
            ORL     A,#C0H          ; Msk Unused Bits
            MOV     R1,#GP1         ; Combine with A
            ANL     A,@R1

            MOV     R1,#DATPB
            ORL     A,@R1
            MOV     @R1,A
            MOV     R1,#PORTB
            MOVX    @R1,A
            RET
```

;*****************************************************************
;*                                                               *
;*      RSTPB   ---   Reset PORT B data                          *
;*                                                               *
;*      A contains mask                                          *
;*                                                               *
;*      destroys R1                                              *
;*                                                               *
;*      (NO IDL)                                                 *
;*                                                               *
;*****************************************************************

```
RSTPB
            MOV     R1,#DATPB
            ANL     A,@R1
            MOV     @R1,A
```

```
        MOV     R1,#PORTB
        MOVX    @R1,A
        RET

;****************************************************************
;*                                                              *
;*      RSTTMR  ---  Reset timer R6, R7                         *
;*                                                              *
;*      no inputs                                               *
;*                                                              *
;*      destroys A                                              *
;*                                                              *
;****************************************************************

RSTTMR
        CLR     A
        MOV     R6,A
        MOV     R7,A
        RET

;****************************************************************
;*                                                              *
;*      RSTOUT  ---  Reset TX,PAD,TX/PAD,Flash cnt,outputs      *
;*                                                              *
;*      no inputs                                               *
;*                                                              *
;*      destroys A,(R1)                                         *
;*                                                              *
;****************************************************************

RSTOUT
        MOV     A,R5
        ANL     A,#97H                  ; Rst TX,PAD,TX/PAD
        MOV     R5,A

;****************************************************************
;*                                                              *
;*      RSTOPT  ---  Reset ports A-D & Flash Cnt                *
;*                                                              *
;*      no inputs                                               *
;*                                                              *
;*      destroys A,R1                                           *
;*                                              (Stacks 1)      *
;****************************************************************

RSTOPT
        CLR     A
        MOV     R1,#FLSH                ; Rst Flash Cntr
        MOV     @R1,A
        CALL    RSTPA
        CALL    RSTPB
        CALL    OUTPC
        CALL    RSTPD
        RET

;****************************************************************
;*                                                              *
;*      IGNKILL  ---  Ignition Kill                             *
;*                                                              *
;*      no inputs                                               *
;*                                                              *
;*      destroys A, R1                                          *
;*                                              (Stacks 1)      *
;****************************************************************
```

```
IGNKILL
        MOV     A,R5
        JB1     IGNKILL1
        MOV     A,#SETIK
        CALL    SETPB
IGNKILL1
        RET

;*******************************************************************
;*                                                                 *
;*      WAIT    ---   Wait 20 ms to 5 Sec                          *
;*                                                                 *
;*      A contains wait number                                     *
;*                                                                 *
;*      destroys A, R1                                             *
;*                                                                 *
;*******************************************************************

WAIT
        MOV     R1,A                    ; Loop cntr
        CLR     F1                      ; Set IDL
        CPL     F1
WAIT1
        IDL
        MOV     A,R5                    ; Get mode
        JB5     WAIT2                   ; TX
        JB2     WAIT2                   ; PANIC
        DJNZ    R1,WAIT1
WAIT2
        RET                             ; Mode in A

;*******************************************************************
;*                                                                 *
;*      NIWAIT  ---   Noninterruptable wait                        *
;*                                                                 *
;*      A contains wait #                                          *
;*      destroys R1                                                *
;*                                                                 *
;*******************************************************************

NIWAIT
        MOV     R1,A
        CLR     F1                      ; Set IDL
        CPL     F1
NIWAIT1
        IDL
        DJNZ    R1,NIWAIT1
        MOV     A,R5
        RET                             ; Mode in A

        PAGE

;*******************************************************************
;*                                                                 *
;*      SPKEXT  ---   Speak External                               *
;*                    VSP power ON, Reset command, Speak Ext command
;*                                                                 *
;*      Enter with A = speech vector / SEP#                        *
;*                                                                 *
;*      destroys A, R0, R1, R3, R4                                 *
;*                                                        (Stacks 3)
;*******************************************************************

        FILLTO  400H
```

```
SPKEXT
        MOV     R0,#SEPTV           ; Save speech vector
        MOV     @R0,A
SPKEXTX
        MOV     A,#STBSOFF          ; SPOE*,RS*,WS*=1
        CALL    SETPD
        MOV     A,#VSPEN            ; VSP Pwr on
        CALL    SETPB
        MOV     A,#2                ; Wait > 15 ms for power up
        CALL    NIWAIT
                                    ; VSP Reset
        MOV     A,#9FH              ; RS*,WS*=0
        CALL    RSTPD
        MOV     A,#STBSOFF          ; RS*,WS*=1
        CALL    SETPD
        MOV     A,#00               ; VSP RST Cmd
        CALL    OUTSEP
        CALL    WRVSP
                                    ; PA / SPKR ON
        MOV     R0,#TALKF
        MOV     A,@R0
        JB1     SPKEXT1A            ; Jump if PA NOT Enabled
        MOV     A,#SETAMP
        CALL    SETPA
SPKEXT1A
        MOV     A,@R0
        JB2     SPKEXT2             ; Jmp if inside Spkr NOT enable
        MOV     A,#SETSPKR
        CALL    SETPA
        MOV     A,#5                ;Wait .1 sec
        CALL    WAIT
                                    ; VSP SPKEXT cmd
SPKEXT2
        MOV     A,R5                ; Ck for TX active (on wd bou
        JB5     SPKEXT5             ; TX
        MOV     A,#01               ; SPK EXT command
        CALL    OUTSEP              ; Output addr
        CALL    WRVSP               ; Output command
                                    ; Start speech
        MOV     R0,#SEPTV           ; Get speech vector / SEP#
        MOV     R1,#TALKF
        MOV     A,@R1
        CPL     A
        JB5     SPKEXT2B            ; Jmp if PPROM mode
        JB6     SPKEXT2A            ; Jmp if RAM mode
        MOV     A,@R0               ; DIRECT mode (SPROM)
        JMP     SPKEXT2D
SPKEXT2A                            ; Get SEP# from RAM
        MOV     A,@R0               ; Get RAM Data
        MOV     R1,A
        MOV     A,@R1               ; Get SEP#
        JMP     SPKEXT2C
SPKEXT2B                            ; Get SEP# from PROG PROM
        MOV     A,@R0
        MOVP    A,@A
SPKEXT2C
        INC     @R0
SPKEXT2D
        JZ      SPKEXT4A            ; Jump if end of speech
        CALL    OUTSEP              ; Output addr
        MOV     R4,#09              ; Loop Counter
SPKEXT3A
        CALL    WRVSP               ; Output first 9 data bytes
        CALL    INCADR              ; (T.S. = 1)
```

```
        DJNZ    R4,SPKEXT3A
        MOV     R0,#TALKF               ; TALK EN flag ON
        MOV     A,@R0
        ANL     A,#FEH
        MOV     @R0,A
        CPL     A
        MOV     R4,A                    ; Temp save
        CLR     F1                      ; Set IDL
        CPL     F1
SPKEXT4
        IDL                             ; Wait for T.S. = 0
        CALL    RDVSP
        JB7     SPKEXT4
        MOV     A,R4                    ; Get TALKF
        JB4     SPKEXT6                 ; 1 Wd NO PWR DN
        JB3     SPKEXT5                 ; 1 Wd PWR DN
        JMP     SPKEXT2
SPKEXT4A
        MOV     R0,#TALKF
        MOV     A,@R0
        CPL     A
        JB7     SPKEXT6                 ; Skip pwr dn
SPKEXT5
        CALL    VSPPD                   ; VSP power down
SPKEXT6
        MOV     A,R5
        RET                             ; Mode in A

        ;Speech Entry Point Table Vectors
        ; (same page as SPKEXT)
SPH01
        DB      06                      ; AUTOMATIC
        DB      59                      ; ARMING
        DB      08                      ; ENABLED
        DB      0
SPH02
        DB      06                      ; AUTOMATIC
        DB      59                      ; ARMING
        DB      07                      ; DISABLED
        DB      0
SPH03
        DB      4EH                     ; WARNING
        DB      0
SPH04
        DB      13                      ; PLEASE
        DB      10                      ; ARM
        DB      12                      ; VOCALARM
        DB      0
SPH05
        DB      17                      ; CHECK
        DB      FFH                     ; NAME flag
        DB      0
SPH06
        DB      FFH                     ; NAME flag
        DB      19                      ; VIOLATION
        DB      0
SPH07
        DB      57                      ; NO
        DB      4                       ; REPORT
        DB      58                      ; AVAILABLE
        DB      0
SPH08
        DB      4                       ; REPORT
        DB      0
```

```
SPH09
        DB      29                      ; MANUAL
        DB      10                      ; ARM
        DB      0
SPH10
        DB      59H                     ; SILENT
        DB      0
SPH11
        DB      58H                     ; TEST
        DB      0
SPH12
        DB      12                      ; VOCALARM
        DB      0
SPH13
        DB      12                      ; VOCALARM
        DB      07                      ; DISABLED
        DB      0
SPH14
        DB      08,0                    ; (TEST) ENABLED
SPH15
        DB      58H,07,0                ; TEST DISABLED
SPH16
        DB      50H,52H,0               ; VOCALARM DISABLED (low)
SPH17
        DB      55H,0                   ; T/H
SPH18
        DB      55H,07,0                ; T/H DISENGAGED
SPH19
        DB      08,0                    ; (T/H) ENGAGED
SPH20
        DB      53,54,55,56,0           ; I'VE BEEN TAMPERED WITH
SPH21
        DB      67,68,69,00,0           ; VEHICLE SECURITY VIOLATION
SPH22
        DB      05,05,05,00,0           ; BURGLAR BURGLAR BURGLAR
SPH23
        DB      23,18,0                 ; WINDOW SENSOR

;**********************************************************
;*                                                       *
;*      MOVTBL--Subroutine to move prog rom tbl to ram   *
;*                  (Same pg as SPH__ TBL)               *
;*      Enter with R1=Source (SPH   TBL ADR)             *
;*                      A=ASN or BSN value               *
;*                                                       *
;*      destorys A,R0,R1,R3,R4                           *
;**********************************************************

MOVTBL
        MOV     R4,A                    ; Temp save A
        MOV     R0,#SPHRAM              ; Dest.-- RAM TBL
MOVTBL1
        MOV     A,R1                    ; Get SEP# from PPROM Tbl
        MOVP    A,@A
        CPL     A                       ; Ck for sensor name
        JNZ     MOVTBL2                 ; Jmp if NOT

        MOV     A,R0                    ; Temp Save
        MOV     R3,A
        MOV     A,R4                    ; Ck for T/H
        XRL     A,#5
        JNZ     MOVTBL1A                ; Jmp if NOT
        MOV     R0,#NOVRAM+1            ; Ck for Hood
        MOV     A,@R0
        CPL     A
```

```
        JB7     MOVTBL1A                        ; Jmp if NOT
        MOV     A,R3                            ; Restore
        MOV     R0,A
        MOV     A,#55H                          ; Hood SEP#
        CPL     A
        JMP     MOVTBL2
MOVTBL1A
        MOV     A,R3                            ; Restore
        MOV     R0,A

        MOV     A,R4                            ; Calc sensor name SEP#
        ADD     A,#20-3
        CPL     A
MOVTBL2
        CPL     A
        MOV     @R0,A                           ; Save in RAM TBL
        JZ      MOVTBL3                         ; Ck for End
        INC     R1                              ; Next ROM loc
        INC     R0                              ; Next RAM loc
        JMP     MOVTBL1
MOVTBL3
        RET

        PAGE
;**************************************************************
;*                                                            *
;*      OUTSEP  ---  Get & Output Speech Entry Point          *
;*                                                            *
;*      A contains SEP #                                      *
;*                                                            *
;*      destroys A, R0,(R1),R3,R4                             *
;*                                              (Stacks 2)    *
;**************************************************************

        FILLTO 500H
OUTSEP
        MOV     R0,#7                           ; Index into SEP table
        CALL    MULT
        CALL    OUTPC                           ; LB
        MOV     A,R4
        CALL    OUTPD                           ; HB
        MOV     A,#7FH                          ; Insure A13=0
        CALL    RSTPB
                        ; Get SEP & Byte cnt
        MOV     R4,#03                          ; Loop cntr
        MOV     R0,#SADRL                       ; Point to RAM storage
        CALL    INCSA1                          ; Read speech prom
OUTSEP1
        SWAP    A                               ; Make LN
        MOV     R3,A                            ; Temp save
        CALL    INCSA
        ORL     A,R3                            ; Combine
        MOV     @R0,A                           ; Save
        INC     R0                              ; Next
        CALL    INCSA                           ; Get LN
        DJNZ    R4,OUTSEP1
        SWAP    A                               ; Save cnt HN
        MOV     @R0,A
                        ; Output SEP
        MOV     R0,#SADRL                       ; LB
        MOV     A,@R0
        CALL    OUTPC                           ; Output
        INC     R0                              ; HB
        MOV     A,@R0
        CALL    OUTPD                           ; Output
```

```
        MOV     A,@R0                   ; Output A13
        JB5     OUTSEP2
        MOV     A,#7FH                  ; A13=0
        CALL    RSTPB
        RET
OUTSEP2
        MOV     A,#80H                  ; A13=1
        CALL    SETPB
        RET

;*************************************************************
;*                                                           *
;*      OUTPD -- Output to port D                            *
;*                                                           *
;*      A contains data                                      *
;*                                                           *
;*      destroys R1                                          *
;*                                                           *
;*      (NO IDL)                                             *
;*************************************************************

OUTPD
        MOV     R1,#PORTD
        ORL     A,#E0H                  ; Control=1
        MOVX    @R1,A                   ; Output
        MOV     R1,#DATPD               ; Save in ram
        MOV     @R1,A
        RET

;*************************************************************
;*                                                           *
;*      MULT -- Multiply                                     *
;*                                                           *
;*      A contains #, R0=X                                   *
;*      Return with R4=HB, R3=A=LB                           *
;*                                                           *
;*      destroys A,R0,R1,R3,R4                               *
;*                                                           *
;*************************************************************

MULT
        DEC     R0
        MOV     R4,#00
        MOV     R1,A                    ; R1=#
MULT1
        ADD     A,R1                    ; A=Accumulated#
        MOV     R3,A                    ; Temp save LB
        CLR     A
        ADDC    A,R4
        MOV     R4,A                    ; Save HB
        MOV     A,R3                    ; Get LB
        DJNZ    R0,MULT1
        RET

;*************************************************************
;*                                                           *
;*      INCADR  ---  Increment Speech Data Address           *
;*                   and Decrement Byte Counter              *
;*                                                           *
;*      destroys A, R0,R1                                    *
;*                                                           *
;*      (NO IDL)                              (Stacks 2)     *
;*************************************************************

INCADR
```

```
        MOV     R1,#SADRL               ; Get Lo adr
        INC     @R1                     ; Inc
        MOV     A,@R1
        CALL    OUTPC                   ; Output
        JNZ     INCADR1                 ; Jump if Hi addr not affecte
        MOV     R1,#SADRH               ; Get Hi adr
        INC     @R1                     ; Inc
        MOV     A,@R1
        CALL    OUTPD                   ; Output
        ANL     A,#1FH                  ; Ck for A13 goto 1
        JNZ     INCADR1                 ; Jmp if NOT
        MOV     A,#80H                  ; Set A13
        CALL    SETPB
INCADR1                 ; Decrement counter
        MOV     R0,#SCNTL               ; Get count Lo byte
        MOV     A,@R0
        DEC     A
        MOV     @R0,A
        JZ      INCADR2                 ; Jump if Lo byte = 0
        XRL     A,#FFH
        JNZ     INCADR3                 ; Jump if Lo byte <> FF
        INC     R0                      ; Get Hi count and decrement
        MOV     A,@R0
        DEC     A
        MOV     @R0,A
        RET
INCADR2
        INC     R0                      ; Check for count = 0
        MOV     A,@R0
        JNZ     INCADR3                 ; Jump if NOT
        MOV     R0,#TALKF               ; Reset TALK Enable flag
        MOV     A,@R0
        ORL     A,#01
        MOV     @R0,A
INCADR3
        RET

;***********************************************************
;*                                                         *
;*      INCSA ---  Increment Speech Prom Address           *
;*                                                         *
;*      destroys A,R1                                      *
;*                                                         *
;*                                          (Stacks 1)     *
;***********************************************************

INCSA
        MOV     R1,#DATPC               ; Get Lo adr
        MOV     A,@R1
        INC     A                       ; Inc
        CALL    OUTPC                   ; Output
        JNZ     INCSA1                  ; Jump if Hi addr not affected
        INC     R1                      ; Get Hi adr
        MOV     A,@R1
        INC     A                       ; Inc
        CALL    OUTPD                   ; Output
        ANL     A,#1FH                  ; Ck for A13 goto 1
        JNZ     INCSA1                  ; Jmp if NOT
        MOV     A,#80H                  ; Set A13
        CALL    SETPB
INCSA1
        MOV     A,#RSTSOE               ; Speech Prom ON
        CALL    RSTPD
        IN      A,P1                    ; Get data
        ANL     A,#F0H                  ; Zero LN
```

```
        RET
;****************************************************************
;*                                                              *
;*      WRVSP   ---   Write Speech Data to VSP                  *
;*                                                              *
;*      destroys A, R0, R1                                      *
;*                                                              *
;*      (NO IDL)                                   (Stacks 1)   *
;****************************************************************

WRVSP
        MOV     R0,#100                 ;Init Time Out
        MOV     A,#VSPWSL               ; WS*,SOE*=0
        CALL    RSTPD
        MOV     A,#40H                  ; WS*=1
        CALL    SETPD
        MOV     A,#VSPWSH               ; WS*,SOE*=1
        CALL    SETPD
WRVSP1
        DEC     R0                      ;Ck time out
        MOV     A,R0
        JZ      WRVSP3                  ;Jmp if SO
        IN      A,P1                    ; Wait for RDY* = 0
        JB3     WRVSP1
WRVSP3
        RET
;****************************************************************
;*                                                              *
;*      RDVSP   -   Read VSP status                             *
;*                                                              *
;*      no inputs                                               *
;*                                                              *
;*      returns status in A                                     *
;*                                                              *
;*      destroys R0, R1                                         *
;*                                                              *
;*      (NO IDL)                                   (Stacks 1)   *
;****************************************************************

RDVSP
        MOV     R0,#100                 ;Init Time Out
        MOV     A,#VSPRSL               ; RS* = 0
        CALL    RSTPD
RDVSP1
        DEC     R0                      ;Ck time out
        MOV     A,R0
        JNZ     RDVSP2                  ;Jmp if NOT
        MOV     A,#20H                  ;All pass
        JMP     RDVSP3
RDVSP2
        IN      A,P1                    ; Wait for RDY* = 0
        JB3     RDVSP1
RDVSP3
        MOV     R0,A                    ; Temp save status
        MOV     A,#VSPRSH               ; RS* = 1
        CALL    SETPD
        MOV     A,R0
        RET

;****************************************************************
;*                                                              *
;*      IDNUM   ---   Convert ID to number                      *
;*                                                              *
;*      Enter with A = ID                                       *
```

```
;*                                                            *
;*          Exit with A = number                              *
;*                                                            *
;*************************************************************

IDNUM                                 ; Order of JMPs sets sensor priority
            JZ        IDNUM8
            JB0       IDNUM0
            JB1       IDNUM1
            JB2       IDNUM2
            JB3       IDNUM3
            JB4       IDNUM4
            JB5       IDNUM5
            JB6       IDNUM6
            JB7       IDNUM7
IDNUM0
            MOV       A,#03                      ; Door (1)
            RET
IDNUM1
            MOV       A,#04                      ; Door (0)
            RET
IDNUM2
            MOV       A,#05                      ; Trunk/hood(0)
            RET
IDNUM3
            MOV       A,#06                      ; Window(0)
            RET
IDNUM4
            MOV       A,#07                      ; Cover(0)
            RET
IDNUM5
            MOV       A,#08                      ; Fog(1)
            RET
IDNUM6
            MOV       A,#09                      ; Spare(1)
            RET
IDNUM7
            MOV       A,#10                      ; Spare (0)
IDNUM8
            RET

            PAGE

;*************************************************************
;*                                                            *
;*          VSPPD  ---  VSP Power Down                        *
;*                                                            *
;*          no inputs                                         *
;*                                                            *
;*          destroys A, R1                                    *
;*                                                            *
;*                                              (Stacks 1)    *
;*************************************************************

            FILLTO 600H
VSPPD
            MOV       A,#10                      ; Wait .2s
            CALL      NIWAIT
            MOV       A,#RSTSPKR                 ; PA,Inside spkr OFF
            CALL      RSTPA
            MOV       A,#5                       ; Wait for Rly
            CALL      NIWAIT
            MOV       A,#VSPOFF                  ; VSPEN OFF (VSP MSB=0)
            CALL      RSTPB
            MOV       A,#5                       ; Wait .1S
```

```
        CALL    NIWAIT
        CLR     A                       ; SOE*,RS*,WS*,ADR=0
        CALL    OUTPC
        CALL    RSTPD
        MOV     R1,#TALKF               ; Insure TALK flags OFF (1)
        MOV     @R1,#0FFH
        RET

;*************************************************************
;*                                                           *
;*      SETPD  ---  Set PORT D Data                          *
;*                                                           *
;*      A contains mask                                      *
;*                                                           *
;*      destroys R1                                          *
;*                                                           *
;*************************************************************

SETPD
        MOV     R1,#DATPD               ; Get and update data
        ORL     A,@R1
        MOV     @R1,A
        MOV     R1,#PORTD               ; Output
        MOVX    @R1,A
        RET

;*************************************************************
;*                                                           *
;*      RSTPD  ---  Reset PORT D Data                        *
;*                                                           *
;*      A contains mask                                      *
;*                                                           *
;*      destroys R1                                          *
;*                                                           *
;*************************************************************

RSTPD
        MOV     R1,#DATPD               ; Get and update data
        ANL     A,@R1
        MOV     @R1,A
        MOV     R1,#PORTD               ; Output
        MOVX    @R1,A
        RET

;*************************************************************
;*                                                           *
;*      OUTPC  ---  Output to PORT C                         *
;*                                                           *
;*      A contains data                                      *
;*                                                           *
;*      destroys R1                                          *
;*                                                           *
;*      (NO IDL)                                             *
;*************************************************************

OUTPC
        MOV     R1,#PORTC               ; Output
        MOVX    @R1,A
        MOV     R1,#DATPC               ; Save in RAM
        MOV     @R1,A
        RET

;*************************************************************
;*                                                           *
;*      EXTWNG  ---  External Warning                        *
```

```
;*                                                               *
;*      destroys A,(R0),R1,R2,R3,R4                              *
;*                                                  (Stacks 4)   *
;****************************************************************
        EXTWNG
                MOV     R2,#35                  ; Flash Cnt (7s)
                MOV     R3,#4                   ; ON Time 80ms
                MOV     R4,#6                   ; OFF Time 120ms
                CALL    FLASH

                MOV     R1,#TALKF               ; PA En,PPROM Tbl
                MOV     @R1,#SPHM2
                MOV     A,#SPH03&FFH            ; Get Speech Vector
                CALL    SPKEXT                  ; "...WARNING..."
                RET

;****************************************************************
;*                                                               *
;*      CNTDN    ---     Count Down                              *
;*                                                               *
;*      destroys A, R0, R2, (R1), (R3), (R4)                     *
;*                                                  (Stacks 4)   *
;****************************************************************
        CNTDN
                MOV     R0,#SSMPL               ; Get Trunk/Hood Sample
                MOV     A,@R0
                ANL     A,#04
                INC     R0
                MOV     @R0,A                   ; Save in CSMPL

                MOV     R2,#10                  ; Loop Counter = 10
                MOV     A,R5
                JB4     CNTDN00                 ; Jmp if M/A
                CPL     A
                JB7     CNTDN0                  ; Jmp if NOT A/A
        CNTDN00
                MOV     R0,#NOVRAM+1
                MOV     A,@R0
                CPL     A
                JB1     CNTDN0                  ; Jmp if NOT FAST ENTRY
                MOV     R2,#5
        CNTDN0
                MOV     R0,#SEPTV               ; Initialize Speech Vector
                MOV     A,#29
                ADD     A,R2
                MOV     @R0,A
        CNTDN1
                MOV     A,R5
                JB3     CNTDN3                  ; TX/PAD
                MOV     R0,#TALKF
                MOV     @R0,#SPHM5              ; Spkr en,SPROM,NO PWR DN
                CALL    SPKEXTX
                MOV     R0,#SEPTV
                MOV     A,@R0                   ; Next Vector
                DEC     A
                MOV     @R0,A
                MOV     A,#20                   ; Wait .4S
                CALL    WAIT
                MOV     R0,#SSMPL               ; Ck for Trunk/Hood CHANGE
                MOV     A,@R0
                INC     R0
                XRL     A,@R0
                ANL     A,#04
```

```
            JNZ       CNTDN3                     ; Jmp if SO
            DJNZ      R2,CNTDN1                  ; Loop
CNTDN3
            CALL      VSPPD
            MOV       A,R5
            RET                                  ; A=Mode

;***********************************************************
;*                                                         *
;*         INCET -- Increment Elapsed Time                 *
;*                                                         *
;*         destroys A,R0,R1,R4                             *
;*         (NO IDL)                                        *
;***********************************************************

INCET
            MOV       R0,#ETF                    ; Ck enable flag
            MOV       A,@R0
            JZ        INCET2                     ; Ret if disabled
            MOV       R0,#ETC                    ; Point to cntr (LB)
            MOV       R1,#ETLIM&FFH              ; Point to limits tbl
            MOV       R4,#5
INCET1
            MOV       A,@R0                      ; Get Time
            ADD       A,#1
            DA        A
            MOV       @R0,A                      ; Save
            MOV       A,R1                       ; Get limit
            MOVP      A,@A
            XRL       A,@R0                      ; Ck limit
            JNZ       INCET2
            MOV       @R0,A                      ; Zero if at limit
            INC       R0
            INC       R1
            DJNZ      R4,INCET1                  ; Next
INCET2
            RET

ETLIM                           ; Limit table
            DB        50H               ; 20ms
            DB        60H               ; Sec
            DB        60H               ; Min
            DB        24H               ; Hr
            DB        60H               ; Day

;***********************************************************
;*                                                         *
;*         CLRET -- Clear Elapsed Time Cntr                *
;*                                                         *
;*         destroys A,R0,R3                                *
;***********************************************************

CLRET
            CLR       A
            MOV       R0,#ETF                    ; Disable ET Cntr
            MOV       @R0,A
            MOV       R0,#ETC                    ; Point to cntr
            MOV       R3,#5
CLRET1
            MOV       @R0,A
            INC       R0
            DJNZ      R3,CLRET1
            RET

;*******************************************************
```

```
;*                                                              *
;*      MKRPT -- Make REPORT (Part of DISARM)                   *
;*                                                              *
;****************************************************************

MKRPT
        MOV     R0,#FLSH                ; Temp save flash cnt
        MOV     A,@R0
        MOV     R3,A
        CALL    RSTOPT                  ; D.L. & Flash OFF
        MOV     A,#2                    ; Wait 40 ms
        CALL    NIWAIT
        MOV     R0,#SSMPL               ; Check for Door Open
        MOV     A,@R0
        ANL     A,#03
        JZ      MKRPT1                  ; Jump if NOT
        MOV     A,#150                  ; Wait 3 Sec
        CALL    WAIT
        CALL    REPORT                  ; Make ASN and BSN Report
        MOV     R0,#AAF                 ; Set IL OFF flag (bit 0)
        MOV     @R0,#01                 ; & Clr Make Report Flag (bit
        MOV     R0,#FLSH                ; Flash OFF
        MOV     @R0,#00
        JMP     DSARM9
MKRPT1
        MOV     R0,#FLSH                ; Restore Flash Cnt
        MOV     A,R3
        MOV     @R0,A
        JMP     DSARM9

;****************************************************************
;*                                                              *
;*      KEY --- Ck for KEY ACTIVE                               *
;*                                                              *
;*      destroys A,R1                                           *
;****************************************************************

KEY
        MOV     R1,#KEYTMR
        IN      A,P2                    ; Get KEY
        JB7     KEY1                    ; Jmp if NOT Active
        MOV     A,#50                   ; Ck for Active=1Sec
        XRL     A,@R1
        JZ      KEY2                    ; Jmp if SO
        INC     @R1                     ; INC Tmr
        JMP     KEY1A
KEY1
        MOV     @R1,#00                 ; Clr Tmr
KEY1A
        MOV     A,R5
        JB0     KEY1B                   ; Jmp if ARM
        JMP     DSARM7
KEY1B
        JMP     ARM5A
KEY2
        SEL     MB1                     ; OFF to INSTALLER MENU
        JMP     IMENU

        PAGE
;****************************************************************
;*                                                              *
;*      REPORT --- Report Bad Sensor / Activated Sensor         *
;*                                                              *
;*      destroys A, R0, R1,R3,R4                                *
;*                                              (Stacks 4)      *
```

```
;************************************************************
        FILLTO  700H
REPORT
        MOV     R0,#BSN                 ; Ck for NO Report
        MOV     A,@R0
        JNZ     REPORT0
        INC     R0
        MOV     A,@R0
        JNZ     REPORT1
        MOV     R0,#TALKF
        MOV     @R0,#SPHM3              ; Spkr en,PPROM Tbl
        MOV     A,#SPH07&FFH            ;"...NO REPORT AVAILABLE..."
        CALL    SPKEXT
        RET

REPORT0                                 ; BAD Sensor Report
        MOV     R1,#SPH05&FFH           ; Source--ROM TBL-BSN
        CALL    MOVTBL                  ; Move ROM to RAM
        MOV     A,#SPHRAM               ; Do Report
        MOV     R0,#TALKF               ; Spkr on en,RAM Tbl
        MOV     @R0,#SPHM4
        CALL    SPKEXT
        JB5     REPORT6                 ; TX
REPORT1                                 ; ACTIVATED Sensor Report
        MOV     R0,#ASN                 ; Get Active Sensor Number
        MOV     A,@R0
        JZ      REPORT6                 ; Exit if 0
REPORTT                                 ; TEST Entry Point
        MOV     R1,#SPH06&FFH           ; Source--ROM TBL-ASN
        CALL    MOVTBL                  ; Move to RAM
        MOV     R1,#NOVRAM+1            ; Do TIME ?
        MOV     A,@R1
        CPL     A
        JB5     REPORT5B                ; Jmp if NOT
        MOV     ,#20                    ; t .4s & insure no intr.
        CALL    NIWAIT                  ; for ET processing (IDL Sync)
        MOV     R1,#ETC+4               ; Point to DAYS value
        MOV     R4,#60                  ; DAY SEP# (name)
        MOV     R3,#3                   ; Loop cntr
        CLR     F0                      ; Skip AGO Flag
        CPL     F0
REPORT2
        MOV     A,@R1                   ; Get time value
        JZ      REPORT4                 ; Jmp if 0
        CLR     F0
        CALL    CONVAL                  ; Convert time value to SEP#
                                        ; & store in RAM TBL
        MOV     A,@R1                   ; Ck for plural name
        XRI     A,#01
        JZ      REPORT3                 ; Jmp if NOT
        INC     R4                      ; (s)(R4=Name SEP#)
        MOV     A,R4                    ; Put name SEP# in RAM TBL
        MOV     @R0,A                   ; R0=SPHRAM Ptr
        INC     R0
        JMP     REPORT5
REPORT3
        MOV     A,R4                    ; Put name in Ram Tbl
        MOV     @R0,A
        INC     R0
REPORT4
        INC     R4                      ; Next Name
REPORT5
        INC     R4                      ; Next Name
        DEC     R1                      ; Next Time Value
```

```
        DJNZ    R3,REPORT2
        JF0     REPORT5B
        MOV     A,#66                   ; SEP# for AGO
        MOV     @R0,A
        INC     R0
        MOV     @R0,#00                 ; End ASN RAM TBL
REPORT5B
        MOV     A,#SPHRAM               ; Do ASN Report
        MOV     R0,#TALKF               ; Spkr en,RAM TBL
        MOV     @R0,#SPHM4
        CALL    SPKEXT
REPORT6
        RETR                            ; Restore F0

;**************************************************************
;*                                                            *
;*      CONVAL--Subroutine to convert a BCD time value        *
;*              to its SEP# & move to RAM TBL                 *
;*                                                            *
;*      Enter with A=Value                                    *
;*                 R1=Time value ptr                          *
;*                 R0=RAM TBL loc ptr                         *
;*                                                            *
;*      destroys A                                            *
;**************************************************************

CONVAL
        ADD     A,#0-10H
        MOV     A,@R1
        JNC     CONVAL1                 ; Jmp if < 10H
        ADD     A,#0-20H
        JC      CONVAL0                 ; Jmp if > 19H
        ADD     A,#1AH                  ; Sub 6 for 10 -19
        JMP     CONVAL1
CONVAL0                 ; Value > 19H
        MOV     A,@R1                   ; Isolate HN
        SWAP    A
        ANL     A,#0FH
        ADD     A,#30+17                ; Index into NUM tbl
        MOV     @R0,A                   ; Save SEP# in RAM TBL
        INC     R0
        MOV     A,@R1                   ; Isolate LN
        ANL     A,#0FH
        JZ      CONVAL2
CONVAL1
        ADD     A,#30-1                 ; Index into NUM tbl
        MOV     @R0,A                   ; Save SEP# in RAM TBL
        INC     R0
CONVAL2
        RET

;**************************************************************
;*                                                            *
;*      FLASH  -----  Setup Flash Parameters                  *
;*                                                            *
;*      Enter with R2=CNT,R3=ON Time,R4=OFF Time              *
;*                                                            *
;*      Destroys A,R0,R1                                      *
;*                                                            *
;**************************************************************

FLASH
        MOV     R0,#FLSH+2              ; OFF Time
        MOV     R1,#FLSH+4              ; OFF Time Restore Copy
```

```
        MOV     A,R4                    ; Get OFF Time
        MOV     @R0,A                   ; Save
        MOV     @R1,A
        DEC     R0
        DEC     R1
        MOV     A,R3                    ; Get ON Time
        MOV     @R0,A                   ; Save
        MOV     @R1,A
        DEC     R0
        MOV     A,R2                    ; Get CNT
        MOV     @R0,A                   ; Save
        RET

;**********************************************************
;*                                                        *
;*      FLSHIL  ---  FLASH Indicator Lights               *
;*                                                        *
;*                                                        *
;*      destroys A,R0',R1',R4'                            *
;*      (NO IDL)                            (Stacks 1)    *
;**********************************************************

FLSHIL
        MOV     R0,#FLSH                ; Ck CNT
        MOV     A,@R0
        JZ      FLSHIL3                 ; Jmp if 0
        INC     R0                      ; Ck ON Time
        MOV     A,@R0
        JZ      FLSHIL1                 ; Jmp if 0
        MOV     A,#SETIL                ; IL ON
        CALL    SETPB
        MOV     A,@R0                   ; DEC
        DEC     A
        MOV     @R0,A
        JMP     FLSHIL3
FLSHIL1
        INC     R0                      ; Ck OFF Time
        MOV     A,@R0
        JZ      FLSHIL2                 ; Jmp if 0
        MOV     A,#RSTIL                ; IL OFF
        CALL    RSTPB
        MOV     A,@R0                   ; DEC
        DEC     A
        MOV     @R0,A
        JMP     FLSHIL3
FLSHIL2
        MOV     R0,#FLSH                ; CNTR
        MOV     A,@R0                   ; DEC
        DEC     A
        MOV     @R0,A
        MOV     R0,#FLSH+4              ; Restore times
        MOV     R1,#FLSH+2
        MOV     A,@R0
        MOV     @R1,A
        DEC     R0
        DEC     R1
        MOV     A,@R0
        MOV     @R1,A
FLSHIL3
        RET

;**********************************************************
;*                                                        *
;*      CKSEN -- Ck Sensors for Change                    *
;*                                                        *
```

```
;*      Destroys A,R0',R1',R2'                                       *
;*                                                                   *
;*      (NO IDL)                                                     *
;*******************************************************************

CKSEN
        MOV     R0,#SENSOR              ; Get Sensors
        MOVX    A,@R0
        XRL     A,#SNORM                ; Normalize
        MOV     R0,#GLMSK               ; Mask -- Disabled Gnd Loops
        ANL     A,@R0
        MOV     R0,#SMSK                ; Mask -- 3 Alarm Sensors
        ANL     A,@R0
        MOV     R2,A                    ; Temp Save
        MOV     R0,#NOVRAM+8            ; Ck for Window Sensor ON
        MOV     A,@R0
        JB0     CKSEN0                  ; Jmp if SO
        MOV     A,R2                    ; Inh Window Sensor
        ANL     A,#F7H
        MOV     R2,A
CKSEN0
        MOV     R1,#SENTMR              ; Sensor Timer
        MOV     R0,#SSMPL               ; Compare to Last Sensor Change
        XRL     A,@R0
        JNZ     CKSEN1                  ; Jmp if Change
        MOV     @R1,#00
        JMP     CKSEN3
CKSEN1
        MOV     A,#5                    ; Ck for Change >=100ms
        XRL     A,@R1
        JZ      CKSEN2                  ; Jmp if so
        INC     @R1
        JMP     CKSEN3
CKSEN2
        MOV     A,R2                    ; Save Change
        MOV     @R0,A
CKSEN3
        MOV     R0,#SMSKM
        MOV     A,@R0
        JZ      CKSEN3A
        JNT0    CKSEN4                  ; Jmp if Motion Active
CKSEN3A
        MOV     A,#00
        JMP     CKSEN5
CKSEN4
        MOV     A,#01
CKSEN5
        MOV     R0,#MSMPL
        MOV     @R0,A
        RET

        PAGE
;*******************************************************************
;*                                                                 *
;*      MENU -- User Menu Routine                                  *
;*                                                                 *
;*                                          (Stacks 4)             *
;*******************************************************************

        FILLTO  800H
MENU
        JMP     MENUH
MENU00
        MOV     R5,#00                  ; Clr PAD
```

```
            MOV     R2,#3                   ; Loop Cntr
            MOV     R0,#NOVRAM+4            ; Get in-use Byte
            MOV     A,@R0
            MOV     R0,#GP2                 ; Temp Save
            MOV     @R0,A
    MENU0
            MOV     R0,#TALKF
            MOV     @R0,#SPHM7              ; Spkr En,PPROM,NO PWR DN
            MOV     R0,#GP2                 ; Ck if in use
            MOV     A,@R0
            RRC     A
            MOV     @R0,A
            JNC     MENU0A                  ; Jmp if NOT in use
            MOV     A,#(UMTBL-1)&FFH        ; Report,Man Arm,Test
            ADD     A,R2
            MOVP    A,@A
            SEL     MB0
            CALL    SPKEXT
            SEL     MB1
            MOV     A,#50                   ; Wait 1s or til PAD
            CALL    WAITP
            JB5     MENU3                   ; TX
            JB6     MENU1                   ; PAD
    MENU0A
            DJNZ    R2,MENU0
    MENU1
            MOV     R5,#00                  ; Clr PAD
            MOV     A,R2
            JZ      MENU2
            ADD     A,#MENUX&FFH
    MENUX
            JMPP    @A
            DB      MENUT&FFH               ; R2=1 (Test)
            DB      MENUA&FFH               ; R2=2 (Man Arm)
            DB      MENUR&FFH               ; R2=3 (Report)
    MENUR
            SEL     MB0
            CALL    REPORT
            SEL     MB1
            JMP     MENU3
    MENUA
            MOV     R0,#NOVRAM+8            ; Ck VOCALARM ON
            MOV     A,@R0
            CPL     A
            JB4     MENUA1                  ; Jmp if VOCALARM DISABLED
            CLR     F1                      ; Ck IGN ON
            CPL     F1
            IDL
            MOV     A,R5
            JB1     MENUA1                  ; Jmp if IGN ON
            SEL     MB0
            CALL    CNTDN
            SEL     MB1
            JB3     MENU3                   ; TX,PAD
            SEL     MB0
            MOV     R5,#10H                 ; Set Man Arm
            JMP     ARM
    MENUT
            MOV     R0,#NOVRAM+8            ; Vocalarm ON ?
            MOV     A,@R0
            CPL     A
            JB4     MENUA1                  ; Jmp if OFF
            JMP     TEST
    MENUA1
            SEL     MB0
```

```
        JMP     DSARMM
MENU2
        MOV     R1,#UMTBL1&FFH          ; Statement Ptr (PPROM)
        MOV     R0,#NOVRAM+5            ; In Use Byte
        MOV     A,@R0
        ANL     A,#01                   ; Insure Unused bits=0
        MOV     R2,A
        MOV     R0,#NOVRAM+7            ; Toggle Byte
        CALL    MENUSPK                 ; Silent
        MOV     A,R5
        JB2     MENU2A                  ; Toggle Exit
        MOV     R1,#UMTBL2&FFH          ; Statement Ptr
        MOV     R0,#NOVRAM+6            ; In Use Byte
        MOV     A,@R0
        ANL     A,#11H                  ; Insure Unused bits=0
        MOV     R2,A
        MOV     R0,#NOVRAM+8            ; Toggle Byte
        CALL    MENUSPK                 ; Window Sensor,Vocalarm
MENU2A
        SEL     MB0
        CALL    VSPPD
        SEL     MB1
        CALL    STORE                   ; Save Changes
MENU3
        MOV     R5,#00                  ; CLR Mode
        MOV     R0,#AAF                 ; Tst for correct ret
        MOV     A,@R0
        MOV     @R0,#01                 ; Clr AAF
        JB1     MENU3A
        SEL     MB0
        JMP     DSARM6
MENU3A
        SEL     MB0
        JMP     DSARM15         ;.Ret to DISARM Idle Loop

UMTBL           ; USER MENU TBL (Same Pg as MENU)
        DB      SPH11&FFH               ; TEST
        DB      SPH09&FFH               ; MANUAL ARM
        DB      SPH08&FFH               ; ABORT
UMTBL1
        DB      SPH10&FFH               ; SILENT
UMTBL2
        DB      SPH23&FFH
        DB      00                      ; Not Used
        DB      00
        DB      00
        DB      SPH12&FFH               ; VOCALARM
;*****************************************************
;*                                                   *
;*      MENUSPK -- Menu Speak (Same Pg as UMTBL)     *
;*                                                   *
;*      Enter with R1=Statement Pointer              *
;*                 R2=In Use Byte                    *
;*                 R0=Toggle Byte Pointer            *
;*                                                   *
;*      Destroys A,R0-R4                             *
;*                                   (Stacks 4)      *
;*****************************************************
MENUSPK
        MOV     A,@R0
        MOV     R4,A
        MOV     R3,#08
MSPK1
```

```
            MOV     A,R2                    ; Ck for Option
            JB0     MSPK3                   ; Jmp if in use
MSPK2
            MOV     A,R2
            RR      A
            MOV     R2,A
            MOV     A,R4
            RR      A
            MOV     R4,A
            INC     R1
            DJNZ    R3,MSPK1
            MOV     A,R4                    ; SAVE Toggle Byte
            MOV     @R0,A
            RET

MSPK3
            MOV     A,R5
            JB5     MSPK2                   ; TX (Finish Looping before
            JB2     MSPK2                   ; Toggle flag ("")
MSPK3A
            CALL    STAK
            MOV     R0,#TALKF
            MOV     @R0,#SPHM7              ; Spkr En,PPROM Tbl,No Pwr Dn
            MOV     A,R1                    ; SPH__
            MOVP    A,@A
            SEL     MB0
            CALL    SPKEXT                  ; Statement
            SEL     MB1
            JB5     MSPK4                   ; TX
            MOV     R0,#TALKF
            MOV     @R0,#SPHM5              ; Spkr En,1 Wd,SPROM,No Pwr Dn
            MOV     R0,#STACK+4             ; R4
            MOV     A,@R0
            ANL     A,#01
            ADD     A,#07                   ; SEP# for Disabled/Enabled
            SEL     MB0
            CALL    SPKEXT
            SEL     MB1
            MOV     A,#50                   ; Wait 1s
            CALL    WAITP
MSPK4
            CALL    UNSTAK
            MOV     A,R5
            JB6     MSPK5                   ; PAD
            JMP     MSPK2
MSPK5
            MOV     R5,#00                  ; Clr PAD
            MOV     A,R4                    ; Toggle Bit
            XRL     A,#01
            MOV     R4,A
            MOV     A,R5                    ; SET Toggle flag
            ORL     A,#4
            MOV     R5,A
            JMP     MSPK3A

            PAGE

;*****************************************************************
;*                                                               *
;*      WAITP ---   Wait 20 ms to 5 Sec                          *
;*                                                               *
;*      A contains wait number                                   *
;*                                                               *
;*      destroys A, R1                                           *
;*                                                               *
;*****************************************************************
```

```
        FILLTO 900H
WAITP
        MOV     R1,A                    ; Loop cntr
        CLR     F1                      ; Set IDL
        CPL     F1
WAITP1
        IDL
        MOV     A,R5                    ; Get mode
        JB5     WAITP2                  ; TX
        JB6     WAITP2                  ; PAD
        DJNZ    R1,WAITP1
WAITP2
        RET                             ; Mode in A


;*******************************************************
;*                                                     *
;*      STORE -- Store Ram Tbl in NOVRAM               *
;*                                                     *
;*      Destroys                                       *
;*                                    (Stacks 1)       *
;*******************************************************

STORE
        MOV     A,#VSPEN                ; NOVRAM ON
        SEL     MB0
        CALL    SETPB
        MOV     A,#2                    ; Wait for Pwr Up
        CALL    NIWAIT
        SEL     MB1
        CALL    CEON                    ; CE=1
        MOV     A,#RCL                  ; Recall Cmd (Enable STORE)
        CALL    WRTBYTE
        CALL    CEOFF                   ; CE=0
        CALL    CEON                    ; CE=1
        MOV     A,#WREN                 ; Wrt En Cmd
        CALL    WRTBYTE
        CALL    CEOFF                   ; CE=0
        MOV     R0,#NOVRAM              ; Source
        MOV     R4,#00
        MOV     R3,#16                  ; Loop Cntr (16wds)
STORE1
        CALL    STAK+2                  ; Save (no idl)
        CALL    CEON
        MOV     A,#WRITE
        ADD     A,R4
        CALL    WRTBYTE                 ; Wrt Cmd
        MOV     A,@R0
        CALL    WRTBYTE                 ; HB
        INC     R0
        MOV     A,@R0
        CALL    WRTBYTE                 ; LB
        CALL    CEOFF
        CALL    UNSTAK+2
        MOV     A,R4
        ADD     A,#8
        MOV     R4,A
        INC     R0
        INC     R0
        DJNZ    R3,STORE1
        CALL    CEON
        MOV     A,#STO
        CALL    WRTBYTE                 ; Store Cmd
        CALL    CEOFF
        SEL     MB0
```

```
        MOV     A,#2                    ; Wait for STO (>10ms)
        CALL    NIWAIT
        MOV     A,#VSPOFF
        CALL    RSTPB
        SEL     MB1
        RET

;****************************************************
;*                                                  *
;*      WRTBYTE -- Wrt a Byte to NOVRAM             *
;*                                                  *
;*      Enter with Byte in A                        *
;*                                                  *
;*      destroys A,R1,R3,R4                         *
;****************************************************

WRTBYTE
        MOV     R1,#NOVRM               ; Adr-NOVRAM
        MOV     R4,A                    ; Temp Save
        MOV     R3,#8
WBYTE1
        MOV     A,R4                    ; Get Byte
        JB7     WBYTE2
        ANL     P1,#FEH                 ; 0
        JMP     WBYTE3
WBYTE2
        ORL     P1,#01                  ; 1
WBYTE3
        RL      A
        MOV     R4,A                    ; Save Byte
        MOVX    A,@R1                   ; Clk
        DJNZ    R3,WBYTE1
        RET

;****************************************************
;*                                                  *
;*      RDBYTE -- Read a Byte from NOVRAM           *
;*                                                  *
;*      Exit with Byte in A                         *
;*                                                  *
;*      destroys R1,R3,R4                           *
;****************************************************

RDBYTE
        MOV     R1,#NOVRM               ; Adr-NOVRAM
        MOV     R4,#00                  ; Clr
        MOV     R3,#8
RBYTE1
        IN      A,P1                    ; Get Data
        RRC     A                       ; Accumutate Data Bits
        MOV     A,R4
        RLC     A
        MOV     R4,A                    ; Save Byte
        MOVX    A,@R1                   ; Clk
        DJNZ    R3,RBYTE1
        MOV     A,R4
        RET

;****************************************************
;*                                                  *
;*      CEON -- NOVRAM CE=1                         *
;*                                                  *
;*      Destroys A,R1                               *
;*                              (Stacks 1)          *
;****************************************************
```

```
CEON
        MOV     A,#20H
        SEL     MB0
        CALL    SETPA
        SEL     MB1
        RET

;*************************************************************
;*                                                           *
;*      CEOFF -- NOVRAM CE=0                                 *
;*                                                           *
;*      Destroys A,R1                                        *
;*                                              (Stacks 1)   *
;*************************************************************

CEOFF
        MOV     A,#DFH
        SEL     MB0
        CALL    RSTPA
        SEL     MB1
        RET

;*************************************************************
;*                                                           *
;*      RECALL -- Recall NOVRAM Data                         *
;*                                                           *
;*      Destroys                                             *
;*************************************************************

RECALL
        MOV     A,#VSPEN            ; NOVRAM Pwr ON
        SEL     MB0
        CALL    SETPB
        MOV     A,#2                ; Wait for Pwr Up
        CALL    NIWAIT
        SEL     MB1
        CALL    CEON
        MOV     A,#RCL              ; Recall Cmd
        CALL    WRTBYTE
        CALL    CEOFF
        MOV     R0,#NOVRAM
        MOV     R4,#00              ; Wd Adr
        MOV     R3,#16              ; 16 Wds
RECALL1
        CALL    STAK+2
        CALL    CEON
        MOV     A,#READ             ; Read Cmd
        ADD     A,R4                ; Add Adr
        CALL    WRTBYTE
        CALL    RDBYTE              ; HB
        MOV     @R0,A
        INC     R0
        CALL    RDBYTE              ; LB
        MOV     @R0,A
        CALL    CEOFF
        CALL    UNSTAK+2
        INC     R0
        INC     R0
        MOV     A,R4                ; Next Adr
        ADD     A,#8
        MOV     R4,A
        DJNZ    R3,RECALL1
        MOV     A,#VSPOFF
        SEL     MB0
        CALL    RSTPB
```

```
        RET

        PAGE

;*********************************************************
;*                                                      *
;*      IMENU - Installer Menu Routine                  *
;*                                                      *
;*                                                      *
;*********************************************************

        FILLTO  A00H
IMENU
        DIS     TCNTI                   ; Disable interrupts
        MOV     R1,#NOVRAM+11           ; Set Restart Byte
        MOV     @R1,#B5H                ; Compl of "*"
ICMDLOP
        CALL    SERIN                   ; Get command byte
        JC      INSP                    ; Jump if disconnect
        ADD     A,#0-37H                ; Test for CMD
        JNC     ICMDLOP                 ; Jump if NOT
        JNZ     IM1
;                       All Menu Items OFF (37H)(7)
        MOV     R0,#SYS0&FFH
IM0
        MOV     R1,#NOVRAM
        MOV     R3,#7
IM0A
        MOV     A,R0
        MOVP    A,@A
        MOV     @R1,A
        INC     R0
        INC     R1
        DJNZ    R3,IM0A
        JMP     ICMDLOP
;                       Menu Items=Sys 1 (38H)(8)
IM1
        DEC
        JNZ     IM2
        MOV     R0,#SYS1&FFH
        JMP     IM0
;                       Menu Item=Sys 2 (39H)(9)
IM2
        DEC     A
        JNZ     IM2A
        MOV     R0,#SYS2&FFH
        JMP     IM0
;                       Menu Item=Sys 3 (3AH)(:)
IM2A
        DEC     A
        JNZ     IM3
        MOV     R0,#SYS3&FFH
        JMP     IM0
;                       ALL Menu Item ON (3B)(;)
IM3
        DEC     A
        JNZ     IM4
        MOV     R0,#SYS4&FFH
        JMP     IM0
;                       Reset Restart Byte (3CH)(<)
IM4
        DEC     A
        JNZ     PI1
        MOV     R1,#NOVRAM+11           ; "*"
        MOV     @R1,#2AH
        JMP     ICMDLOP
```

```
;                             Program Menu Item (3DH)(=)
PI1
          DEC       A
          JNZ       PS1
          CALL      SERIN
          JC        INSP                        ; Jump if disconnect
          MOV       R0,A
          ANL       A,#7FH                      ; Strip value from address
          ADD       A,#0-41H
          MOV       R1,A
          MOV       A,R0
          JNC       PI1                         ; Jump if A < 41H
          MOV       A,R1
          ADD       A,#0-MAXICMD
          MOV       A,R0
          JC        PI1                         ; Jump if A >= MAX
          CALL      BINDEX                      ; A=ADDR R3=MASK
          MOV       R1,A
          MOV       A,#0FFH
          XCH       A,R0                        ; A = original cmd byte
          JB7       PI2                         ; Jump if set-bit cmd
          INC       R0                          ; Data for clear-bit cmd (00)
PI2
          XCH       A,R0                        ; A = data byte (00 or FF)
          XRL       A,@R1
          ANL       A,R3                        ; Isolate bit with mask
          XRL       A,@R1
          MOV       @R1,A                       ; Store updated byte
          MOV       A,R0
          CALL      SEROUT                      ; Echo command
          JMP       ICMDLOP
;                             Program System(3EH)(>)
PS1
          DEC       A
          JNZ       HE1
          MOV       R1,#NOVRAM+12               ; Destination address of block
          MOV       R4,#20                      ; Byte count for block recei
PS2
          CALL      SERIN
          JC        INSP                        ; Abort if disconnect
          MOV       @R1,A
          INC       R1
          DJNZ      R4,PS2                      ; Loop back until all bytes rec
          JMP       ICMDLOP
;                             Hello(3FH)(?)
HE1
          DEC       A
          JNZ       SR1
          MOV       R1,#NOVRAM+11               ; Get Restart Byte
          MOV       A,@R1
          CALL      SEROUT
          JMP       ICMDLOP
;                             Status Request(40H)(@)
SR1
          DEC       A
          JNZ       MR1
          MOV       A,#VERSD                    ; PROG Version #
          CALL      SEROUT
          MOV       A,#VERSM
          CALL      SEROUT
          MOV       A,#VERSY
          CALL      SEROUT
          MOV       A,#MAXICMD                  ; Number of menu items
          CALL      SEROUT
          MOV       R1,#NOVRAM+12               ; Start addr of block to send
          MOV       R3,#20                      ; Send 20 bytes
```

```
SR2
        MOV     A,@R1                   ; Get next byte in NOVRAM
        CALL    SEROUT                  ; Send it
        INC     R1
        DJNZ    R3,SR2                  ; Repeat for all bytes in block
        JMP     ICMDLOP
;                       Menu Item Request(41H ...)
MR1
        DEC     A
        MOV     R4,A                    ; Save cmd byte
        MOV     R1,A
        ADD     A,#0-MAXICMD
        JC      ICMDLOP                 ; Jump if cmd out of range
        CALL    BINDEX                  ; Get addr and mask for specific
        MOV     R1,A
        MOV     A,@R1
        ANL     A,R3                    ; Test bit
        MOV     R3,#80H                 ; Form reply code depending on b
        JNZ     MR2
        MOV     R3,#0                   ; Bit = 0
MR2
        MOV     A,R4
        ADD     A,#41H
        ORL     A,R3
        CALL    SEROUT                  ; Send response
        INC     R4                      ; R4 = # of menu item requested
        MOV     R1,#MENUTXT&0FFH        ; Start addr of menu string lis
        JMP     MR3
INSP
        MOV     R0,#NOVRAM+7            ; Insure User Toggles=0
        MOV     A,@R0                   ; if Installer Toggles=0
        MOV     R1,#NOVRAM+5
        ANL     A,@R1
        MOV     @R0,A
        MOV     R0,#NOVRAM+8            ; Insure User Toggles="1"
        MOV     R1,#NOVRAM+6            ; if Installer Toggles=0
        MOV     A,@R1
        CPL     A
        ORL     A,@R0
        MOV     @R0,A
        MOV     R5,#00                  ; CLR Mode
        ORL     P2,#F0H                 ; Insure P2=Input
        EN      TCNTI
        CALL    STORE
        JMP     DSARM00
SYS0
        DB      0
        DB      0
        DB      0
        DB      0
        DB      0
        DB      0
        DB      0
SYS1
        DB      20H
        DB      2DH
        DB      00H
        DB      03H
        DB      04H
        DB      00H
        DB      00H
SYS2
        DB      00H
        DB      29H
        DB      0CH
```

```
        DB      03H
        DB      04H
        DB      00H
        DB      00H
SYS3
        DB      80H
        DB      2BH
        DB      0CH
        DB      27H
        DB      07H
        DB      01H
        DB      10H
SYS4
        DB      FFH
        DB      FFH
        DB      FFH
        DB      FFH
        DB      FFH
        DB      FFH
        DB      FFH

;****************************************************************

        FILLTO  B00H
MR3
        DJNZ    R4,MR5              ; Jump if desired string NOT fo
MR4
        MOV     A,R1                ; Send menu text string
        MOVP    A,@A
        JZ      MR6                 ; Jump if end of string
        CALL    SEROUT
        INC     R1
        JMP     MR4
MR5
        MOV     A,R1                ; Skip to next string (look for
        MOVP    A,@A
        INC     R1
        JNZ     MR5                 ; Jump if not yet end of string
        JMP     MR3
MR6
        JMP     ICMDLOP

MENUTXT
        DB      'CH1',0
        DB      'CH2',0
        DB      'CH3',0
        DB      'FOG LP',0
        DB      'SP LP',0
        DB      'A/A',0
        DB      'A/A LK',0
        DB      'M/A LK',0
        DB      'ARM REM',0
        DB      'FST ENTRY',0
        DB      'A/A DLY ENTRY',0
        DB      'ALRM ROT',0
        DB      'SLO LK',0
        DB      'TIME',0
        DB      'KEY',0
        DB      'HD',0
        DB      'W1 UP',0
        DB      'W2 UP',0
        DB      'LK',0
        DB      'UNLK',0
        DB      'PGR',0
        DB      'PGR CK',0
        DB      'FST LED',0
```

```
        DB      'SRN',0
        DB      'HRN',0
        DB      'LTS',0
        DB      'INS',0
        DB      'STR KILL',0
        DB      'LED/HD',0
        DB      'PAD',0
        DB      '*HOOD',0
        DB      '*REPORT',0
        DB      '*MAN ARM',0
        DB      '*TEST',0
        DB      '*SILENT',0
        DB      '*WIN CTRL',0
        DB      '*VOCALARM',0
MAXICMD EQU     37H                 ; BCD # of valid installer cmds

        PAGE
;*****************************************************
;*                                                   *
;*      BINDEX - Bit index, Form address and mask for *
;*               selected ITEM.                      *
;*                                                   *
;*      On entry R1 = ITEM number.                   *
;*      Returns NOVRAM addr in A, and mask in R3     *
;*                                                   *
;*      Destroys R1, R2, R3                          *
;*                                                   *
;*****************************************************

        FILLTO  COOH

BINDEX
        INC     R1
        MOV     R2,#(IIUTBL-1)&OFFH
BN2
        MOV     R3,#80H
        INC     R2
        MOV     A,R2
        MOVP    A,@A
BN3
        JZ      BN2
        XCH     A,R3
        RL      A
        XCH     A,R3
        CLR     C
        RRC     A
        JNC     BN3
        DJNZ    R1,BN3
        MOV     A,R2
        ADD     A,#NOVRAM-(IIUTBL&FFH)
        RET

IIUTBL          ; Installer in use table
        DB      FFH
        DB      FFH
        DB      7FH                 ; PORT A
        DB      FFH                 ; PORT B
        DB      07H                 ; Report,Man Arm,Test
        DB      01H                 ; Silent
        DB      11H                 ; Window Sensor,Vocalarm

;*****************************************************
;*                                                   *
;*      SERIN - 1200 Baud serial input routine       *
;*                                                   *
```

```
;*      Returns byte in A, R2.  carry set = disconnect  *
;*      Expects interrupts to be disabled, as critical  *
;*      timing is performed in software.                *
;*      Assumes CPU cycle time of 2.5 uS                *
;*                                                      *
;*      Destroys R0, R2, R3                             *
;*                                                      *
;*******************************************************

SERIN
        MOV     R0,#8           ; Bit count
SI1                             ;{cycles}
        MOVD    P7,A            ; {2} Watchdog reset
        IN      A,P2            ; {2} Sample input
        JB7     SI7             ; {2} Abort if disconnect (=1)
        JB4     SI1             ; {2} Await START bit (=0)
        MOV     R3,#237         ; {2} Count for 1.5 bit delay
SI3
        DJNZ    R3,SI3          ; {2n} Delay
        IN      A,P2            ; {2} Sample data bit
        CLR     C               ; {1} Data bit = 0
        JB4     SI4             ; {2} Jump if data = 1
        JMP     SI5
SI4
        CPL     C               ; {1} Data bit = 1
        NOP                     ; {1} Delay to make paths equal
SI5
        JB7     SI7             ; {2} Jump if disconnect
        MOV     A,R2            ; {1} Partial byte
        RRC     A               ; {1} Shift in data bit
        MOV     R2,A            ; {1}
        MOV     R3,#158         ; {2} Count to make up 1 bit de
        DJNZ    R0,SI3          ; {2} Loop back for remaining b
                                ; {16+2n} SI3 loop total
SI6
        DJNZ    R3,SI6          ; Delay to middle of stop bit
        CLR
        RET                     ; Success exit
SI7
        CLR     C               ; Disconnect: Carry set
        CPL     C
        RET                     ; Abort exit

;*******************************************************
;*                                                      *
;*      SEROUT - 1200 Baud serial output routine        *
;*                                                      *
;*      Outputs byte in A                               *
;*      Expects interrupts to be disabled, as critical  *
;*      timing is performed in software.                *
;*      Assumes CPU cycle time of 2.5 uS                *
;*                                                      *
;*      Destroys A, R0, R2                              *
;*                                                      *
;*******************************************************

SEROUT
        MOVD    P7,A            ; Watchdog reset
        MOV     R0,#10          ; Bit count (1 start, 8 data, 1
        CLR     C               ; Start bit
SO1                             ;{cycles}
        JC      SO2             ; {2}
        ANL     P2,#DFH         ; {2} Xmt a zero bit
        JMP     SO3             ; {2}
SO2
        ORL     P2,#20H         ; {2} Xmt a one bit
```

```
        JMP     S03                     ; {2} Delay to make paths equal
S03
        MOV     R2,#160                 ; {2} Count to make up 1 bit
S04
        DJNZ    R2,S04                  ; {2n} Delay
        CLR     C                       ; {1}
        CPL     C                       ; {1} Set carry for stop bit
        RRC     A                       ; {1} Move next bit into carry
        DJNZ    R0,S01                  ; {2} Loop back for remaining b
                                        ; {2n+13} S01 loop total
        RET

;*****************************************************
;*                                                  *
;*      STAK -- Saves R0,R1,R2,R3,R4,A              *
;*                                                  *
;*      Destroy R0',R1',R6',R7'                     *
;*                                                  *
;*****************************************************

STAK
        CLR     F1                      ; Set IDL
        CPL     F1
        IDL                             ; SYNC
        SEL     RB1
        MOV     R7,A                    ; Temp Save A
        MOV     R1,#STACK               ; Dest
        MOV     R6,#5                   ; Cntr
        MOV     R0,#00                  ; Source
STAK1
        MOV     A,@R0                   ; Save
        MOV     @R1,A
        INC     R0
        INC     R1
        DJNZ    R6,STAK1
        MOV     A,R7                    ; Get A
        MOV     @R1,A                   ; Save
        SEL     RB0
        RET

;*****************************************************
;*                                                  *
;*      UNSTAK -- Replaces R0,R1,R2,R3,R4,A         *
;*                                                  *
;*      Destroys R0',R1',R6'                        *
;*                                                  *
;*****************************************************

UNSTAK
        CLR     F1                      ; Set IDL
        CPL     F1
        IDL
        SEL     RB1
        MOV     R6,#5
        MOV     R0,#STACK               ; Source
        MOV     R1,#00                  ; Dest
UNSTAK1
        MOV     A,@R0
        MOV     @R1,A
        INC     R0
        INC     R1
        DJNZ    R6,UNSTAK1
        MOV     A,@R0
        SEL     RB0
        RET
```

```
;*************************************************************
;*                                                          *
;*      PART OF --- MENU                                    *
;*                                                          *
;*************************************************************

MENUH
        MOV     A,R5
        CPL     A
        JB1     MENUH0                  ; Jmp if IGN OFF
        MOV     R0,#NOVRAM+3
        MOV     A,@R0
        CPL     A
        JB7     MENUH0                  ; Jmp if NOT T/H
        MOV     R5,#00                  ; Clr PAD
        MOV     R0,#TALKF
        MOV     @R0,#SPHM7
        MOV     A,#SPH17&FFH            ; "...T/H..."
        SEL     MB0
        CALL    SPKEXT
        SEL     MB1
        MOV     A,#50                   ; Wait 1 Sec or til PAD
        CALL    WAITP
        JB5     MENUH3                  ; TX
        JB6     MENUH1                  ; PAD
MENUH0
        JMP     MENU00                  ; Next
MENUH1
        MOV     R0,#TALKF
        MOV     @R0,#SPHM3
        MOV     A,#SPH19&FFH            ; "... ENGAGED..."
        SEL     MB0
        CALL    SPKEXT
        MOV     A,#20H                  ; Set T/H
        CALL    SETPB
        CLR     [illegible]
        MOV     R5,A                    ; Clr PAD
        MOV     R1,A
        MOV     R0,#2
        SEL     MB1
MENUH2
        IDL
        MOV     A,R5
        JB5     MENUH4                  ; TX
        JB6     MENUH3                  ; PAD
        CPL     A
        JB1     MENUH3                  ; IGN OFF
        DJNZ    R1,MENUH2               ; Wait 10 Sec
        DJNZ    R0,MENUH2
MENUH3
        MOV     R0,#TALKF
        MOV     @R0,#SPHM3
        MOV     A,#SPH18&FFH            ; "...T/H DISENGAGED..."
        SEL     MB0
        CALL    SPKEXT
MENUH4
        SEL     MB0
        CALL    RSTOPT                  ; Rst T/H
        SEL     MB1
        JMP     MENU3

        PAGE
;*************************************************************
;*                                                          *
```

```
;*         PART OF -- ARM                                    *
;*                                                           *
;*************************************************************

           FILLTO    D00H
ARM00
           MOV       A,R5
           ORL       A,#01              ; Set Arm
           MOV       R5,A
           SEL       MB0
           CALL      RSTTMR             ; Reset timer R6, R7
           CALL      RSTOUT             ; Rst TX,PAD,TX/PAD & outputs
           SEL       MB1
           CALL      ARMI
           SEL       MB0
           JMP       ARM03

;*************************************************************
;*         ARMI -- Init ARM Subroutine                        *
;*************************************************************

ARMI
           SEL       MB0
           CALL      IGNKILL            ; Set IGN KILL if IGN off
           CALL      CLRET              ; Clr & disable E.T. Cntr
           SEL       MB1
           CLR       A
           MOV       R0,#BSN            ; Clear BSN
           MOV       @R0,A
           INC       R0
           MOV       @R0,A              ; Clear ASN
           INC       R0
           MOV       @R0,A              ; Clear alarm counter
           MOV       R0,#LASN
           MOV       @R0,A              ; Clr LASN
           MOV       A,#FFH             ; Init Sensor Msk's
           MOV       R0,#SMSK
           MOV       @R0,A
           INC       R0
           MOV       @R0,A

           MOV       R0,#NOVRAM         ; Get G/L Status
           MOV       A,@R0
           MOV       R0,#GLMSK          ; Setup Gnd Loop Mask
           MOV       @R0,#FFH
           JB3       ARM01              ; Jmp if Fog Enabled
           MOV       @R0,#DFH           ; Mask
ARM01
           JB4       ARM02              ; Jmp if Spare Enabled
           MOV       A,@R0
           ANL       A,#BFH             ; Mask
           MOV       @R0,A              ; Save GLMSK
ARM02
           RET

;*************************************************************
;*                                                           *
;*         PART OF -- DISARM                                  *
;*                                                           *
;*************************************************************

DSARM00
           MOV       R5,#00             ; DISARM (Rst Mode)
           CALL      WSON               ; Window Sensor ON
```

```
            SEL     MB0
            CALL    RSTTMR              ; Reset timer R6, R7
            CALL    RSTOUT              ; Rst TX,PAD,TX/PAD & outputs
            MOV     A,#10               ; Wait .2 Sec
            CALL    NIWAIT
            MOV     R2,#1               ; Flash cnt
            MOV     R3,#50              ; ON 1s
            MOV     R4,#1               ; OFF
            CALL    FLASH
            SEL     MB1
            MOV     R0,#NOVRAM+7        ; Ck for Silent
            MOV     A,@R0
            JB0     DSARM2              ; Jmp if so
            MOV     R0,#TALKF
            MOV     @R0,#SPHM1          ; PA En,1 wd,SPROM
            MOV     A,#57H              ; SEP#
            SEL     MB0
            CALL    SPKEXT              ; "...DISARMED..."
            SEL     MB1
DSARM2
            MOV     A,R5
            JB5     DSARM2D             ; TX
            MOV     A,#50               ; Wait 1 Sec
            SEL     MB0
            CALL    WAIT
            MOV     A,#SETIL            ; I.L. ON
            CALL    SETPB
            SEL     MB1
            MOV     R1,#AAF             ; NO Report
            MOV     A,@R1
            ANL     A,#F7H
            MOV     @R1,A

            MOV     R0,#ASN             ; Check for ALARM
            MOV     A,@R0
            JZ      DSARM2A             ; Jump if NONE
            SEL     MB0
            CALL    EXTWNG              ; "...WARNING..."
            SEL     MB1
            JMP     DSARM2B
DSARM2A
            DEC     R0                  ; Ck BSN
            MOV     A,@R0
            JZ      DSARM3              ; Jmp if 0
DSARM2B
            MOV     R1,#AAF             ; Set Make Report Flag
            MOV     A,@R1
            ORL     A,#08
            MOV     @R1,A
DSARM3
            MOV     A,@R1               ; Ck for Ret from PANIC
            JB7     DSARM4
            MOV     A,#SETULK           ; Set UNLOCK
            SEL     MB0
            CALL    SETPA
            SEL     MB1
            MOV     R0,#NOVRAM+1        ; Slow UNLOCK ?
            MOV     A,@R0
            JB4     DSARM3A             ; Jmp if SO
            MOV     A,#50               ; 1S
            JMP     DSARM3B
DSARM3A
            CLR     A                   ; 5S
DSARM3B
```

```
                SEL     MB0
                CALL    WAIT
                MOV     A,#RSTULK           ; Reset UNLOCK
                CALL    RSTPA
DSARM4                          ; Auto Arm
                MOV     R0,#AAF             ; Clear IL OFF Flag (bit 0)
                MOV     A,@R0               ; NO UNLOCK (bit7)
                ANL     A,#08H              ; 5Sec Time out (bit4)
                MOV     @R0,A               ; Menu Ret to DSARM15 (bit1)
                CLR     F0                  ; Disable Auto Arm
                CPL     F0
                SEL     MB0
                JMP     DSARM6
DSARM2D
                SEL     MB0
                JMP     DSARM17

;***********************************************************
;*      TEST -- TEST Routine                               *
;***********************************************************

TEST
                CALL    ARMI                ; Init
                MOV     R0,#TALKF
                MOV     @R0,#SPHM3
                MOV     A,#SPH14&FFH
                SEL     MB0
                CALL    SPKEXT              ; "..TEST ENABLED.."
                SEL     MB1
TEST0
                IDL
                MOV     A,R5
                JB3     TEST3               ; TX/PAD
                MOV     R0,#SSMPL           ; Get Sensor sample
                MOV     A,@R0
                JZ      TEST1
                SEL     MB0
                CALL    IDNUM
                SEL     MB1
                MOV     R0,A                ; Save ASN
                JMP     TEST2
TEST1
                MOV     R0,#MSMPL
                MOV     A,@R0
                JZ      TEST0
                MOV     R0,#11              ; Save ASN
TEST2
                MOV     A,#SETIL            ; IL ON
                SEL     MB0
                CALL    SETPB
                MOV     A,R0                ; Get ASN
                CALL    REPORTT
                MOV     A,#150              ; Wait 3s
                CALL    WAIT
                MOV     A,#RSTIL            ; IL OFF
                CALL    RSTPB
                SEL     MB1
                JMP     TEST0
TEST3
                MOV     R0,#TALKF
                MOV     @R0,#SPHM3
                MOV     A,#SPH15&FFH
                SEL     MB0
                MOV     R5,#00              ; Rst TX/PAD
                CALL    SPKEXT              ; "..TEST DISABLED.."
```

```
        CALL    RSTOUT                          ; All OFF
        JMP     DSARM6

        PAGE
;*********************************************************
;*                                                      *
;*      PART OF ARM                                     *
;*                                                      *
;*********************************************************

        FILLTO  E00H
ARM06A
        MOV     R1,NOVRAM+2                     ; Windows UP ?
        MOV     A,@R1
        ANL     A,#3
        MOV     R1,A                            ; Temp save
        JZ      ARM06C                          ; Jmp if NOT
        MOV     R3,#2
        MOV     R0,#1
        MOV     A,R1
        XRL     A,#3
        JZ      ARM06B                          ; Jmp if BOTH
        DEC     R3
        MOV     A,R1
        XRL     A,R3
        JZ      ARM06B                          ; Jmp if #1
        INC     R0                              ; #2
ARM06B
        SEL     MB0
        MOV     A,R0
        CALL    SETPA
        CLR     A                               ; Wait 7 Sec
        CALL    WAIT
        MOV     A,#100
        CALL    WAIT
        MOV     A,R0
        CPL     A
        CALL    RSTPA
        INC     R0
        SEL     MB1
        DJNZ    R3,ARM06B
ARM06C
        SEL     MB0
        JMP     ARM07

*********************************************************
*                                                       *
*       PART OF ARM -- Delay Inside Motion Sensor       *
*                         for Manual/Auto Delay Entry   *
*********************************************************

ARM8D
        MOV     R0,#TASN                        ; Ck for Sensor #7
        MOV     A,@R0
        ANL     A,#FEH                          ; Or Sensor #8
        XRL     A,#10
        JNZ     ARM8G                           ; Jmp if NOT
        MOV     R0,#SSMPL
        MOV     R3,#150                         ; Loop cntr (3sec)
        CLR     F1
        CPL     F1
ARM8E
        IDL
        MOV     A,@R0                           ; Ck for Door Open
        ANL     A,#03
```

```
        JNZ     ARM8F               ; Jmp if SO
        DJNZ    R3,ARM8E
ARM8G
        SEL     MB0
        JMP     ARM8B
ARM8F
        MOV     R0,#TASN            ; Fix
        MOV     @R0,#03             ; DOOR
        SEL     MB0
        JMP     ARM8H
;*****************************************************
;*                                                   *
;*      PART OF DISARM                               *
;*                                                   *
;*****************************************************
DSARMIN
        MOV     R5,#00
        CALL    WSON                ; Window Sensor ON
        SEL     MB0
        CALL    RSTTMR
        CALL    RSTOUT
        MOV     R0,#TALKF
        MOV     @R0,#SPHM6          ; Spkr,1wd,SPROM
        MOV     A,#3
        CALL    SPKEXT              ; "...DISARMED..."
        SEL     MB1
        MOV     R0,#AAF
        MOV     @R0,1
        MOV     A,R5
        JB5     DSARMIN3            ; TX
        MOV     R0,#BSN             ; Ck for REPORT
        MOV     A,@R0
        JNZ     DSARMIN1
        INC     R0
        MOV     A,@R0
        JZ      DSARMIN2
DSARMIN1
        SEL     MB0
        CALL    REPORT
DSARMIN2
        CLR     F0                  ; Disable A/A
        CPL     F0
        SEL     MB0
        JMP     DSARM6
DSARMIN3
        JMP     DSARM2D

*****************************************************
*                                                   *
*       PART OF ALARM                               *
*                                                   *
*****************************************************

ALARM2A
        SEL     MB0
        MOV     A,#10               ; Wait .2S
        CALL    NIWAIT
        MOV     A,#FDH              ; Horn OFF
        CALL    RSTPB
        MOV     A,#10               ; Wait .2S
        CALL    NIWAIT
        MOV     A,@R0               ; Horn ON
        ORL     A,#SETSH
```

```
        CALL    SETPB
        JMP     ALARM2B

*********************************************************
*                                                       *
*       WINDOW SENSOR ON -- PART OF DSARM               *
*                                                       *
*********************************************************

WSON
        MOV     R0,#NOVRAM+8            ; Window Sensor ON
        MOV     A,@R0
        ORL     A,#01
        MOV     @R0,A
        RET

*********************************************************
*                                                       *
*       PART OF ARM                                     *
*********************************************************

ARM6C1
        MOV     R0,#TASN                ; Ck if TASN=LASN
        MOV     A,@R0
        MOV     R0,#LASN
        XRL     A,@R0
        JNZ     ARM6C5                  ; Jmp if NOT
        MOV     R0,#ALCNT               ; Inc Alrm Cntr
        INC     @R0
        MOV     A,@R0
        XRL     A,#3
        JNZ     ARM6C6                  ; Jmp if 3 Times
        MOV     R0,#LASN                ; Clr LASN
        MOV     @R0,#00
        MOV     R0,#TASN                ; Determine Sensor #
        MOV     A,@R0
        ADD     A,#0-3
        JZ      ARM6C3                  ; Jmp if 0
        MOV     R2,A                    ; Loop Cntr
        MOV     A,#FEH
ARM6C2
        RL      A
        DJNZ    R2,ARM6C2               ; Position Msk Bit
        MOV     R2,A                    ; Temp Save
        XRL     A,#FEH
        JZ      ARM6C4                  ; Jmp if Sensor #8
        MOV     R0,#SMSK                ; Msk Sensor
        MOV     A,@R0
        ANL     A,R2
        MOV     @R0,A
        JMP     ARM6C7
ARM6C3
        MOV     R0,#SMSK                ; Msk #0
        MOV     A,@R0
        ANL     A,#FEH
        JMP     ARM6C7
ARM6C4
        MOV     R0,#SMSKM               ; Msk #8
        MOV     @R0,#00
        JMP     ARM6C7
ARM6C5
        MOV     R0,#ALCNT               ; Clr Alrm Cntr
        MOV     @R0,#00
        MOV     R0,#TASN                ; LASN <-- TASN
```

```
            MOV     A,@R0
            MOV     R0,#LASN
            MOV     @R0,A
            JMP     ARM6C6
ARM6C6
            SEL     MB0
            JMP     ARM8
ARM6C7
            SEL     MB0
            JMP     ARM5

            PAGE
;*****************************************************
;*                                                   *
;*      PART OF DSARM                                 *
;*                                                   *
;*****************************************************

            FILLTO  F00H
DSARMK
            MOV     R0,#NOVRAM+1            ; IGN KEY Option
            MOV     A,@R0
            CPL     A
            JB6     DSARMK2                 ; Jmp if NOT
            SEL     MB0                     ; Wait .5s
            MOV     A,#25
            CALL    WAIT
            SEL     MB1
DSARMK1
            MOV     R0,#SSMPL               ; Ck KEY in (Spare*)
            MOV     A,@R0
            CPL     A
            JB7     DSARMK2                 ; Jmp if NOT
            MOV     R0,#SEPTV
            MOV     @R0,#9

            MOV     R0,#TALKF
            MOV     @R0,#SPHM6

            SEL     MB0
            CALL    SPKEXTX                 ; "WARNING"
            MOV     A,#50                   ; Wait 1sec
            CALL    WAIT
            SEL     MB1
            JMP     DSARMK1                 ; Loop
DSARMK2
            SEL     MB0
            JMP     DSARMK3                 ; Ret

            END

A>
```

APPENDIX B

Representative Installer's Programs

B.1 NEC MOdel 8201A Computer

B.2 Olivetti Model M10

APPENDIX B.1

Program listing for

NEC Model 8201A Computer

```
5 CLEAR:MAXFILES=2:Z$="16MAR86":GOTO90
10 CLS:PE=11:IFMP=LPTHENPE=LE
11 GOSUB70
12 FORMO=0TOPE
14 GOSUB28:LOCATEX,Y:C$=CHR$(65+M):GOSUB40:IFETHEN14ELSEGOSUB60:IFASC(MID$(R$,:
1))AND128THENPRINT"y ";ELSEPRINT"n ";
20 PRINTMID$(R$,2,LEN(R$)-1);
22 NEXT:MO=0:RETURN
28 X=1-(MO>5)*20:Y=1+MO+(MO>5)*6:M=MO+MP*12:RETURN
30 R$=R$+INPUT$(1,2):RETURN
33 COMOFF:Q$=INPUT$(1,2):RETURN
40 HX=POS(0):HY=CSRLIN:E=0:LOCATE22,0:PRINTDT$" "TIME$;:Q$=""
41 ONCOMGOSUB33:COMON:LOCATE28,7:PRINT"CHECK CABLE";:PRINT#1,"?";:LOCATE28,7:PF
NT" HOOKUP OK ";
45 IFQ$=CHR$(181)THENPRINT#1,"<";:RUN
46 IFQ$="*"THEN48
47 LOCATE28,7:PRINT"CHECK CABLE";:SOUND4000,HB:E=1
48 LOCATEHX,HY:RETURN
50 N=ASC(N$)\16:GOSUB52:N=ASC(N$)MOD16
52 PRINTMID$(STR$(N),2,1);:RETURN
60 CLOSE#2:OPEN"COM:5N81NN"FORINPUTAS#2
62 ONCOMGOSUB30:COMON:R$="":PRINT#1,C$;
64 FORQ=1TO30:NEXT
66 COMOFF:RETURN
70 LOCATE0,0:PRINT"Ser ";:FORI=1TO3:N$=MID$(S$,I,1):GOSUB50:NEXT:PRINT"  v.";:F
RI=1TO3:N$=MID$(V$,I,1):GOSUB50:NEXT:RETURN
75 FORJ=0TO2:N$=MID$(S$,I+J,1):GOSUB50:PRINT"/";:NEXT:PRINTBS$" ":RETURN
80 I$="":FORI=1TO3:N=ASC(MID$(Q$,I,1)):I$=I$+CHR$(48+N/16)+CHR$(48+NMOD16):NEX
I=1
81 HY=CSRLIN:X=X0+I:LOCATE(X-(X>23)-(X>25)),HY
82 GOSUB89:K$=INKEY$:IFK$=""THEN82ELSEK=ASC(K$)
83 IFK>47ANDK<58ANDI<7THENPRINTK$;:I$=MID$(I$,1,I-1)+K$+MID$(I$,I+1):I=I-(I<6):
OTO81
84 IFK=29THENI=I+(I>1):GOTO81
85 IFK=28THENI=I-(I<6):GOTO81
86 IFK<>13THENBEEP:GOTO81
87 Q$="":FORI=1TO5STEP2:Q$=Q$+CHR$(ASC(MID$(I$,I))*16+ASC(MID$(I$,I+1))-816):NE
T:RETURN
88 S$=MID$(S$,1,I-1)+Q$+MID$(S$,I+3):RETURN
89 GOSUB40:PRINTCHR$(95);:FORQ=1TO100:NEXT:PRINTBS$MID$(I$,I,1)BS$;:RETURN
90 BS$=CHR$(8):SCREEN0,0
95 OPEN"COM:5N81NN"FOROUTPUTAS#1:OPEN"COM:5N81NN"FORINPUTAS#2
96 Q$=DATE$:Q$=MID$(Q$,4)+MID$(Q$,3,1)+MID$(Q$,1,2):DT$=Q$
97 D$="":FORI=1TO7STEP3:D$=D$+CHR$((ASC(MID$(Q$,I))AND15)*16+(ASC(MID$(Q$,I+1):
ND15)):NEXT
98 CLS:PRINT"Pc Prog Vers ";Z$;:LOCATE7,2:PRINT"VOCALARM INSTALLER PROGRAM"
100 LOCATE10,4:PRINT"Copyright (C) 1985";:LOCATE8,5:PRINT"Grossheim & Hildebra
t";
106 GOSUB40:IFETHEN114
110 LOCATE13,7:PRINT"Press any key";:FORI=1TO150:IFINKEY$<>""THEN118
112 NEXT
114 LOCATE13,7:PRINTSPACE$(13);:FORI=1TO50:NEXT:GOTO106
118 CLS:HB=5
119 K$=INKEY$:IFK$<>""THEN119
120 GOSUB40:IFETHEN120ELSEC$="@":GOSUB60
122 MM=ASC(MID$(R$,4)):MM=(MM\16)*10+MMMOD16
123 V$=MID$(R$,1,3):S$=MID$(R$,5,LEN(R$)-4)
124 I=MMMOD12:LP=(MM\12)-(I>0)-1:LE=I-1:IFLE=-1THENLE=11
```

```
130 GOSUB70
131 LOCATE0,2:PRINT"Date Last Programmed  ";:I=7:GOSUB75
132 PRINT"Date Installed         ";:I=4:GOSUB75:PRINT"Installer's Code        ";M:
$(S$,10,8)
134 LOCATE0,6:PRINT"Press  E  to edit":PRINT" ENTER to proceed";:GOSUB40:K$=INK
Y$:IFK$=""THEN134
136 IFK$="?"THEN98
137 IFK$="E"THEN140
138 IFK$=CHR$(13)THEN260
139 BEEP:GOTO134
140 LOCATE0,6:PRINT"Press <- -> to move":PRINT" ENTER to proceed";
143 Q$=MID$(S$,4,3):LOCATE21,3:PRINT;:X0=21:GOSUB80:I=4:GOSUB88
145 I$=MID$(S$,10,8):I=1
150 LOCATE21+I,4:GOSUB89:K$=INKEY$:IFK$=""THEN150ELSEK=ASC(K$)
152 IFK=190THEN160
153 IFK=13THEN180
154 IFK=29THENI=I+(I>1)
155 IFK=28THENI=I-(I<8)
156 IFK>31ANDK<127THENPRINTK$;:I$=MID$(I$,1,I-1)+K$+MID$(I$,I+1):I=I-(I<8)
158 GOTO 150
160 Q$=MID$(S$,1,3):R$=Q$:LOCATE4,0:X0=3:GOSUB80:S$=Q$+STRING$(6,CHR$(0))+STRIN
$(8,".")+MID$(S$,18):GOSUB500
161 GOTO130
180 S$=MID$(S$,1,9)+I$+MID$(S$,18)
260 GOSUB500:FC=0
P70 GOTO600
300 GOSUB10
310 K$=INKEY$:IFK$<>""THEN310
320 GOSUB28
324 LOCATEX-1,Y:PRINT">";:FORI=1TO200:NEXT:PRINTBS$" ";:GOSUB40
328 K$=INKEY$:IFK$=""THEN324
330 K=ASC(K$)
350 IFK<>30THEN360
352 IFM0=0THENM0=PE:GOTO320
354 M0=M0-1:GOTO320
360 IFK<>31THEN370
362 IFM0=PETHENM0=0:GOTO320
364 M0=M0+1:GOTO320
370 IFK<>29ANDK<>28THEN380
372 IFM0>5THENM0=M0-6:GOTO320
376 IFM0+6<PETHENM0=M0+6:GOTO320
378 M0=PE:GOTO320
380 IFK<>13THEN390
384 GOSUB40:IFETHEN384ELSEC$=CHR$(65+M):GOSUB60
385 C$=CHR$(ASC(R$)XOR128):PRINT#1,"=";:GOSUB60
386 LOCATEX,Y:IFASC(MID$(R$,1,1))AND128THENSOUND1000,3:PRINT"y";ELSESOUND3000,3
PRINT"n";
387 IFFC=0THENQ$=D$:I=7:GOSUB88:GOSUB500
388 GOTO320
390 IFK=63THEN600
400 IFK<>20THEN420
405 IFMP=0THENBEEP:GOTO320
410 MP=MP-1:GOSUB10:GOTO320
420 IFK<>2THENBEEP:GOTO320
425 IFMP=LPTHENBEEP:GOTO320
430 MP=MP+1:GOSUB10:GOTO320
500 GOSUB40:IFETHEN500ELSEPRINT#1,">"S$;:FC=1:C$="@":GOSUB60
510 IFS$<>MID$(R$,5,LEN(R$)-4)THEN500
520 RETURN
600 CLS:K$=INKEY$:IF K$<>""THEN600
605 GOSUB70
610 LOCATE10,1:PRINT"<0> ALL OFF"
620 LOCATE10,2:PRINT"<1> VOCALARM 1"
630 LOCATE10,3:PRINT"<2> VOCALARM 2"
635 LOCATE10,4:PRINT"<3> VOCALARM 3"
640 LOCATE10,5:PRINT"<4> ALL ON"
650 LOCATE10,6:PRINT"Select OPTION:"
660 LOCATE10,7:PRINT"ENTER = NO change";
670 GOSUB40:K$=INKEY$:IFK$=""THEN670
680 K=ASC(K$)
685 IFK=13THEN770
690 IFK=63THEN118
695 IFASC(MID$(V$,3,1))=133THEN800
```

```
700 IFK=48THENC$="7":GOTO760
710 IFK=49THENC$="8":GOTO760
720 IFK=50THENC$="9":GOTO760
730 IFK=51THENC$=":":GOTO760
735 IFK=52THENC$=";":GOTO760
750 BEEP:GOTO650
760 GOSUB40:IFETHEN760ELSEPRINT#1,C$;
765 Q$=D$:I=7:GOSUB88:GOSUB500
770 MP=0:GOTO300
800 IFK=48THENC$="8":GOTO760
810 IFK=49THENC$="9":GOTO760
820 IFK=50THENC$=":":GOTO760
830 IFK=51THEN750
840 IFK=52THENC$=";":GOTO760
850 GOTO750
```

APPENDIX B.2

Program listing for

B.2 Olivetti Model M10

```
5 CLEAR:MAXFILES=2:Z$="16MAR86":GOTO90
10 CLS:PE=11:IFMP=LPTHENPE=LE
11 GOSUB70
12 FORMO=0TOPE
14 GOSUB28:PRINT@X+Y*40,;:C$=CHR$(65+M):GOSUB40:IFETHEN14ELSEGOSUB60:IFASC(MID
R$,1,1))AND128THENPRINT"y ";ELSEPRINT"n ";
20 PRINTMID$(R$,2,LEN(R$)-1);
22 NEXT:MO=0:RETURN
28 X=1-(MO>5)*20:Y=1+MO+(MO>5)*6:M=MO+MP*12:RETURN
30 R$=R$+INPUT$(1,2):RETURN
33 COMOFF:Q$=INPUT$(1,2):RETURN
40 HX=POS(0):HY=CSRLIN:E=0:PRINT@22,DATE$" "TIME$;:Q$=""
41 ONCOMGOSUB33:COMON:PRINT@308,"CHECK CABLE";:PRINT#1,"?";:PRINT@308," HOOKUP
K ";
45 IFQ$=CHR$(181)THENPRINT#1,"<";:RUN
46 IFQ$="*"THEN48
47 PRINT@308,"CHECK CABLE";:SOUND4000,HB:E=1
48 PRINT@HX+(HY*40),;:RETURN
50 N=ASC(N$)\16:GOSUB52:N=ASC(N$)MOD16
52 PRINTMID$(STR$(N),2,1);:RETURN
60 CLOSE#2:OPEN"COM:58N1D"FORINPUTAS#2
62 ONCOMGOSUB30:COMON:R$="":PRINT#1,C$;
64 FORQ=1TO20:NEXT
66 COMOFF:RETURN
70 PRINT@0,"Ser ";:FORI=1TO3:N$=MID$(S$,I,1):GOSUB50:NEXT:PRINT"  v.";:FORI=1T
:N$=MID$(V$,I,1):GOSUB50:NEXT:RETURN
75 FORJ=0TO2:N$=MID$(S$,I+J,1):GOSUB50:PRINT"/";:NEXT:PRINTBS$" ":RETURN
80 I$="":FORI=1TO3:N=ASC(MID$(Q$,I,1)):I$=I$+CHR$(48+N/16)+CHR$(48+NMOD16):NEX
I=1
81 HY=CSRLIN:X=X0+I:PRINT@(X-(X>23)-(X>25))+HY*40,;
82 GOSUB89:K$=INKEY$:IFK$=""THEN82ELSEK=ASC(K$)
83 IFK>47ANDK<58ANDI<7THENPRINTK$;:I$=MID$(I$,1,I-1)+K$+MID$(I$,I+1):I=I-(I<6)
OTO81
84 IFK=29THENI=I+(I>1):GOTO81
85 IFK=28THENI=I-(I<6):GOTO81
86 IFK<>13THENBEEP:GOTO81
87 Q$="":FORI=1TO5STEP2:Q$=Q$+CHR$(ASC(MID$(I$,I))*16+ASC(MID$(I$,I+1))-816):N
T:RETURN
88 S$=MID$(S$,1,I-1)+Q$+MID$(S$,I+3):RETURN
89 GOSUB40:PRINTCHR$(252);:FORQ=1TO80:NEXT:PRINTBS$MID$(I$,I,1)BS$;:RETURN
90 BS$=CHR$(8):SCREEN0,0:KEYON
95 OPEN"COM:58N1D"FOROUTPUTAS#1:OPEN"COM:58N1D"FORINPUTAS#2
97  Q$=DATE$:D$="":FORI=1TO7STEP3:D$=D$+CHR$((ASC(MID$(Q$,I))AND15)*16+(ASC(MI
(Q$,I+1))AND15)):NEXT
98 CLS:PRINT@0,"Pc Prog Vers ";Z$;:PRINT@87,"VOCALARM INSTALLER PROGRAM"
100 PRINT@170,"Copyright (C) 1985";:PRINT@208,"Grossheim & Hildebrandt";
106 GOSUB40:IFETHEN114
110 PRINT@293,"Press any key";:FORI=1TO150:IFINKEY$<>""THEN118
112 NEXT
114 PRINT@293,SPACE$(13);:FORI=1TO50:NEXT:GOTO106
118 CLS:HB=5
```

```
119 K$=INKEY$:IFK$<>""THEN119
120 GOSUB40:IFETHEN120ELSEC$="@":GOSUB60
122 MM=ASC(MID$(R$,4)):MM=(MM\16)*10+MMMOD16
123 V$=MID$(R$,1,3):S$=MID$(R$,5,LEN(R$)-4)
124 I=MMMOD12:LP=(MM\12)-(I>0)-1:LE=I-1:IFLE=-1THENLE=11
130 GOSUB70
131 PRINT@80,"Date Last Programmed  ";:I=7:GOSUB75
132 PRINT"Date Installed             ";:I=4:GOSUB75:PRINT"Installer's Code      [illegible];M
$(S$,10,8)
134 PRINT@240,"Press  E  to edit":PRINT" ENTER to proceed";:GOSUB40:K$=INKEY$:
K$=""THEN134
136 IFK$="?"THEN98
137 IFK$="E"THEN140
138 IFK$=CHR$(13)THEN26[illegible]
139 BEEP:GOTO134
140 PRINT@240,"Press ½ ¼ to move":PRINT" ENTER to proceed";
143 Q$=MID$(S$,4,3):PRINT@141,;:XO=21:GOSUB80:I=4:GOSUB88
145 I$=MID$(S$,10,8):I=1
150 PRINT@182+I-1,;:GOSUB89:K$=INKEY$:IFK$=""THEN150ELSEK=ASC(K$)
152 IFK=207THEN160
153 IFK=13THEN180
154 IFK=29THENI=I+(I>1)
155 IFK=28THENI=I-(I<8)
156 IFK>31ANDK<127THENPRINTK$;:I$=MID$(I$,1,I-1)+K$+MID$(I$,I+1):I=I-(I<8)
158 GOTO 150
160 Q$=MID$(S$,1,3):R$=Q$:PRINT@4,;:XO=3:GOSUB80:S$=Q$+STRING$(6,CHR$(0))+STRIN
$(8,".")+MID$(S$,18):GOSUB500
161 GOTO130
180 S$=MID$(S$,1,9)+I$+MID$(S$,18)
260 GOSUB500:FC=0
270 GOTO600
300 GOSUB10
310 K$=INKEY$:IFK$<>""THEN310
320 GOSUB28
324 FORI=1TOOSTEP-1:GOSUB40:LINE(-3+X*6,Y*8)-(7+X*6,8+Y*8),I,B:NEXT
328 K$=INKEY$:IFK$=""THEN324
330 K=ASC(K$)
350 IFK<>30THEN360
352 IFMO=0THENMO=PE:GOTO320
354 MO=MO-1:GOTO320
360 IFK<>31THEN370
362 IFMO=PETHENMO=0:GOTO320
364 MO=MO+1:GOTO320
370 IFK<>29ANDK<>28THEN380
372 IFMO>5THENMO=MO-6:GOTO320
376 IFMO+6<PETHENMO=MO+6:GOTO320
378 MO=PE:GOTO320
380 IFK<>13THEN390
384 GOSUB40:IFETHEN384ELSEC$=CHR$(65+M):GOSUB60
385 C$=CHR$(ASC(R$)XOR128):PRINT#1,"=";:GOSUB60
386 PRINT@X+Y*40,;:IFASC(MID$(R$,1,1))AND128THENSOUND1000,3:PRINT"y";ELSESOUND3
00,3:PRINT"n";
387 IFFC=0THEND$=D$:I=7:GOSUB88:GOSUB500
388 GOTO320
390 IFK=63THEN600
400 IFK<>20THEN420
405 IFMP=0THENBEEP:GOTO320
410 MP=MP-1:GOSUB10:GOTO320
420 IFK<>2THENBEEP:GOTO320
425 IFMP=LPTHENBEEP:GOTO320
430 MP=MP+1:GOSUB10:GOTO320
500 GOSUB40:IFETHEN500ELSEPRINT#1,">"S$;:FC=1:C$="@":GOSUB60
510 IFS$<>MID$(R$,5,LEN(R$)-4)THEN500
520 RETURN
600 CLS:K$=INKEY$:IF K$<>""THEN600
605 GOSUB70
610 PRINT@50,"<0> ALL OFF"
620 PRINT@90,"<1> VOCALARM 1"
630 PRINT@130,"<2> VOCALARM 2"
635 PRINT@170,"<3> VOCALARM 3"
640 PRINT@210,"<4> ALL ON"
650 PRINT@250,"Select OPTION:"
660 PRINT@290,"ENTER = NO change";
```

```
670 GOSUB40:K$=INKEY$:IFK$=""THEN670
680 K=ASC(K$)
685 IFK=13THEN770
690 IFK=63THEN118
695 IFASC(MID$(V$,3,1))=133THEN800
700 IFK=48THENC$="7":GOTO760
710 IFK=49THENC$="8":GOTO760
720 IFK=50THENC$="9":GOTO760
730 IFK=51THENC$=":":GOTO760
735 IFK=52THENC$=";":GOTO760
750 BEEP:GOTO650
760 GOSUB40:IFETHEN760ELSEPRINT#1,C$;
765 Q$=D$:I=7:GOSUB88:GOSUB500
770 MP=0:GOTO300
800 IFK=48THENC$="8":GOTO760
810 IFK=49THENC$="9":GOTO760
820 IFK=50THENC$=":":GOTO760
830 IFK=51THEN750
840 IFK=52THENC$=";":GOTO760
850 GOTO750
```

What is claimed is:

1. An alarm system for signaling an unauthorized entry into a defined area, such as into a closed vehicle, said alarm sy stem comprising:

sensor means for sensing the occurrence of at least one of a plurality of unauthorized entry events and for generating a violetion condition signal for each unauthorized entry event occurrence that is sensed;

a control unit for controlling the response of said alarm system to the violation condition signal, said control unit including processing means responsive to said vilation condition signal for generating an alarm control signal, alarm means responsive to said alarm control signal for sounding an alarm, said sounded alarm including the generating of synthesized vocal speech, report means for generating, subsequent to the generating of said violation condition signal, a synthesized vocal speech report including an indication of which unauthorized entry event occurred and the time at which the unauthorized entry event occurred, and vocal interrogation/set means for interrogating said alarm system in order to determine the alarm system's current operating status and for manually setting selected operating parameters associated with it use, the operating parameters selected being chosen from a group of operating parameters that are vocally presented by synthetic speech.

2. The alarm system of claim 1 wherein said processing means generates said alarm control signal only for a prescribed time period subsequent to the occurrence of said violation condition signal, whereby the alarm sounded by said alarm means only continues for said prescribed time period, the occurrence of said violation condition signal being reported at a subsequent time by said report means.

3. The alarm system of claim 2 wherein said control unit includes non-volatile memory means for storing program data that controls the operation of said processing means, said program data being programmable into said memory means during installation of said alarm system with the use of a programming unit, said programming unit being detachably connected to said control means.

4. The alarm system of claim 3 wherein said programming unit includes:

program processing means;

display means connected to said program processing means; and manual data entry means coupled to said program processing means;

said program processing means having a processing routine loaded therein that provides an installer of the alarm system with a list of options, displayed on said display means, that can be programmed into the non-volatile memory means of the alarm system, a given option being selectable by said installer through the use of said manual data entry means, whereby the installer can select from a displayed list of available options those options that are desired for a given installation of said alarm system.

5. The alarm system of claim 1 wherein said processing means, includes test means for testing and verifying the operation of various features of said alarm system, the results of said testing and verifying being reported by vocal speech through said report means, said test means being initiated by a request made through said manual interrogation/set means.

6. The alarm system of claim 1 wherein said alarm system is selectively armed and disarmed through the use of said interrogation/set means.

7. The alarm system of claim 6 wherein the armed status of said alarm system is reported by speech through said report means subsequent to the arming of said alarm system, whereby an audible confirmation that the alarm system has successfully been armed is provided.

8. The alarm system of claim 6 wherein the armed status of said alarm system is reported through silent visual means subsequent to the arming of said alarm system, whereby a silent confirmation that the alarm system has successfully been armed is provided.

9. The alarm system of claim 6 wherein said interrogation/set means includes a menu pad switch that is manually activated.

10. The alarm system of claim 6 wherein said interrogation/set means includes:

receiving means coupled to said processing means for receiving transmitted control signals; and a portable transmitting unit for generating and transmitting said control signals, whereby the arming and disarming of said alarm system can be activated from a location remote from said alarm system.

11. The alarm system of claim 6 further including paging means within said control unit for transmitting a paging signal to a remote paging receiving unit upon the occurrence of one of said entry events, whereby a person in contact with said remote paging receiving unit may be notified that an entry event has occurred.

12. A vocal alarm system for reporting the occurrence of an entry event into a structure, said structure having doors and windows through which an entry event would likely be made, said vocal alarm system further having setting means by which a user of the system can optionally select certain features to be included in the alarm system, said vocal alarm system comprising:

menu means responsive to said setting means for generating a vocal menu list of features of said vocal alarm system that may be selected by a user of said system, said vocal menu being generated using synthetic speech;

manual selection means for allowing the user to manually select those features from said vocal menu list that the user desires to incorporate into the opertaion of said vocal alarm system;

control means responsive to the selections made by the user through said manual selection means for controlling the operation of said vocal alarm system to include the selected features;

sensing means for sensing the occurrence of an entry event into said structure and for generating an entry event signal indicating the particular entry event that was sensed;

memory means for recording the time and occurrence of said entyy event signal; and report means for generating, subsequent to the generation of said entry event signal, a vocal speech report of the occurrence of the prior entry event, said vocal speech report including an indication of which entry event occurred and the time it occurred, said vocal speech report being generated using synthetic speech techniques.

13. The vocal alarm system of claim 12 wherein said report means includes means for generating a vocal speech status report of the operating status of the alarm system, said status report including the operating condition of said sensing means.

14. The vocal alarm system of claim 12 wherein aaid report means includes means for generating a loud, attention-getting vocal speech alarm message upon the occurrence of an entry event.

15. The vocal alarm system of claim 14 wherein said report means includes means for generating a vocal speech report audible inside of said structure, intended to report on the occurrence of any prior entry events or the operating status of the alarm system; and means for generating said load attention-getting vocal speech alarm message so that it is audible outside of said structure, intended to draw attention to the entry event while it is occurring.

16. The vocal alarm system of claim 15 wherein said vocal speech alarm message generated by said report means is accompanied by additional audible and visual alarms generated by said report means, said additional alarms being intended to draw attention to the entry event.

17. The vocal alarm system of claim 12 wherein said structure protected by said system comprises an automobile, and wherein said sensing means includes a door sensor for sensing the opening of a door of said automobile, a window sensor for sensing the striking of a window of said vehicle, and a hood sensor for sensing the opening of the ood of said vehicle.

18. The vocal alarm system of claim 17 wherein said list of features generated by said vocal menu means includes whether said window sensor is to be enabled and whether said hood sensor is to be enabled.

19. A vocal alarm system for use with a vehicle having doors and windows comprising:

sensor means for sensing a violation event made against said vehicle and for generating a latched violation signal in reponse to the occurrence of said violation event;

arming means for enabling said sensor means, siad arming means including;

switch means for generating an enable signal for use by said sensor means, and timing means coupled to the sensor means for disabling said enable signal until said doors have remained closed for a prescribed period of time, said sensor means including means for sensing whether the doors of said vehicle have remained closed; and vocal alarm means for generating a vocal alarm message in response to said latched violation signal, said vocal alarm message being intended to frighten away the source of said violation event, and to attract attention to the vehicle.

20. The vocal alarm system of claim 19 wherein said sensor means include means for sensing violations that include motion of the vehicle, opening of the doors of the vehicle, and strikes or blows made against the windows of the vehicle.

21. A vocal alarm system for use with a vehicle having doors and windows comprising:

sensor means for sensing a violation event made against said vehicle and for generating a latched violation signal in response to the occurrence of said violation event;

arming means for enabling said sensor means;

vocal alarm means for generating a vocal alarm message in response to said latched violation signal, said vocal alarm message being intended to frighten away the source of said violation event, and to attract attention to the vehicle; and report generating means responsive to said latched violation signal for storing a signal identifying said violation event, and for generating a vocal report, in response to a disabling of said arming means, indicating the violation event that occurred.

22. The vocal alarm system of claim 21 wherein said report generating means further includes timing means for noting the time at which said violation event was sensed by said sensing maans and for including within said vocal report an indication of said time.

* * * * *